United States Patent [19]

Babson, III et al.

[11] Patent Number: 5,315,646
[45] Date of Patent: May 24, 1994

[54] SYSTEMS AND PROCESSES FOR PROVIDING MULTIPLE INTERFACES FOR TELEPHONE SERVICES

[75] Inventors: David L. Babson, III, Somerset; James A. Bajzath, Jr., Roebling; Thomas C. Ely, Bridgewater, all of N.J.

[73] Assignee: Bell Communications Research, Livingston, N.J.

[21] Appl. No.: 629,447

[22] Filed: Dec. 18, 1990

[51] Int. Cl.[5] .................... H04M 3/42; H04M 11/00
[52] U.S. Cl. ..................................... 379/201; 379/93; 395/159; 395/160; 395/161; 395/500
[58] Field of Search .............. 379/90, 93, 201, 396; 364/200; 395/159, 160, 161, 500, 51, 75, 917, 922

[56] References Cited

U.S. PATENT DOCUMENTS

| | | | |
|---|---|---|---|
| 4,653,090 | 3/1987 | Hayden | 379/396 X |
| 4,747,127 | 5/1988 | Hansen et al. | 379/94 |
| 4,782,517 | 11/1988 | Bernardis et al. | 379/201 |
| 4,785,408 | 11/1988 | Britton et al. | 379/93 X |
| 4,827,404 | 5/1989 | Barstow et al. | 364/200 |
| 4,860,204 | 8/1989 | Gendron et al. | 395/12 X |
| 4,878,240 | 10/1989 | Lin et al. | 379/67 |

*Primary Examiner*—James L. Dwyer
*Assistant Examiner*—Harry S. Hong
*Attorney, Agent, or Firm*—Leonard Charles Suchyta; Joseph Giordano

[57] ABSTRACT

A method and apparatus for creating customized call processing information (CCPI) records to permit customized telephone services for individual subscribers to a telephone network. The records are provided in a binary representation, an internal data structure representation and a displayed representation. The displayed representation for a CCPI record may be provided in a plurality of formats. For example, a "graph" format or a "form" format. The binary and internal data structure representations of a CCPI record are less machine dependent than the displayed representation and can, therefore, be implemented in a variety of processing devices. The displayed representation can be developed by an operator to correspond to any desired operating environment which, when interfaced with the internal data structure representation, permits the creation of CCPI records on a wide variety of processing devices.

6 Claims, 59 Drawing Sheets

FIG. 2

976 CALL SCREENING FORM

CUSTOMER # [2016992911] ~70

GENERAL ~72

| PHONE | XXXX | SCREEN ● (74) | PERMIT ○ (76) | TIME | [ALL] ~78 |

SPECIAL ~80

| PHONE | [1212] ~82 | SCREEN ○ (74) | PERMIT ● (76) | TIME | [7:00P-9:00P] ~78 |
| PHONE | [1234] | SCREEN ● | PERMIT ○ | TIME | [8:00A-6:00P] |
| PHONE | [1224] | SCREEN ○ | PERMIT ● | TIME | [ALL] |
| PHONE | [    ] | SCREEN ○ | PERMIT ○ | TIME | [    ] |
| PHONE | [    ] | SCREEN ○ | PERMIT ○ | TIME | [    ] |

PIN OVERRIDE ~86    YES ●    NO ○    PIN # [2558] ~88

( SAVE ) ~90    ( LOAD ) ~92    ( NEW ) ~94    ( EXIT ) ~96

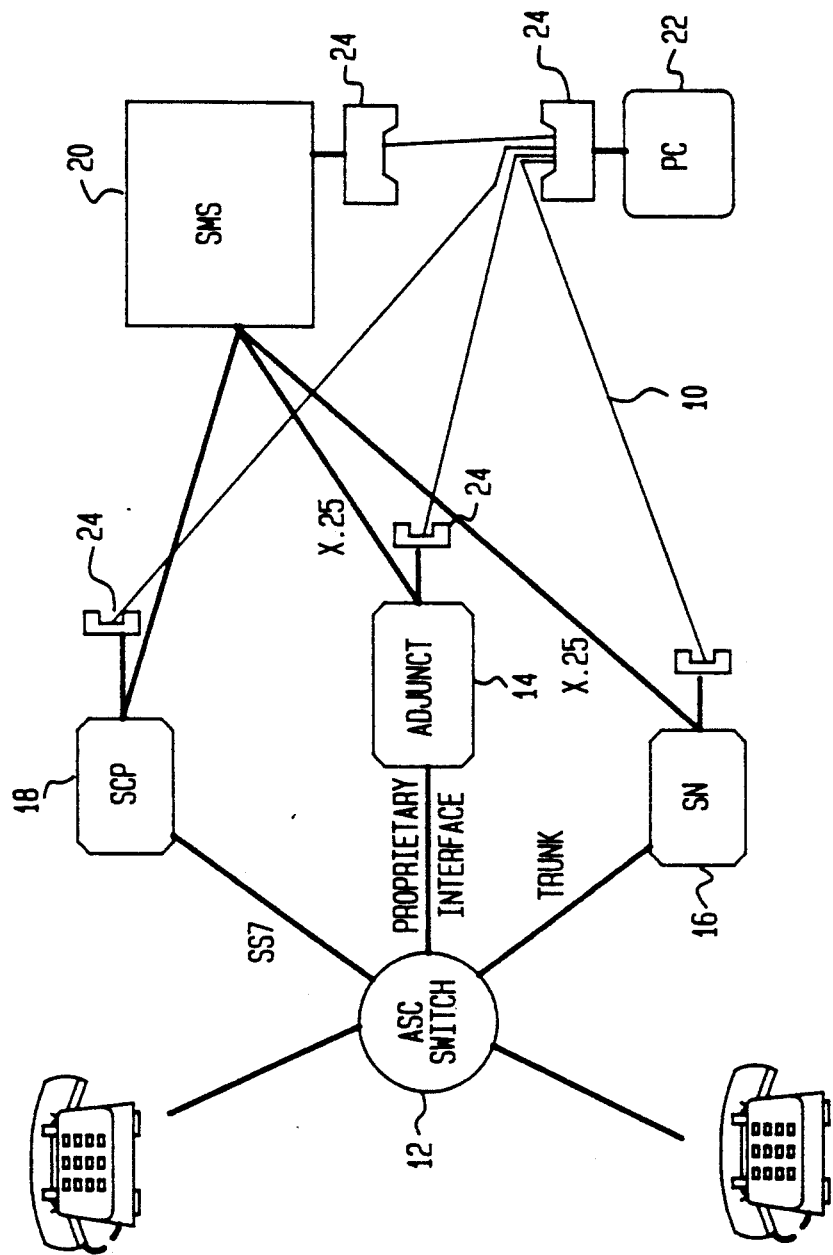

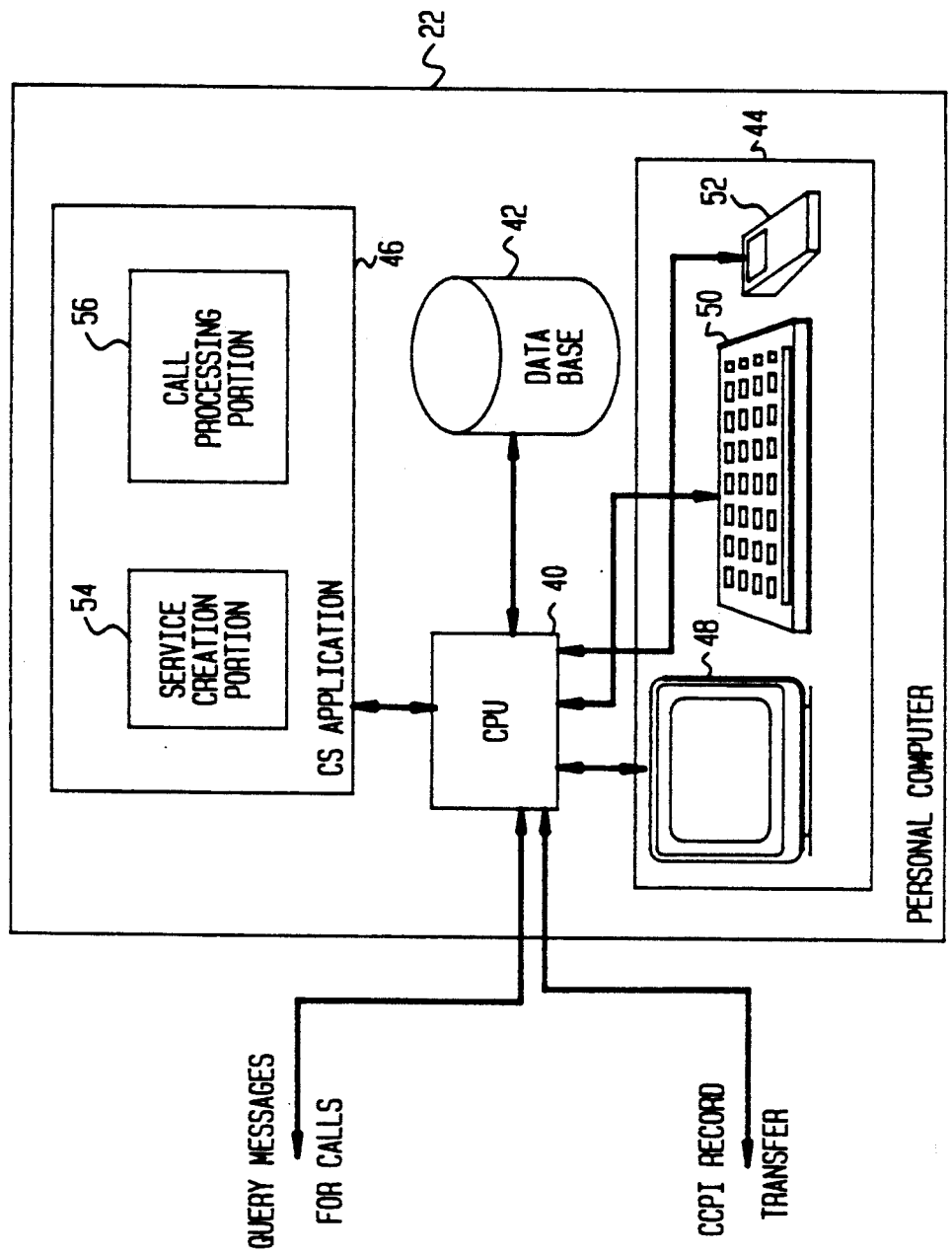

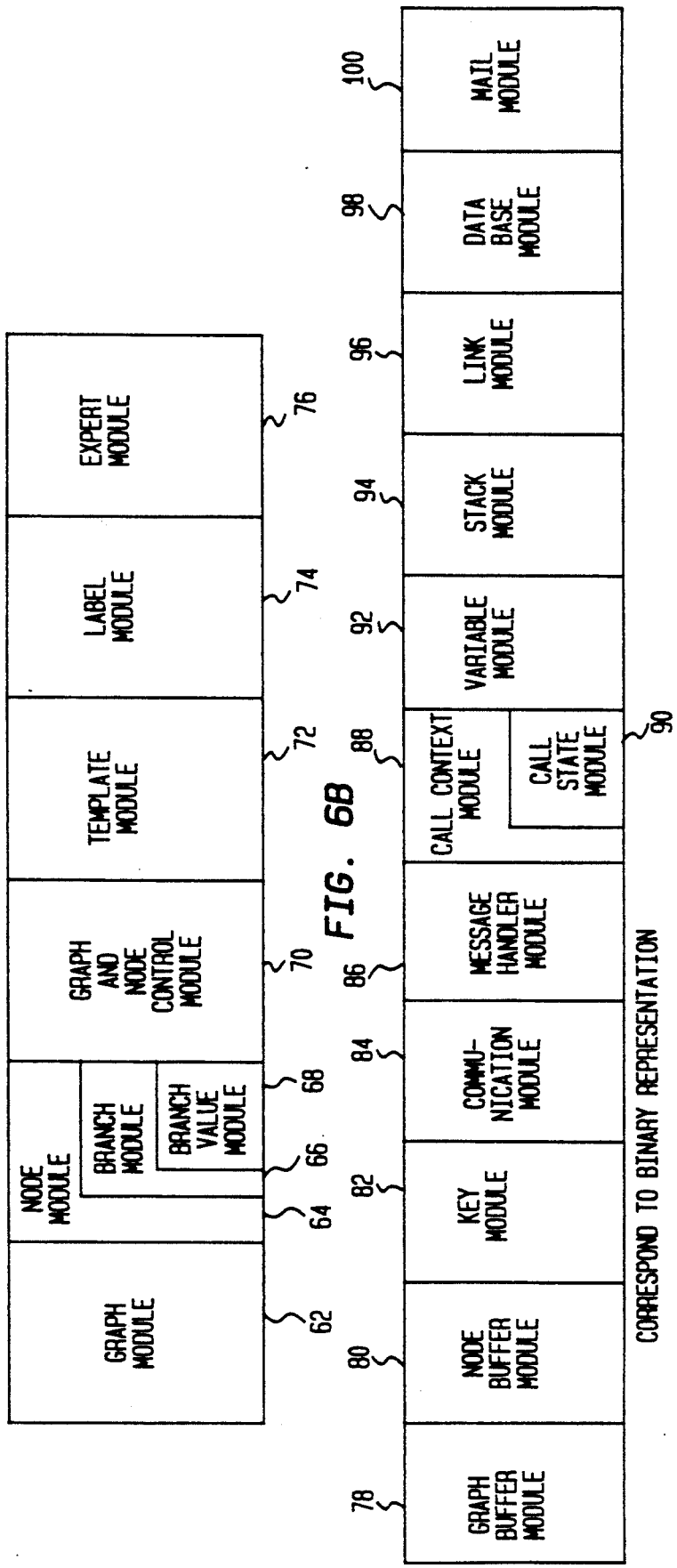

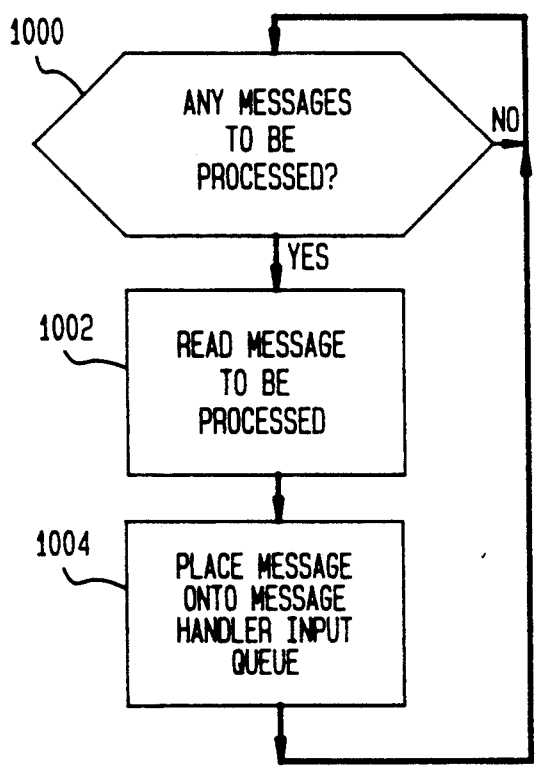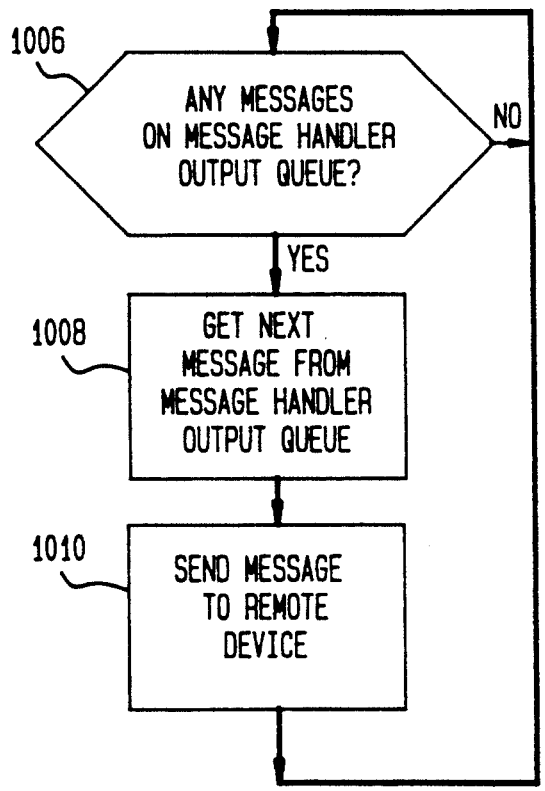

SYSTEMS AND PROCESSES FOR PROVIDING MULTIPLE INTERFACES FOR TELEPHONE SERVICES

CROSS REFERENCE TO RELATED APPLICATIONS

This application is related to U.S. patent application Ser. No. 629,371, entitled "Systems and Processes Providing Programmable or Customized Customer Telephone Information Services," by Ely et al., U.S. patent application Ser. No. 629,373, entitled "Systems and Processes Specifying Customized Customer Telecommunication Services Using a Graphical Interface," by Ely et al., U.S. patent application Ser. No 529,390, entitled "Systems and Processes for Visualizing Execution of Customer Services," by Ely et al., U.S. patent application Ser. No. 629,389, entitled "Systems and Processes for Validating Customer Services," by Babson, and U.S. patent application Ser. No. 529,372, "Visual Programming of telephone Network Call Processing Logic," by B. N. Dickman et al., Case 1-1-1, all filed on the same day as this application.

BACKGROUND OF THE INVENTION

The present invention relates generally to the field of providing customized services, and more specifically to the problem of providing customized telephone services.

Implementing new telephone services has long been a problem for telephone companies. In today's advanced intelligent network ("AIN"), when a new service such as call waiting is developed, the economics of developing and implementing that service requires that the service be provided on a mass scale to as many customers as possible. Oftentimes, even if a service is desired by some customers, the service may never be implemented if that service cannot be mass marketed, or otherwise economically justified.

Telephone functions are presently provided to a customer by allowing that customer to select desired functions from a limited number of available services. This approach, which has been called programming a service, may leave many customers without desired functionality. For example, a customer who wants call waiting, but in a form slightly different from what is made generally available, may be told that his simple requests cannot be met.

Moreover, adding a new service to existing services creates significant problems due to possible interaction between the new and existing services. This creates additional obstacles to implementing new telephone services. For example, it is very possible that adding a new service, such as call waiting, may be incompatible in certain circumstances with an existing service, such as call transfer on busy. The usual solution to such interaction problems is to prevent both services from being used by the customer simultaneously. This, of course, limits the power of the new service.

Even when services are compatible, the conventional approach to providing customer services often forces a customer desiring a few limited features of several services to subscribe to several complete services. This is both costly and inefficient.

U.S. Pat. No. 4,611,094 (Asmuth et al.) teaches a method for defining an individual service for an individual customer. In that method, a telephone service is performed by a customer program which a customer defines using conventional program sequences. The program may be executed on the customer's host computer external to the telephone network when a call is processed. Although this method permits a new individual customer service to be configured without modifying the telephone network switching system software, the applicability of such a method is extremely limited. For example, this method cannot implement a new service on a network wide basis because each service is specific to the customer who designed it. This method also requires every customer who uses the service to have an individual host computer external to the telephone system. Furthermore, designing a service requires a computer programmer to write program sequences to define the service, and a programer must make changes to the program sequences to modify the service.

Although the attempt at customization in Asmuth et al is laudable, it highlights the problems which designers have faced in attempting to leave the conventional philosophy of programming a service. One problem is the hardware limitations. The software for developing a customized service for each user must be able to be used on different platforms so that the capability of designing services, as well as testing them, can be made available to as many users as possible.

In addition, the design of services cannot require standard programming because the cost and difficulty of providing such customization will make it too expensive to employ.

Accordingly, it is desirable to have a system capable of providing multi-function, single services that can be implemented and used economically.

Another desirable feature for such a system would be a mechanism for designing multi-function, single services easily and without need for knowledge of the underlying system.

Yet another desirable feature would be easy transportability of the system, or of parts of the system, to other machines or devices.

Additional desires of the invention will be set forth in the description which follows, and in part will be apparent from the description, or may be learned by practice of the invention. The advantages of the invention may be realized and obtained by means of the instrumentalities and combinations particularly pointed out in the appended claims.

DISCLOSURE OF THE INVENTION

To achieve the foregoing desires, and in accordance with the purposes of the invention as embodied and broadly described herein, this invention provides a system which has different levels which provide different functions.

In particular, a data processing system for designing a procedure to direct a telephone network to provide requested services to a customer of the network, preferably comprises a display terminal for displaying a visual representation of the procedure; and a control device, coupled to the display terminal, for causing the display terminal to display the visual representation based upon multilevel data, the multilevel data including a graphical representation level containing display information for the visual representation; a data structure level containing data, organized in data structures, which correspond to the display information; and a code level to implement the requested services, the code level corresponding to the data in the data structures.

Also in accordance with the purposes of the invention as embodied and broadly described herein, this invention provides a method of storing a procedure in a data processing system to direct a telephone network to provide requested services to a customer of the network. Preferably, this method comprises the steps of: storing, in a graphical representation level, display information for the visual representation of the procedure; storing, in a data structure level, data organized in data structures, which correspond to the display information; and storing, in a code level, executable code to implement the requested services, the executable code corresponding to the data in the data structures.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings:

FIG. 2 is an example of a "form" customer interface;

FIG. 3 is a functional block diagram of the advanced intelligent network;

FIG. 4D is a functional block diagram of a personal computer in accordance with one embodiment of the present invention;

FIG. 6A is a schematic representation of program modules corresponding to an internal data structure of services in accordance with one embodiment of the present invention;

FIG. 6B is a schematic representation of program modules corresponding to an binary representation of services in accordance with one embodiment of the present invention;

FIGS. 63A and 63B are flow diagrams of a call processing operation of a COMMUNICATE module in accordance with one embodiment of the present invention;

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers.

The following description of the preferred implementations of the present invention is only exemplary of the invention. The present invention is not limited to these implementations, but may be realized by other implementations.

A. OVERVIEW

The present invention overcomes the disadvantages of conventional systems by providing to telephone services service programs customized to the desires of individual customers requesting individualized functionality. As used in this application, "customer" refers to the entity for which a service is provided, and "user" or "operator" refers to the person using the system to create, test or modify the service. The user and customer may be the same, but they need not be. Although the following description focuses on telephone services, the invention has broader uses and is not necessarily limited to telephone services in all instances.

1. Software Components

The preferred embodiment of the present invention includes a customized services ("CS") application to create and, in certain circumstances, execute each customer's service procedure or program. Each customer's service program is stored as a record or a series of records of customized call processing information (CCPI) in a database. The CS application and the CCPI are the principal software components of the preferred implementation.

The CS application preferably includes a programming interface which permits an operator to use the CS application to create various user interfaces to obtain information, directly or indirectly, in a manner which is relatively easy to use. The information is used to generate the CCPI records automatically.

User interfaces can be tailored to the skill level of an operator, which can be the customer, using the CS application to create customers service programs, to the specific service to be provided, or to the specific hardware on which the service will be created, such as bit map graphics, terminal displays or DTMF telephones.

Figure 1:
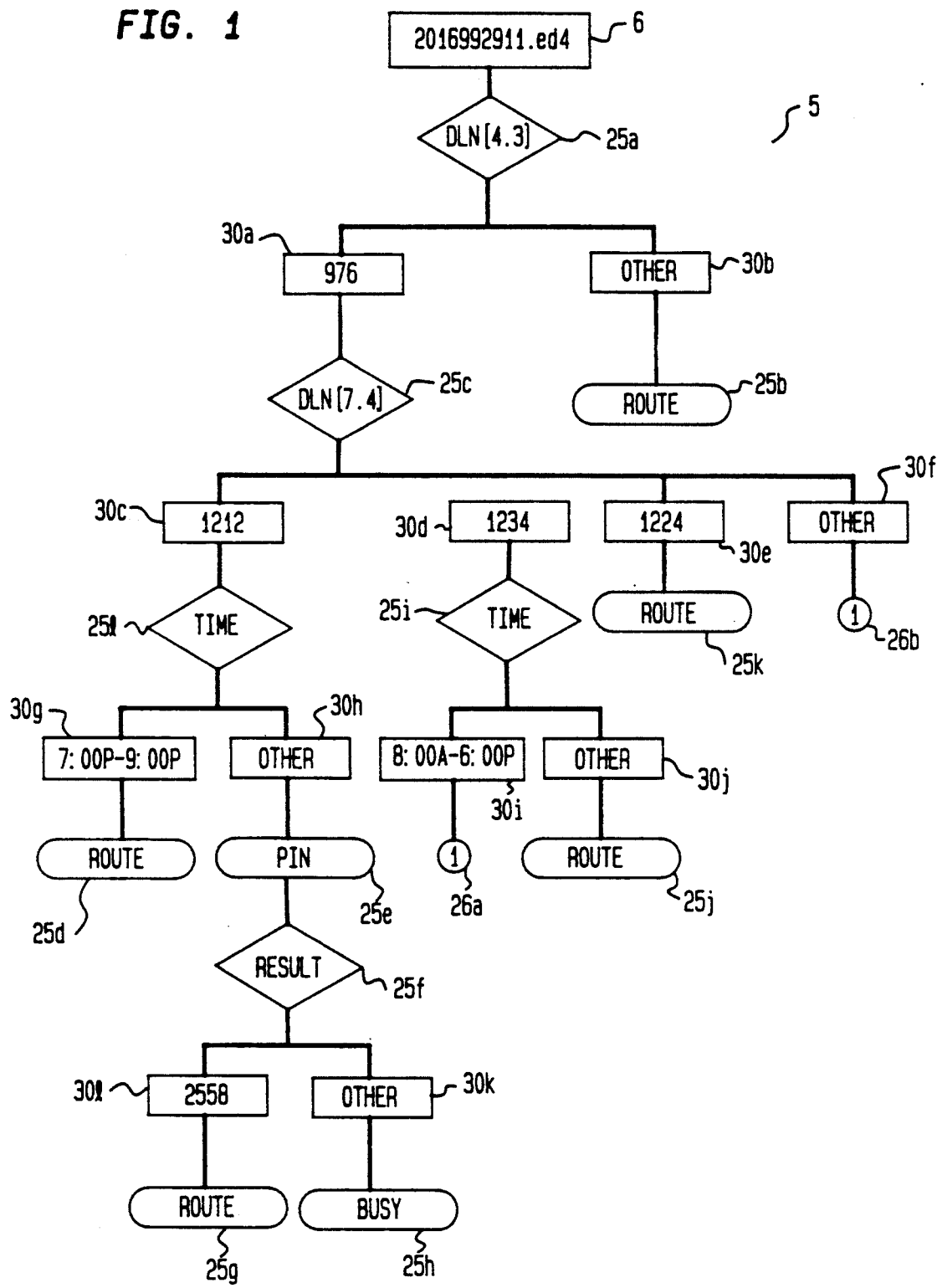
FIG. 1 is an example of a "graph" customer interface.

FIG. 1 illustrates an example of a customer interface, shown as a graph 5, providing a graphical representation of a CCPI record created on a graphics workstation display. The CCPI record corresponding to this graph provides a service for a customer identified via a "key" in rectangle 6. The specific service provided by the CCPI record for graph 5 is the screening of calls from the telephone having the phone number (201) 699-2911. The details of how a CCPI record provides such a service to various phone numbers having a "976" extension will be explained in detail below.

In FIG. 1 the programming interface of the CS application has been used to provide a graphic user interface to allow construction of graph 5. The present invention, however is not limited only to implementations requiring a graphic user interface. If, for example, the interface used to build graph 5 is too resource intensive to allow efficient preparation of similar graphs for every subscriber, an alternative interface can be selected.

FIG. 2 shows a form user interface 8 which can be used to provide the same "976" call screening service as graph 5 does. Form interface 8 requires a customer or operator to insert only a small amount of information, and thus requires less time and skill than creating graph 5. The programming interface for providing "976" form interface automatically translates the information input by the operator into a CCPI record corresponding to the desired service. Using a different user interface, an operator can display this same CCPI record or records in a different form.

In the preferred implementation of the present invention, the CCPI record or records corresponding to a service are created in a creation environment of the CS application and are executed during call processing in a call processing environment of the CS application. As used herein, "call processing" refers to the acts of responding to a message or query from a switch or switch simulator. A switch is a piece of telephone equipment which receives and routes telephone calls. As explained below, CCPI records may be executed in either the creation environment or the call processing environment.

2. Hardware Alternatives

In a preferred embodiment, the present invention is implemented in the advanced intelligent network (AIN). FIG. 3 is a block diagram of the AIN. The AIN comprises ASC AIN switching capabilities switch ("ASC switch") 12, adjunct 14, service node (SN) 16, service control point (SCP) 18 and service management system (SMS) 20. The present invention can also be implemented on a personal computer (PC) 22 connected to SMS 20, SCP 18, adjunct 14, or SN 16 via modems 24.

In a preferred embodiment, the CS application can be executed on SMS 20, SCP 18, adjunct 14, SN 16 or PC 22. As will be explained below in the discussion of the different implementations, the functionality of the CS application may differ depending upon which component executes the CS application.

In the preferred embodiment of the present invention, the CS application provides for both the creation of a CCPI record (service creation) through an operator interface, and for the execution of CCPI records during call processing. However, the CS application can provide only the creation or the execution of CCPI records.

FIGS. 4A-4D illustrate different network elements which can execute the CS applications.

Figure 4A:
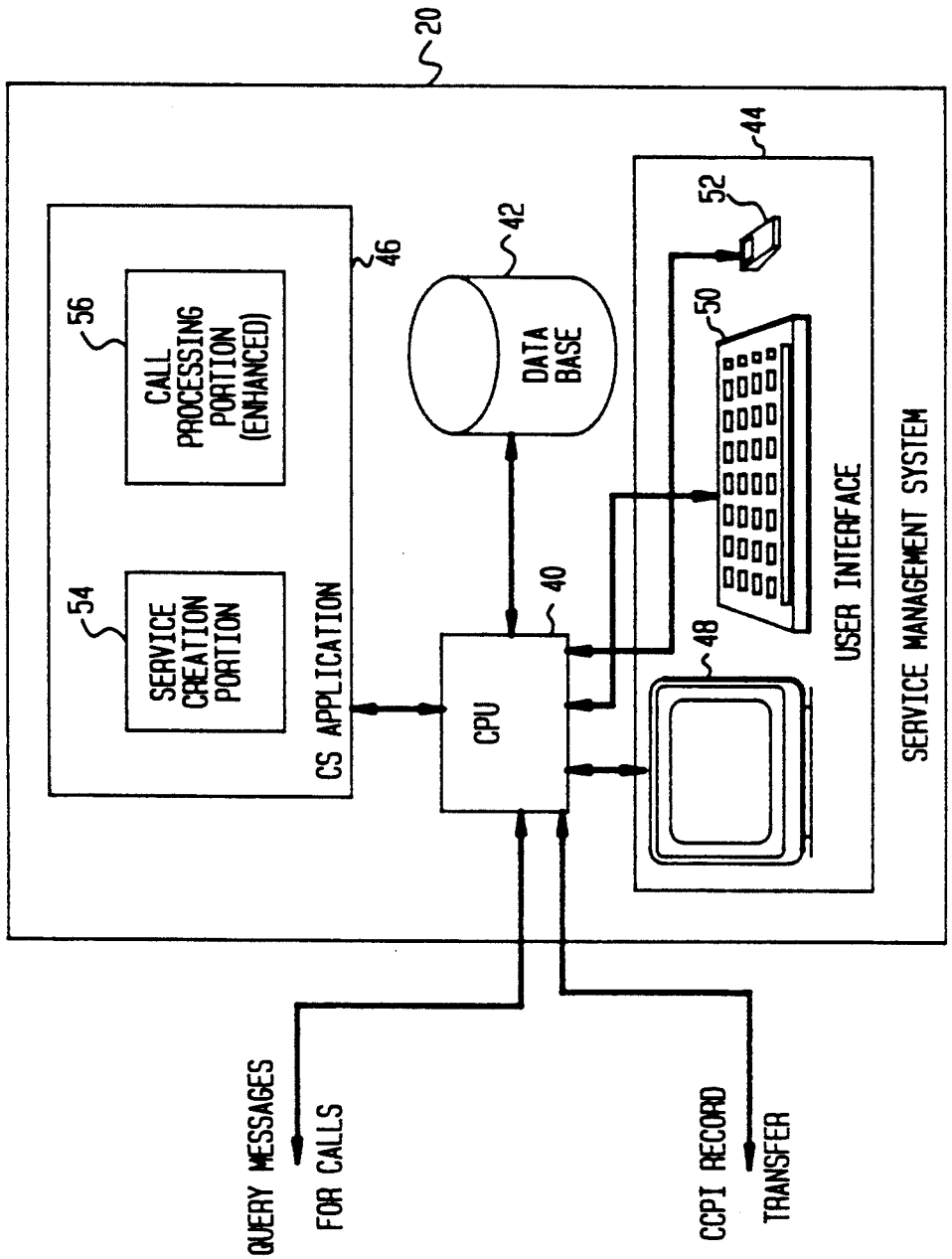
FIG. 4A is a functional block diagram of a service management system in accordance with one embodiment of the present invention.

FIG. 4A is a functional block diagram of SMS 20. SMS 20 comprises CPU 40, database 42, operator interface 44 and CS application 46. Operator interface 44 preferably comprises display 48, keyboard 50 and mouse 52, each connected to CPU 40. CS application 46 includes service creation portion 54 and call processing portion 56. A CCPI record can be created at SMS 20 via operator interface 44 and can also be used by SMS 20 to process calls input to CPU 40 via any number of sources such as a network switch simulator or a dedicated testing switch (not shown).

CS application 46 could contain only service creation portion 54 for creating a CCPI record at SMS 20. In such a configuration, a CCPI record created at SMS 20 would be transferred to SCP 18 (FIG. 4B) for execution during real time call processing.

Alternatively, CS application 46 in FIG. 4A may comprise only call processing portion 56 for processing calls in a simulated environment using CCPI records created elsewhere and stored in database 42. In this arrangement, SMS 20 would only be used for testing, not service creation. Further, as discussed in greater detail below, call processing portion 56 provided in SMS 20 is preferably an enhanced version which permits a visual indication of the execution of a CCPI record on a graph displayed to an operator.

Figure 4B:
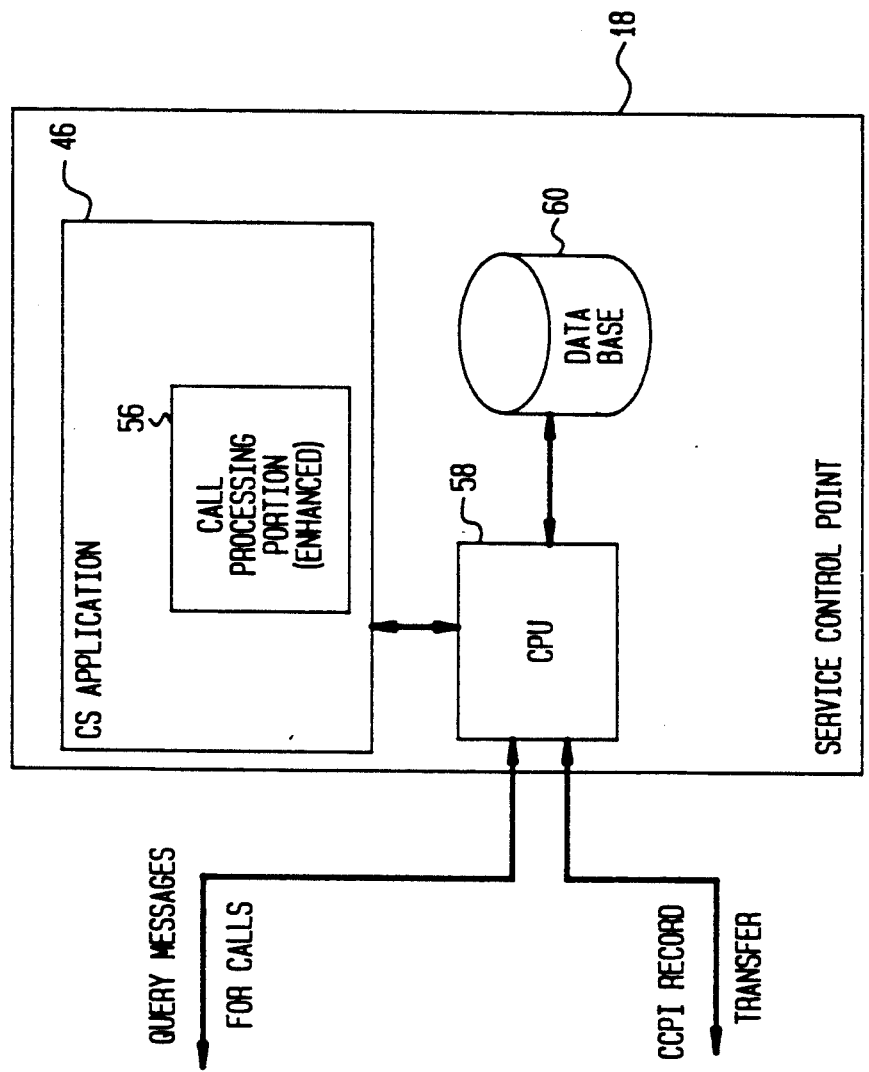
FIG. 4B is a functional block diagram of a service control point in accordance with one embodiment of the present invention.

FIG. 4B is a preferred embodiment of a functional block diagram implementing CS application 46 in SCP 18. SCP 18 comprises CPU 58, database 60, and CS application 46. In FIG. 4B, CS application 46 comprises only call processing portion 56. This is because SCP 18 typically provides no operator interface 44 (FIG. 4A), therefore, creation of a CCPI record is not usually performed at SCP 18.

Figure 4C:
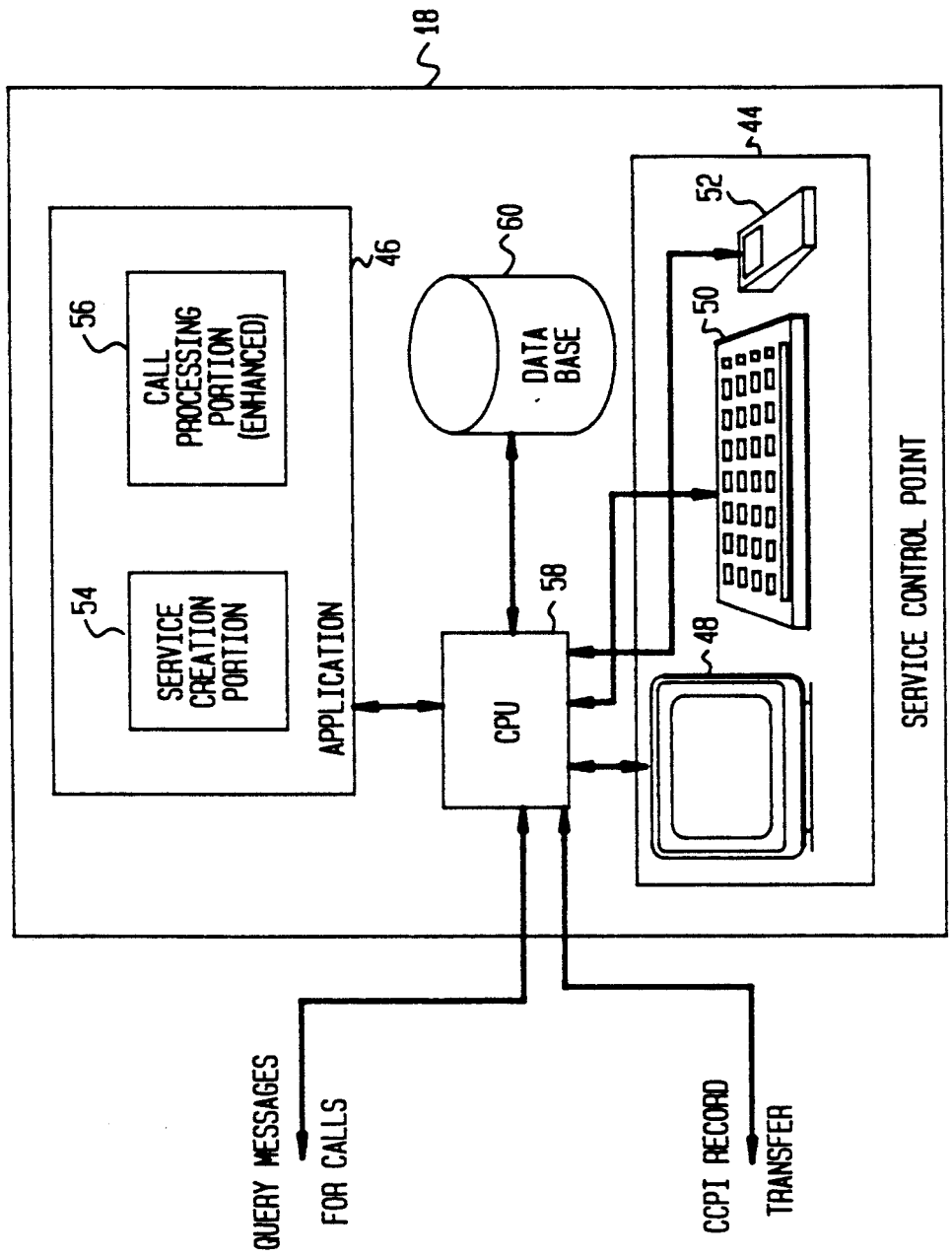
FIG. 4C is a functional block diagram of a service control point in accordance with another embodiment of the present invention.

If, as in FIG. 4C, operator interface 44 is provided at SCP 18, CS application 46 may include service creation portion 54 to permit creation of a CCPI record at SCP 18. In FIGS. 4B and 4C, call processing portion 56 processes messages provided by ASC switch 12 (FIG. 2) by executing the CCPI records stored in database 60.

If operator interface 44 is provided in SCP 18, call processing portion 56 would be an enhanced version of call processing portion 56 to permit a visual indication of the execution of the CCPI record at SCP 18. As described in more detail below, if an enhanced version of call processing portion 56 is used in SCP 18 without interface 44, a visual indication of the execution of the CCPI record can be transferred to another environment which provides operator interface 44 and service creation portion 54 for displaying the execution path of a CCPI record on the graph corresponding to the CCPI record.

Implementation of CS application 46 in either adjunct 14 or SN 16 is provided in a manner similar to implementation of CS application 46 in SCP 18.

As shown in FIG. 4D, implementation of CS application in PC 22 is similar to that for SMS 20 in FIG. 4A. CS application 46 in PC 22 preferably includes service creation portion 54 and call processing portion 56. Alternatively, CS application 46 may include either service creation portion 54 or call processing portion 56 to perform either of the associated functions, with the functions which are not being performed being provided in an alternative environment. Call processing portion 56 may be an enhanced version to permit a visual indication of the execution of a CCPI record as PC 22.

B. ARCHITECTURE OF THE SOFTWARE

The displayed representation of a CCPI record is extremely useful in that it permits an operator or a customer to customize, create and understand the desired telephone service. The displayed representation is merely an aid to the understanding of the design of the corresponding service; however, the displayed representation cannot be interpreted directly by the call processing environment. The displayed representation of the CCPI record must therefore be translated into a binary representation which can be stored and used to process calls in a call processing environment.

Figure 5:
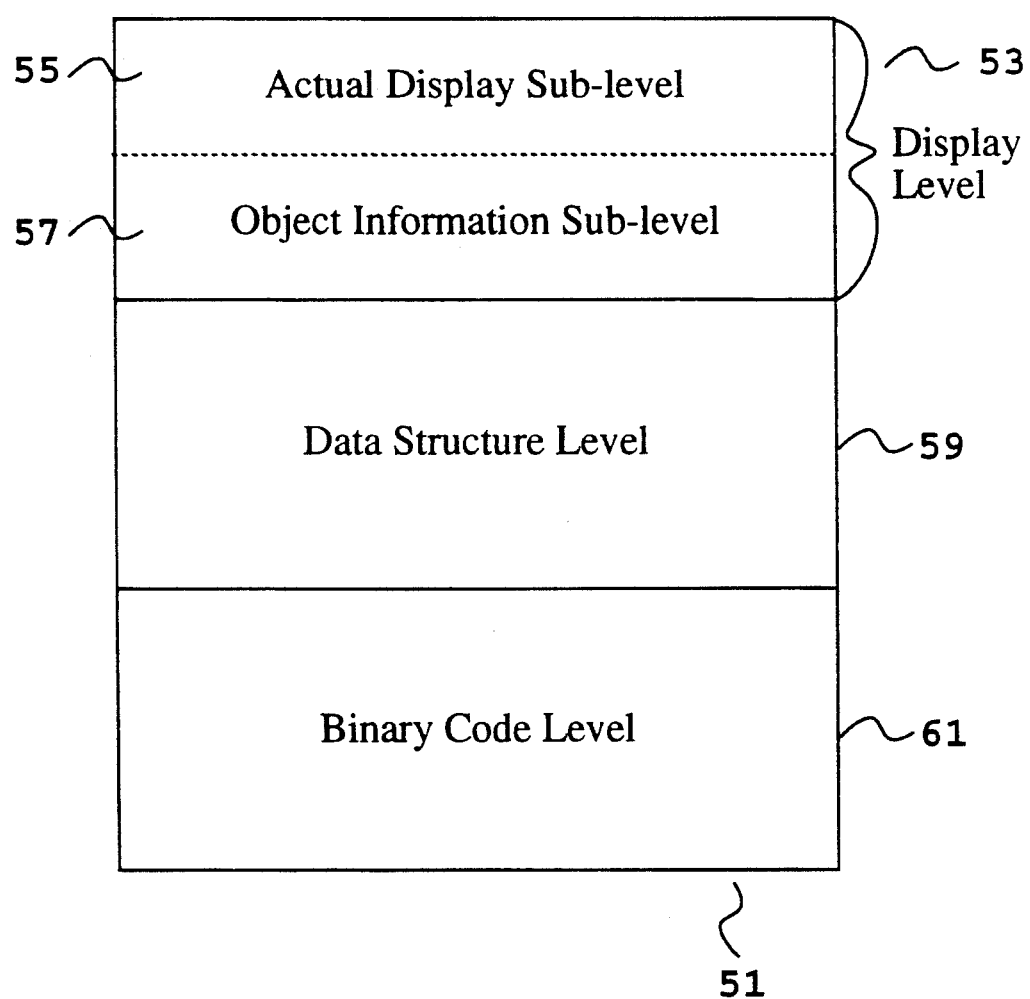
FIG. 5 is a schematic representation of three software levels corresponding to three representations of services in accordance with, one embodiment of the present invention.

In the preferred implementation of the present invention, the displayed representation of the CCPI record is first translated into an internal representation comprising data structures and pointers representing the CCPI record, and eventually into the binary representation. FIG. 5 shows this schematically.

Software 51 has three levels corresponding to three representations of the CCPI record. Display level 53 is used to provide the displayed representation of a CCPI record, such as that shown in FIGS. 1 and 2. Level 53 preferably contains two sublevels: sublevel 55 and level 57. Sublevel 55 is used to form the actual display for the corresponding display terminal. Sublevel 57 contains information on "objects" used to form the displayed representation. For example, in the display shown in FIG. 1, the objects may refer to the diamonds and rectangles used to form graph 5. The division of level 53 into sublevels aids in porting software 51 to different platforms. Preferably, the software at level 53 is written in the IBM C-2 1.1. language, designed according to an object-oriented design methodology. The program is also preferably written to the ANSI C standard so that it will compile under C++.

Data structure level 59 contains an internal representation of the service preferably stored in data structures. Details of the data structures are not necessary to the understanding of this invention, however, it should be noted that the software at level 59 is less machine dependent than that at level 53 because the software at level 59 can be used with many different types of displays, e.g., forms or graphs, and many different types of hardware.

The actual binary representation of the service is at binary code level 61. Level 61 is the only representation stored for execution in the preferred embodiment. The binary representation is the most machine independent.

When a CCPI record is stored to a database, such as database 42 in FIG. 4A, or retrieved from a database, modules corresponding to the binary representation of the CCPI record translate the internal graphical representation of the CCPI record into the binary representation of the CCPI record. Each representation of a CCPI record is manipulated by a set of modules in the software. A "module" consists of a set of subroutines which are used to manipulate some physical or conceptual object.

The "module" concept is at the heart of the object-oriented design in the preferred implementation of this invention, although the module is not necessary to carry out the invention in all of the implementations. A set of modules is associated with each representation of a CCPI record. The set of modules associated with the binary representation of a CCPI record (level 61 in FIG. 5) is responsible for storing and retrieving the CCPI record to and from the database. This set of modules also executes the instructions of the CCPI record.

A set of modules associated with the internal data structure representation of a CCPI record (level 59 in FIG. 5) is responsible for manipulating the instructions and structure of the CCPI record. These modules are also responsible for translating the binary representation of level 61 into the internal data structure representation of level 59.

A set of modules associated with the displayed representation of the CCPI record (level 53 in FIG. 5) is responsible for translating the internal data structure representation into the displayed representation and presenting and collecting information to and from an operator. These modules would generally be written by an individual (such as a programmer) and use the programming interface (i.e., the interface between levels 53 and 59) of the modules corresponding to the internal data structure representation of the CCPI record to create new interfaces for customer services.

1. Modules Corresponding to Internal Data Structure Representation Level

FIG. 6A shows the preferred modules for level 59. GRAPH module 62 organizes and maintains a set of nodes in a graph. Important operations of this module include translating the internal data structure representation into the binary representation and visa versa, as well as adding and deleting nodes from the graph in the internal data structure representation.

NODE module 64 manages a single CCPI record instruction, and modifies the parameters of a node.

Included in NODE module 64 is BRANCH module 66. Branch module 66 manages each branch of a DECISION node. DECISION nodes are explained in greater detail below.

Included in each BRANCH module 66 is BRANCH VALUE module 68. BRANCH VALUE module 68 manages every value in each branch of a DECISION node.

GRAPH AND NODE CONTROL module 70 represents a higher level abstraction of nodes and graphs, and provides mechanisms for adding, editing and deleting nodes from a graph.

TEMPLATE module 72 provides a template for creating new nodes. TEMPLATE module 72 evaluates a template to determine what information is needed to create a node, and to generate a node once the information is complete.

LABEL module 74 provides the mechanisms for parsing and generating string objects.

EXPERT module 76 manages an expert system, translates the internal data structure representation of a CCPI record into schemas used by an expert system (explained below), and helps evaluate responses received from the expert system.

2. Modules Corresponding to Binary Representation Level

FIG. 6B shows the preferred modules for level 61 shown in FIG. 5.

GRAPH BUFFER module 78 manages the binary representation of the CCPI records as shown in FIG. 5. GRAPH BUFFER module 78 also orchestrates the execution of the CCPI records.

NODE BUFFER module 80 manages the binary representation of a single instruction in a CCPI record.

KEY module 82 manages the data structures that stores "keys" for the CCPI records. Keys are used to access the records directly. Important operations include comparing the records to externally provided keys.

COMMUNICATION module 84 manages communication ports which transfer query messages and CCPI records between AIN network elements. COMMUNICATION module 84 facilitates reading from and writing to the ports.

MESSAGE HANDLER module 86 represents a device for passing messages into and out of call processing routines. In particular, MESSAGE HANDLER modules 86 converts messages into call contexts and converts call contexts into messages. Call contexts are the data structures for managing the calls.

CALL CONTEXT module 88 manages the execution of CCPI records. Included in CALL CONTEXT module 88 is CALL STATE module 90 which manages the information associated with each CCPI record being executed during call processing.

VARIABLE module 92 manages call variables associated with the execution of a CCPI record.

STACK module 94 provides conventional stack functions, such as push and pop operations.

LINK module 96 provides conventional linked list functions.

DATABASE module 98 manages a database, and provides mechanisms for reading, writing, opening, closing and updating a database.

MAIL module 100 sends and retrieves CCPI records between the AIN network elements identified in FIG. 3. The sending and receiving of records preferably uses conventional data transfer techniques.

3. Modules for Displayed Representation Level

As explained above, the modules corresponding to the displayed representation of CCPI records will generally be written by an individual (such as a programmer) and use the programming interface of the modules corresponding to the internal representation of the CCPI records to create new services. These modules generate the displayed interface on the display screen and present information to and collect information from an operator creating a new service.

Figure 6C:
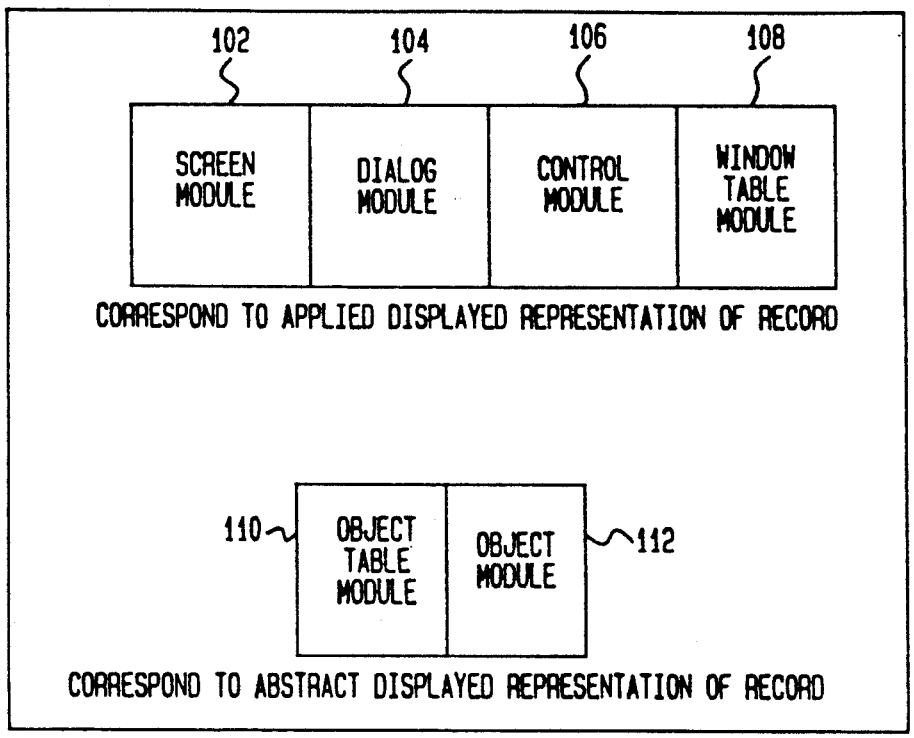
FIG. 6C is a schematic representation of program modules corresponding to a displayed representation of services in "graph" form in accordance with one embodiment of the present invention.

FIG. 6C illustrates a preferred set of modules corresponding to the displayed representation of a CCPI record for providing the flow chart styled interface ("graph interface") such as graph 5 shown in FIG. 1.

Figure 6D:
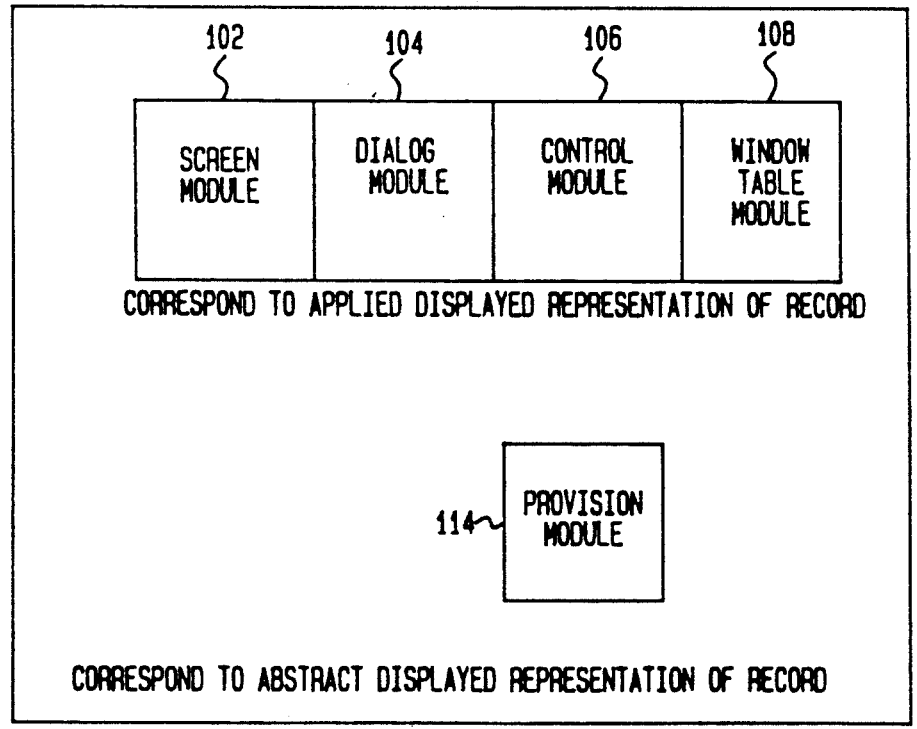
FIG. 6D is a schematic representation of program modules corresponding to a displayed representation of services in "form" form in accordance with one embodiment of the present invention.

FIG. 6D illustrates a preferred set of modules corresponding to the displayed representation a CCPI record for providing a form interface such as the "976" call screening form interface shown in FIG. 2. In both displayed representations, the modules are preferably divided to correspond to an applied displayed representation of the CCPI record and an abstract displayed representation of the CCPI record. An applied displayed representation is the visual image displayed on the screen, while the abstract displayed representation defines the images to be displayed and coordinates them onto an abstract plane.

The modules corresponding to the applied displayed representation of a CCPI record are identical for both the graph interface and the form interface.

SCREEN module 102 draws the displayed interface onto the screen and clears the screen.

DIALOG module 104 manages the dialog boxes which can be displayed to the operator. Important operations for this module include clearing, presenting and retrieving information from the operator via dialog boxes.

CONTROL module 106 manages the state of the interface, including mouse clicks and menu selections made by the operator. The CONTROL module also handles events generated from external communication ports.

WINDOW TABLE module 108 manages information about each graph editing pad window, including which windows are open or closed and which CCPI records are displayed in which windows. Important operations for this module include correlating a call context with a window and setting and storing parameters for each graph editing pad window.

FIG. 6C illustrates the OBJECT TABLE module 110 and OBJECT module 112. OBJECT TABLE module 110 manages the collection of objects used in the abstract displayed representation of a CCPI record. Important operations of the OBJECT TABLE module 110 include translating the internal data structure representation into the abstract displayed representation, and adding an object to, as well as deleting an object from, an object table (not shown).

OBJECT module 112 manages information corresponding to an object or figure to be drawn on a display screen. OBJECT module 112 sets parameters, such as location, size and shape for each object or figure to be drawn on the screen.

FIG. 6D illustrates a preferred module corresponding to the abstract displayed representation of a CCPI record for providing a form interface, such as the "976" call screening interface shown in FIG. 2.

PROVISION module 114 translates the internal data structure representation of a CCPI record into an abstract representation corresponding to the form interface, and interfaces with the program interface at the modules corresponding to the internal data structure of a CCPI record to provide for the form interface.

In an alternative embodiment, module 114 may be included in with the graph interface modules of FIG. 6C. This would allow CCPI records to be displayed as either the "976" call screening form shown in FIG. 2, or the graph corresponding to this service shown in FIG. 1.

As explained above, each display interface creates and displays a set of CCPI records. This set corresponds to a service concept which the interface is designed to support. If a CCPI record is created by one interface and falls within the set of CCPI records that can be created by a different interface, that CCPI records can be displayed by both interfaces.

C. SERVICE CREATION USING GRAPH INTERFACE

Prior to discussing the creation of a service, an explanation of the operation of a service will be given as background. Reference will be made to graph 5 in FIG. 1 for the explanation.

In FIG. 1, rectangle 6 contains the "name" or "key" for graph 5. This "key" identifies whether the graph controls calls made from the phone number identified in the rectangle 6 (identified by the ".e04" suffix) or calls being made to the phone number identified in rectangle 6 (identified by the ".e05" suffix).

The remainder of graph 5 comprises a plurality of nodes 25, decision boxes 30, and branches (not labelled) between the nodes 25 and decision boxes 30. Each node 25 represents a high level instruction in the CCPI record corresponding to the graph. Decision boxes 30 correspond to decision nodes (nodes 25a and 25i) and identify alternative execution paths depending on the result provided by the corresponding decision node.

Graph 5 corresponds to a CCPI record used to call process a phone call being made from phone number (201) 699-2911. The CCPI record corresponding to graph 5 screens from the phone number (201) 699-2911 all calls which the customer does not wish to be completed. For example, telephone calls made to the phone number "976-1212" are routed between the hours of 7:00 p.m. to 9:00 p.m., as are any phone calls made to the number "976-1234" during the hours of 6:00 p.m. to 8:00 a.m. and any phone calls made to the number "976-1224" at any time. Calls to any other number with the "976" exchange, calls to "976-1234" between 8:00 a.m. and 6:00 p.m., and calls to "976-1212" between 9:00 p.m. and 7:00 a.m. are subject to PIN (Personal Identification Number) override. If the caller supplies the PIN of 2558, the call is routed. Otherwise, a busy signal is produced.

This service is provided for by graph 5 as follows. Initially, decision node 25a checks the NXX (i.e., fourth, fifth and sixth digits of the phone number)(the exchange). Decision boxes 30a and 30b identify the two decision possibilities which require separate attention. If the call is not a "976" exchange (other) the call is routed by node 25b.

If the call is a "976" exchange, node 25c checks the last four digits (the extension) at node 25c. If the last four digits are "1212" (decision box 30c) node 25l checks the time of day. If the call is placed between the hours of 7:00 p.m. and 9:00 p.m., the call is routed (decision box 30g and node 25d).

If the call is placed any other time of the day (decision box 30h), the call is to be prevented unless the proper PIN is provided. Node 25e prompts the caller to input a PIN. Node 25f checks the result. If the caller inputs PIN "2558" (decision box 30e), the call is routed by node 25g. If the caller inputs any other PIN (decision box 30k), node 25h provides the caller with a busy signal.

If the last four digits of the phone number being called are "1234" (decision box 30l) node 25i checks the time. If the call is being placed between the hours of 8:00 a.m. and 6:00 p.m. (decision box 30i), the PIN operation is again performed beginning at node 25e. This is illustrated in FIG. 1 by the circle 26a which contains a numeral 1. Note that the PIN node 25e has a "number 1:" next to it. This indicates that the graph continues execution starting with that node. If the call is being placed at any other time of day (decision box 30j), the call is routed by node 25j.

If the last four digits of the phone number being called are "1224" (decision box 30e), the call is routed by node 25k.

If the last four digits of the phone number being called are something other than "1212," "1234," "1224" (decision box 30f), the PIN operation is repeated, as indicated by the circle 26b.

With this explanation of graph 5, the steps of graph creation and editing can be addressed. Creation and editing of a graph, such as graph 5, preferably involves windows and menus.

1. Menus

Figure 7:
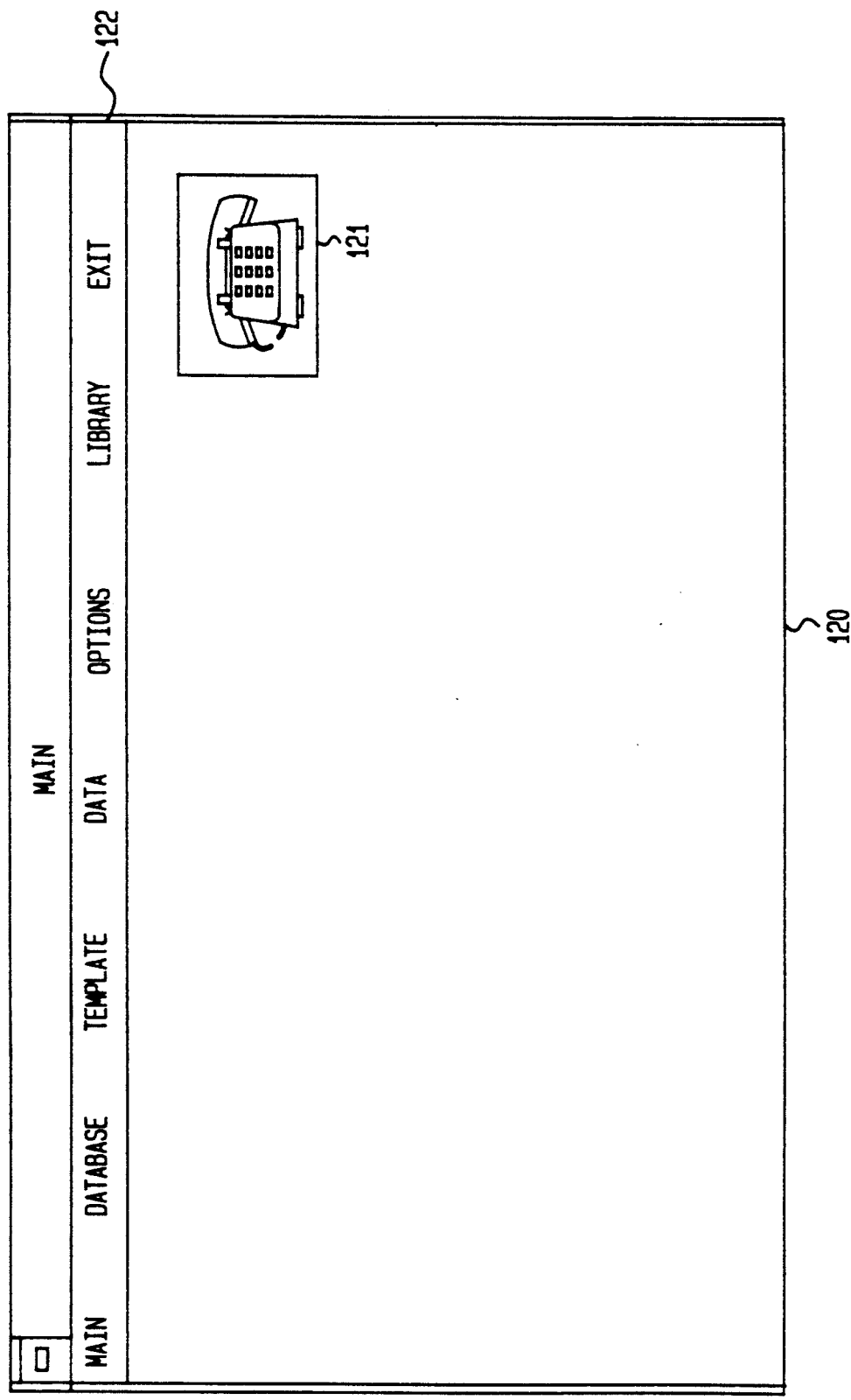
FIG. 7 illustrates a MAIN operator interface window in accordance with one embodiment of the present invention.

FIG. 7 represents operator interface window 120. Main window 120 comprises a menu bar 122 identifying seven menus: MAIN, DATABASE, TEMPLATE, DATA, OPTIONS, LIBRARY and EXIT. An operator "clicks" on any of the menu options to select a desired menu. The "remote" window 121 shown inside 120 is optional and will be described in detail below.

Figure 8:
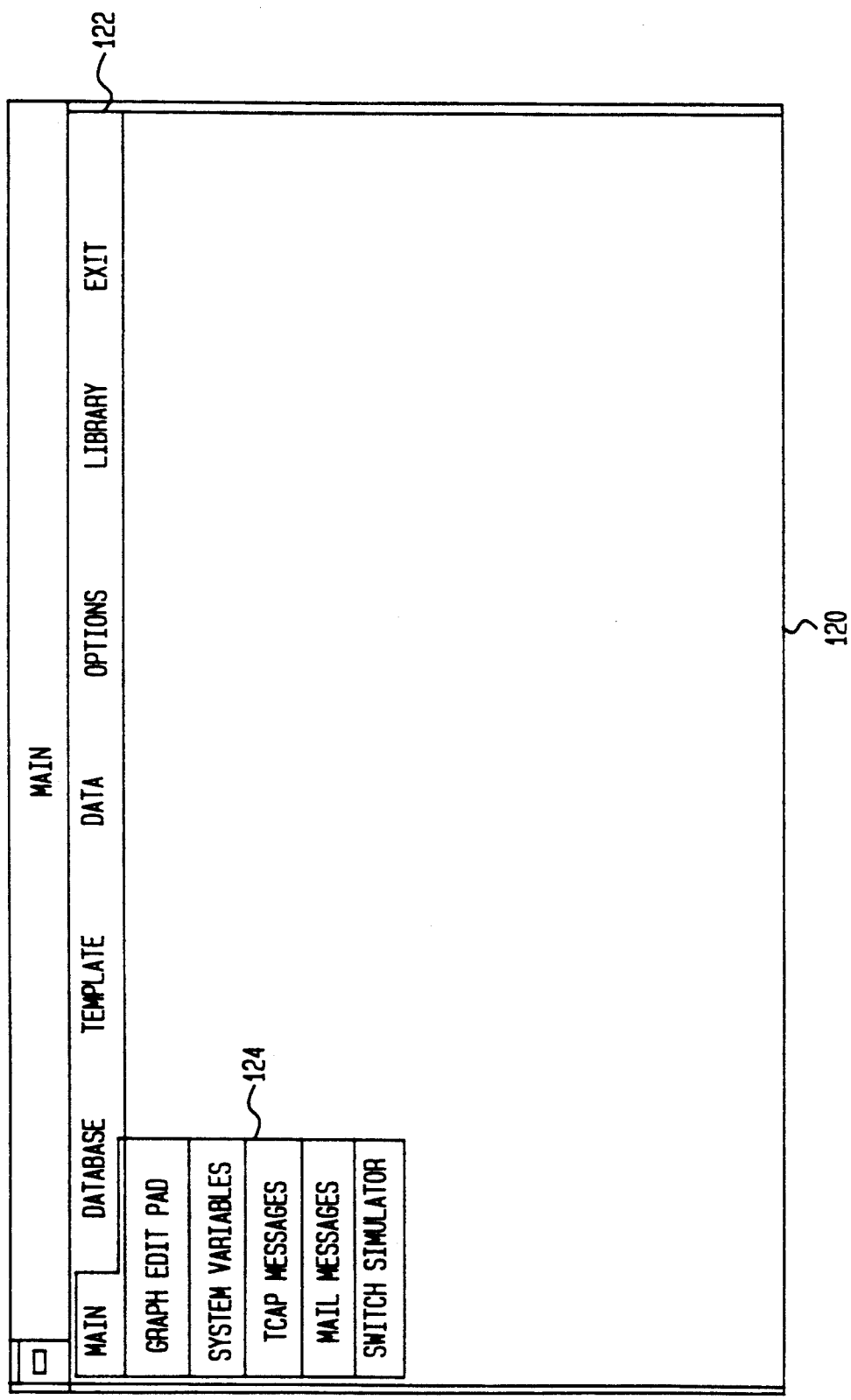
FIG. 8 illustrates a MAIN operator interface window, as well as the options for the MAIN menu selection in accordance with one embodiment of the present invention.

FIG. 8 is a display of the main operator interface window 120 showing the options 124 for the MAIN menu. These options include: GRAPH EDIT PAD, SYSTEM VARIABLES, TCAP MESSAGES, MAIL MESSAGES and SWITCH SIMULATOR. The GRAPH EDIT PAD option opens a GRAPH EDIT PAD window which is used to create, edit and save graphs.

Figure 9:
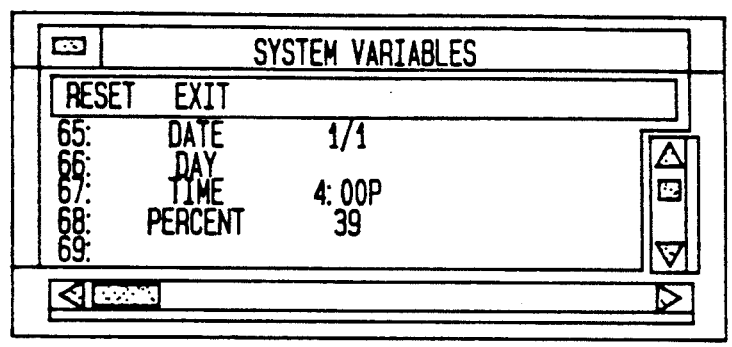
FIG. 9 illustrates a system variables dialog box in accordance with one embodiment of the present invention.

The SYSTEM VARIABLES option opens a system variable window, as shown in FIG. 9, which displays the call variables of the operating environment, such as time, day and date. From this window, the operator can change the values of the system call variables.

Figure 10:
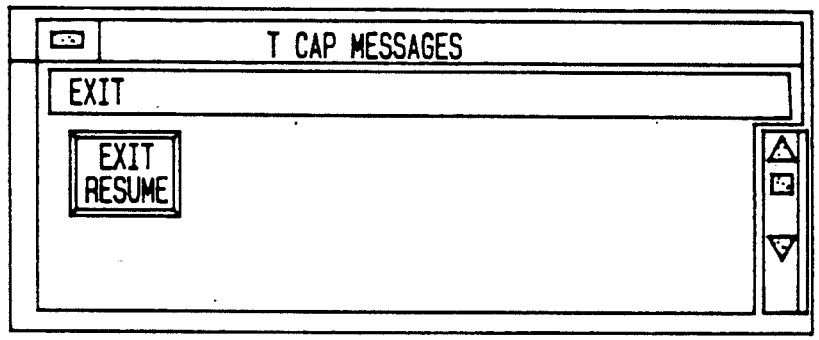
FIG. 10 illustrates a Tcap messages dialog box in accordance with one embodiment of the present invention.

The TCAP MESSAGE option opens the TCAP MESSAGE window as shown in FIG. 10. This window displays the query messages from a switch or switch simulator, not shown in FIG. 10.

The MAIL MESSAGES option opens a MAIL MESSAGE window (similar to the TCAP message window, therefore, not shown) which displays the messages associated with the exchange of CCPI records to other devices in the AIN network. The SWITCH SIMULATOR option opens a SWITCH SIMULATOR window (not shown) so that the operator can generate queries into the application for testing CCPI records.

Figure 11:
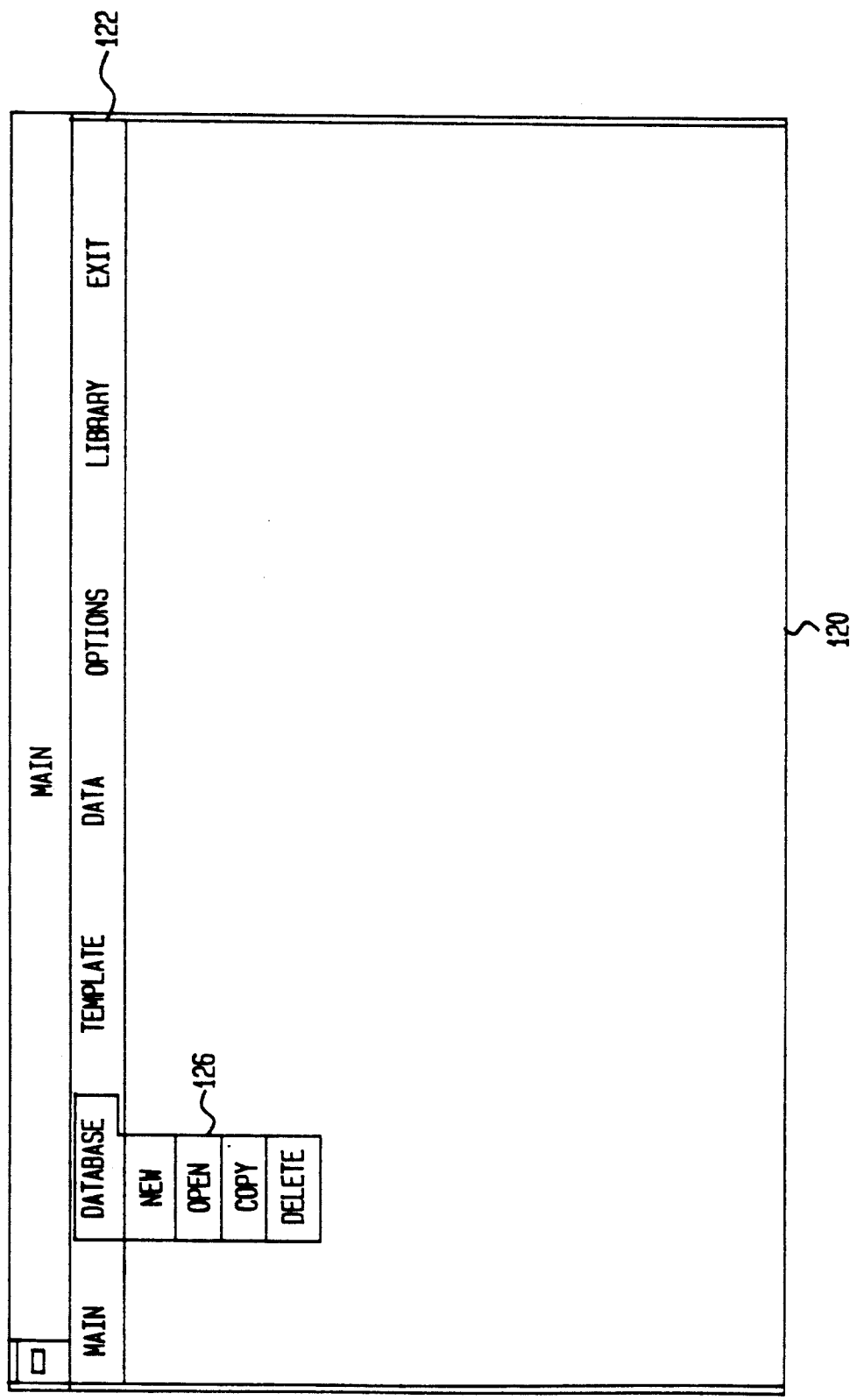
FIG. 11 illustrates a MAIN operator interface window, as well as the options for the DATABASE menu selection in accordance with one embodiment of the present invention.

FIG. 11 is a display of the main interface window 120 showing the options 126 for the DATABASE menu. These options include: NEW, OPEN, COPY and DELETE. The NEW option displays a dialog box to prompt the operator for a database name and creates the new database. The OPEN option displays a dialog box to prompt the operator for a database name to open an existing database. The COPY option displays a dialog box to prompt the operator for two database names and copies the first database into the second database. The DELETE option displays a dialog box to prompt the operator for a database name to delete that database.

Figure 12:
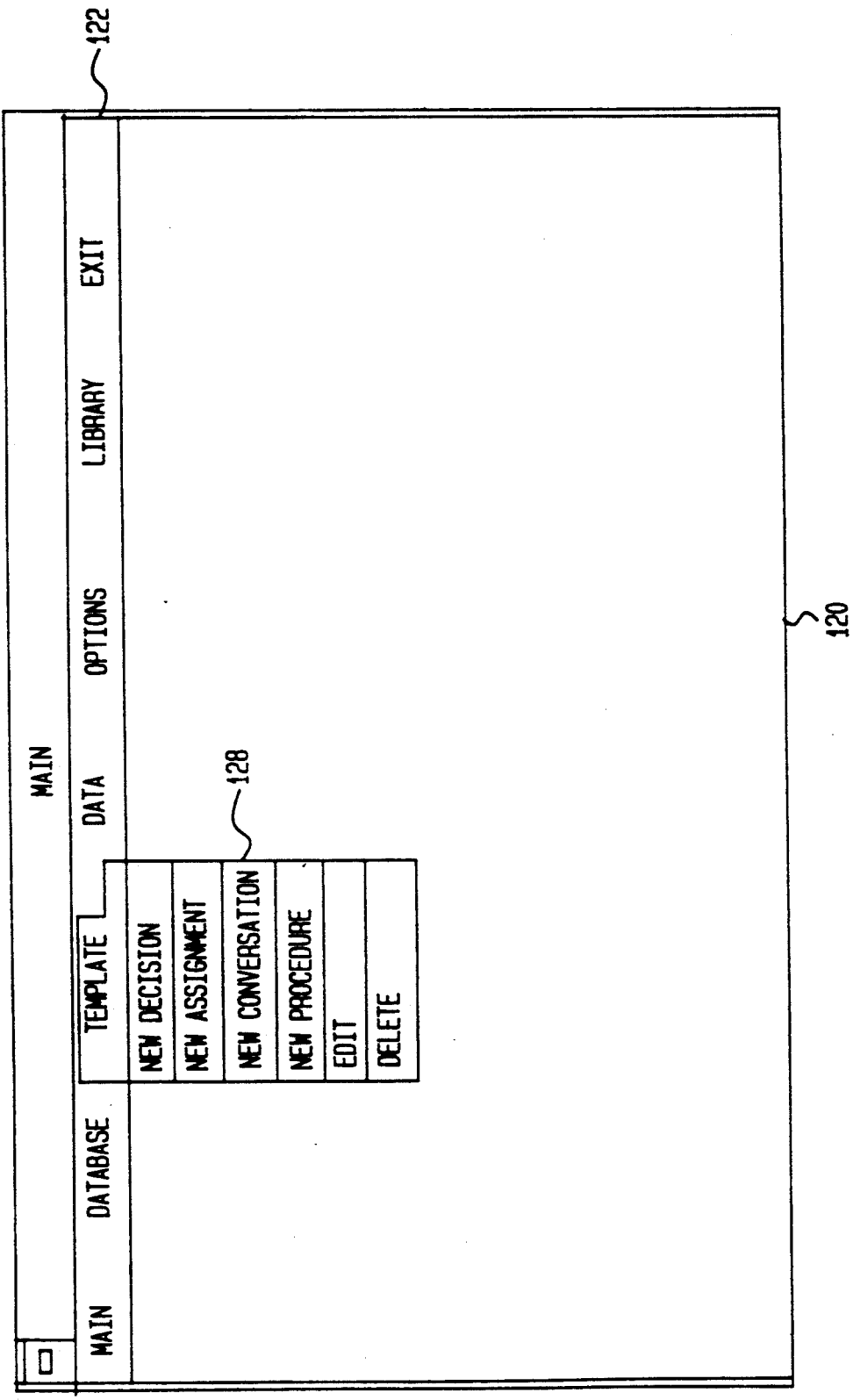
FIG. 12 illustrates a MAIN operator interface window, as well as the options for the TEMPLATE menu selection in accordance with one embodiment of the present invention.

FIG. 12 is a display of the main interface window 120 showing the options 128 to the TEMPLATE menu. These options include: NEW DECISION, NEW ASSIGNMENT, NEW CONVERSATION, NEW PROCEDURE, EDIT and DELETE. Templates, as explained below in greater detail, are used to create graph elements, called nodes, which the system does not record as standard.

The NEW DECISION option displays a dialog box for the operator to create a NEW DECISION node template. The NEW ASSIGNMENT option displays a dialog box for the operator to create a NEW ASSIGNMENT node template. The NEW CONVERSATION option displays a dialog box for the operator to create a NEW CONVERSATION node template. The NEW PROCEDURE option displays a dialog box for the operator to create a NEW PROCEDURE node template.

The EDIT option displays a list of node templates (not shown). The operator selects the node template to be edited, and a dialog box with the template information is presented to the operator. The operator can make desired changes to the template information.

The DELETE option also presents the operator with a list of node templates from which the operator can select templates to delete.

Figure 13:
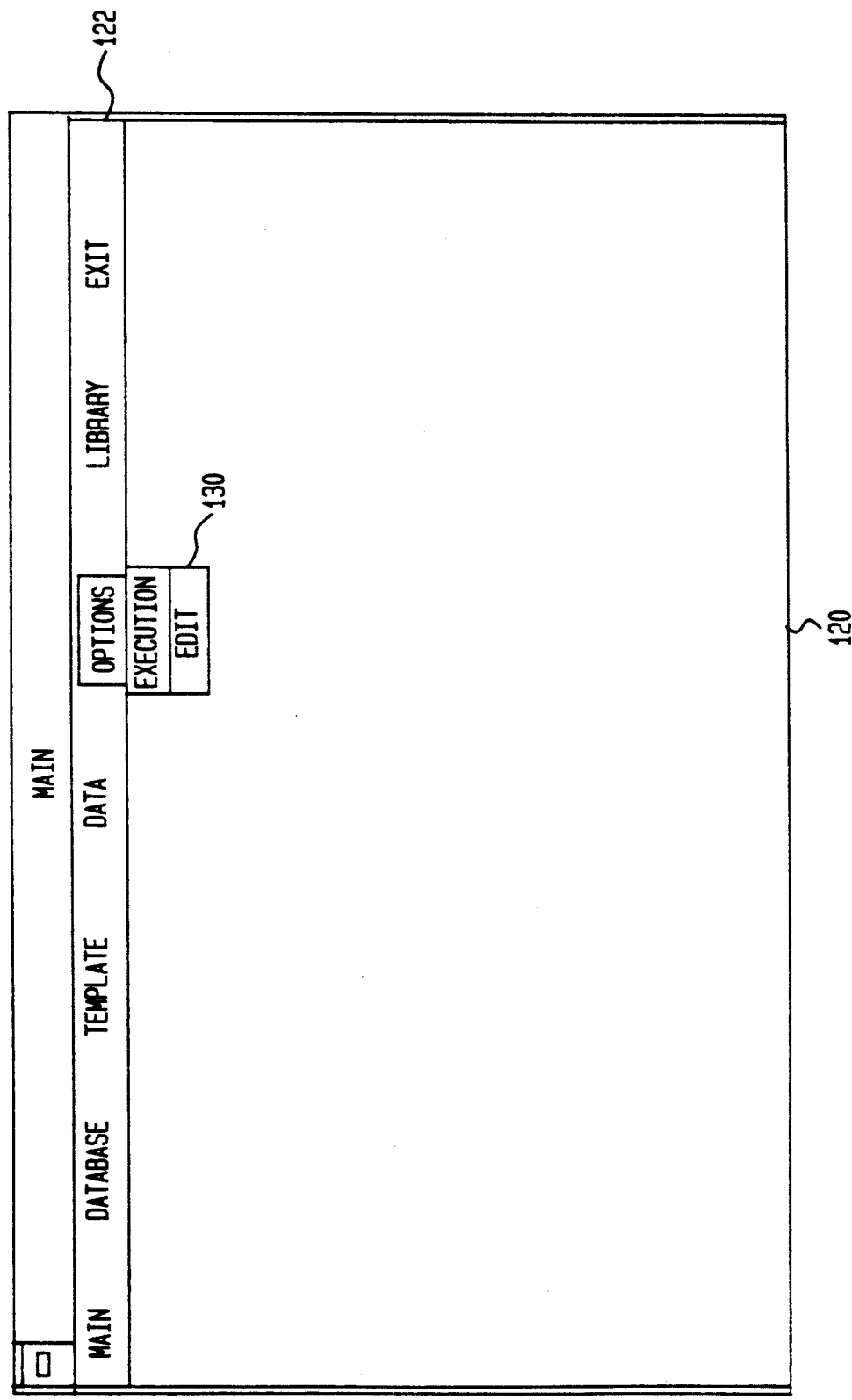
FIG. 13 illustrates a MAIN operator interface window, as well as the options for the OPTIONS menu selection in accordance with one embodiment of the present invention.

FIG. 13 is a display of the main interface window 120 showing the options 130 for the OPTIONS menu. These options include: EXECUTION and EDIT.

The EXECUTION option displays a dialog box allowing the operator to set the global "step" and "trace" flags. As explained below in more detail, the step flag is set to allow an operator to step through the graph during call processing. The trace flag is used to highlight the execution path taken through a graph during call processing.

The EDIT option displays a dialog box allowing the operator to select the information to be displayed in the graph nodes. The two types of information generally selected are the node title and the node value. Examples of these dialog boxes are described below.

Figure 14:
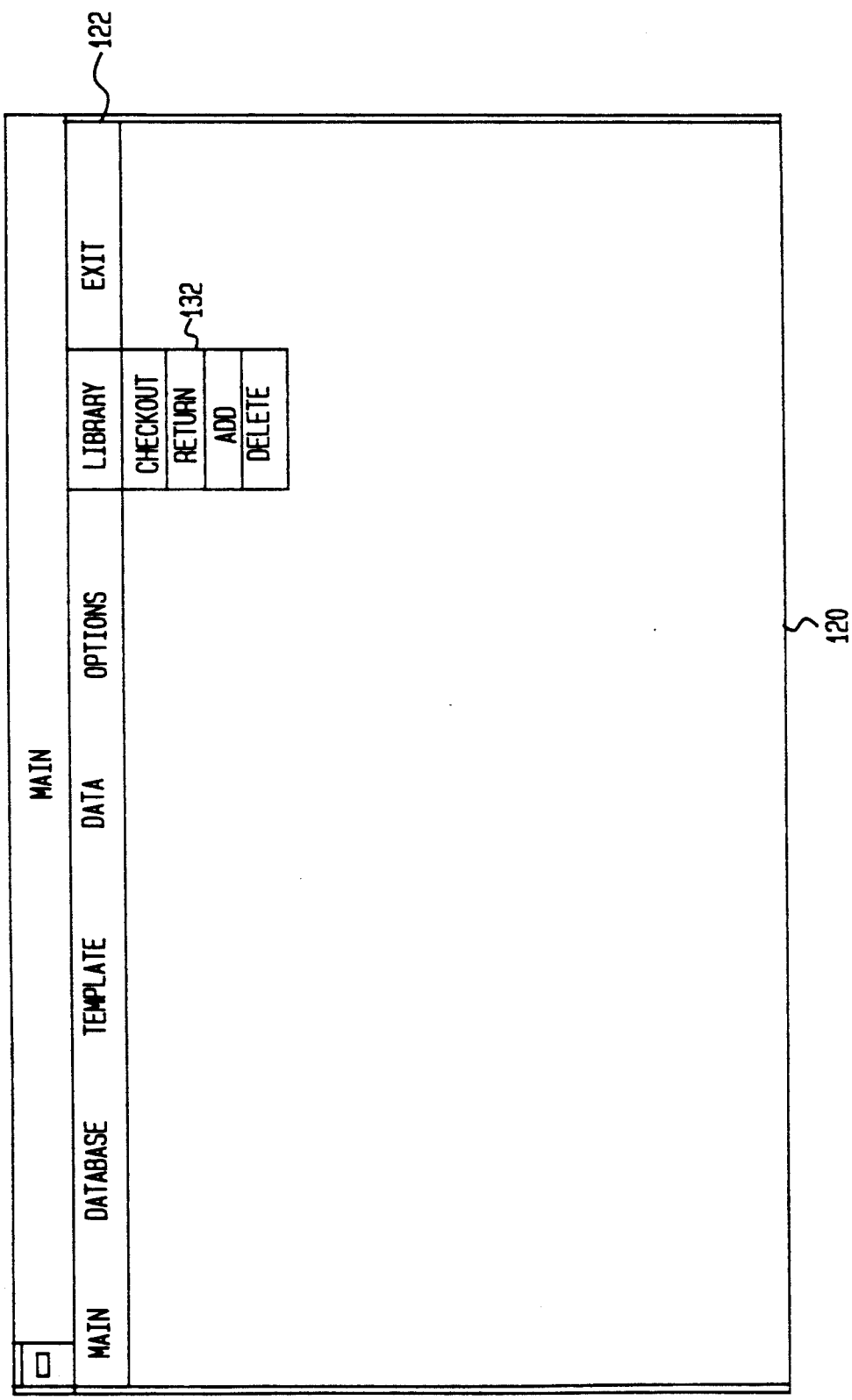
FIG. 14 illustrates a MAIN operator interface window, as well as the options for the LIBRARY menu selection in accordance with one embodiment of the present invention.

FIG. 14 is a display of the main interface window 120 showing the options 132 for the LIBRARY menu. These options include: CHECKOUT, RETURN, ADD and DELETE. The CHECKOUT option displays a dialog box which the operator completes with the name of a record desired to be checked out from a remote database. The RETURN option displays a dialog box prompting the operator for the name of the CCPI record to be returned to a remote database. The operator can also add a record to the remote database or delete a record from the remote database using the ADD and DELETE options, respectively.

Figure 15:
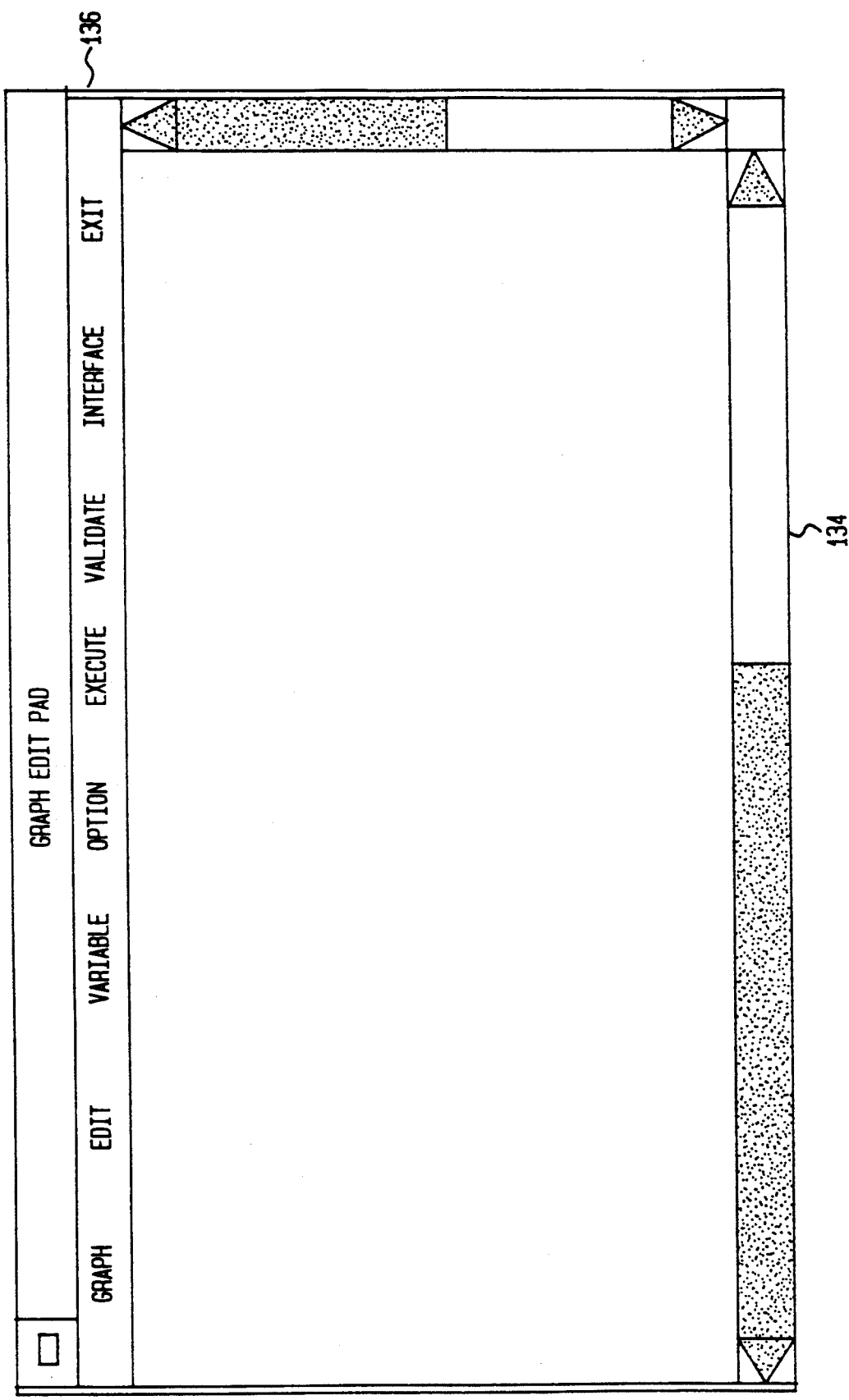
FIG. 15 illustrates a graph edit pad interface window in accordance with one embodiment of the present invention.

FIG. 15 illustrates a "graph edit pad" window 134 which is used to create, edit and store CCPI records. This window includes a menu bar 136 including eight menu options: GRAPH, EDIT, VARIABLE, OPTIONS, EXECUTE, VALIDATE, INTERFACE and EXIT.

Figure 17:
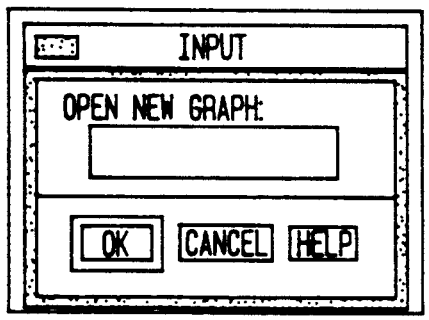
FIG. 17 illustrates an Open New graph dialog box in accordance with one embodiment of the present invention.
Figure 18:
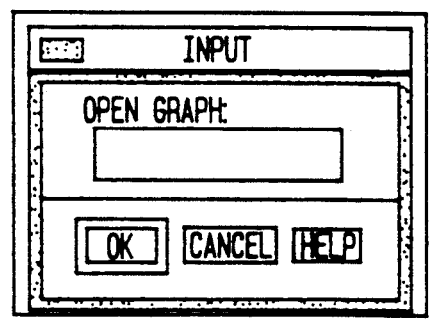
FIG. 18 illustrates an Open graph dialog box in accordance with one embodiment of the present invention.
Figure 16:
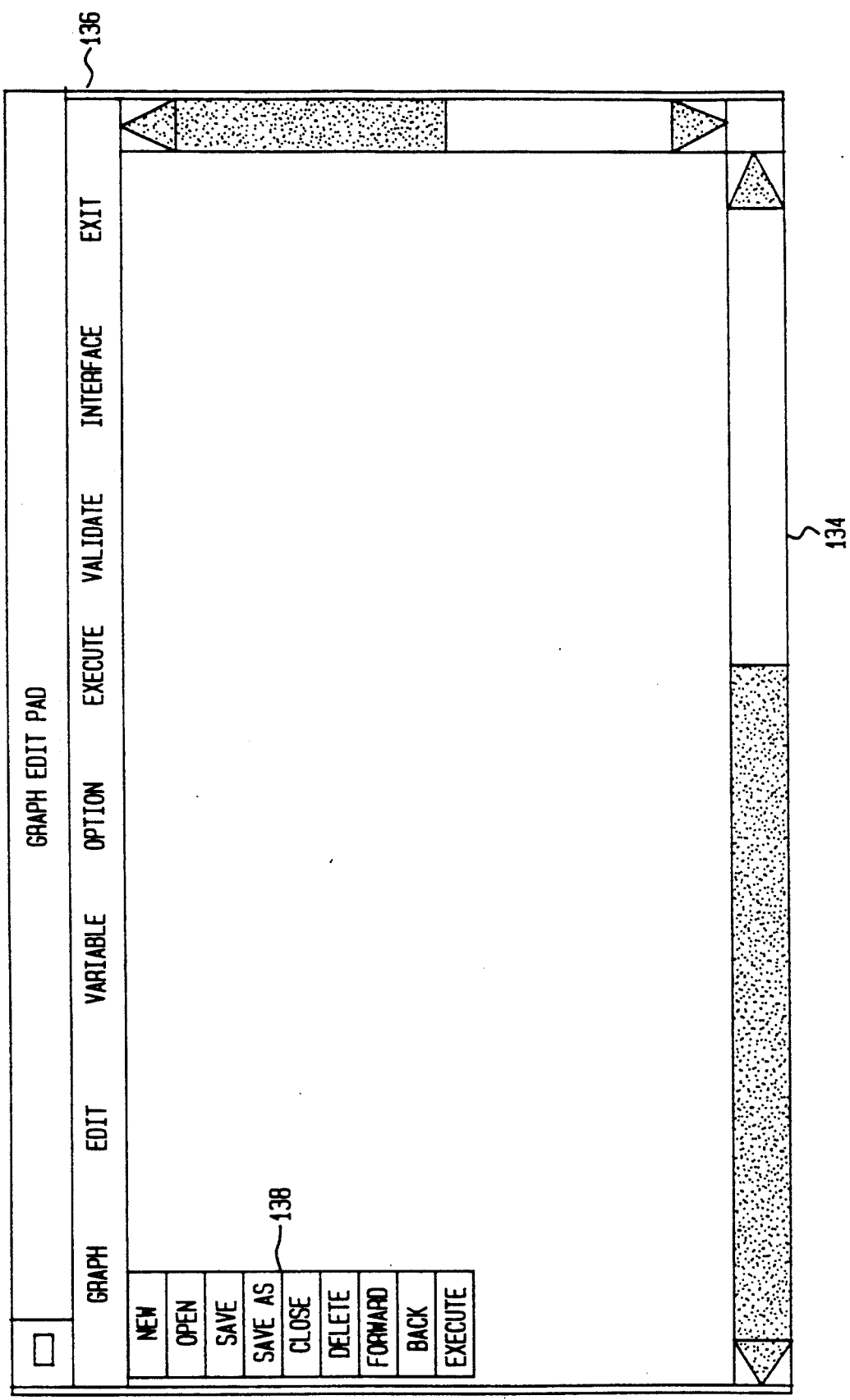
FIG. 16 illustrates a graph edit pad interface window, as well as the options corresponding to the GRAPH menu selection in accordance with one embodiment of the present invention.

FIG. 16 illustrates the "graph edtt pad" window 134 with options 138 of the GRAPH menu displayed. These options include: NEW, OPEN, SAVE, SAVE AS, CLOSE, DELETE, FORWARD, BACK and ITERATE. The NEW option displays a dialog box (FIG. 17) prompting the operator for a name or "key" for the record that the operator wishes to create. The OPEN option displays a dialog box (see FIG. 18) prompting the operator for the name or "key" of the graph the operator wishes to open.

The SAVE option saves to permanent storage the binary representation of CCPI records corresponding to the graph.

Figure 19:
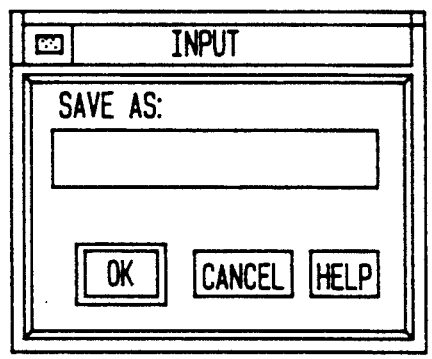
FIG. 19 illustrates a Save As dialog box in accordance with one embodiment of the present invention.

The SAVE AS option displays a dialog box (FIG. 19) prompting the operator for the name or "key" for a CCPI records to be saved, then saves the binary representation of the CCPI records corresponding to the graph to permanent storage.

Figure 20:
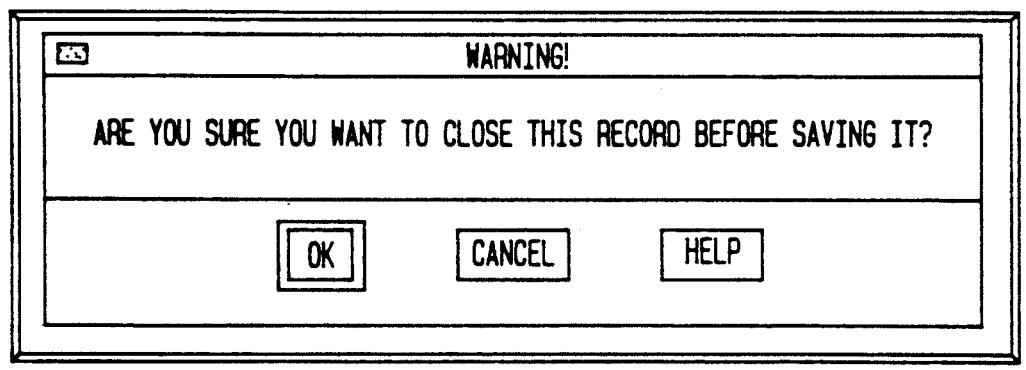
FIG. 20 illustrates a Warning dialog box in accordance with one embodiment of the present invention.

The CLOSE option displays a warning dialog box (see FIG. 20) requesting the operator for verification to complete this option. If the request is verified, all representations of the CCPI records corresponding to the graph that is currently being displayed are cleared.

The DELETE option deletes the CCPI records corresponding to the graph that is currently being displayed is deleted from the database. Again, a warning dialog box is presented to the operator.

The FORWARD option displays the CCPI record in the database following the CPI record that is currently displayed. The BACK option displays the CCPI record in the database that precedes the CCPI record currently being displayed. The ITERATE option displays the CCPI records in the database consecutively at a predetermined interval.

Figure 21:
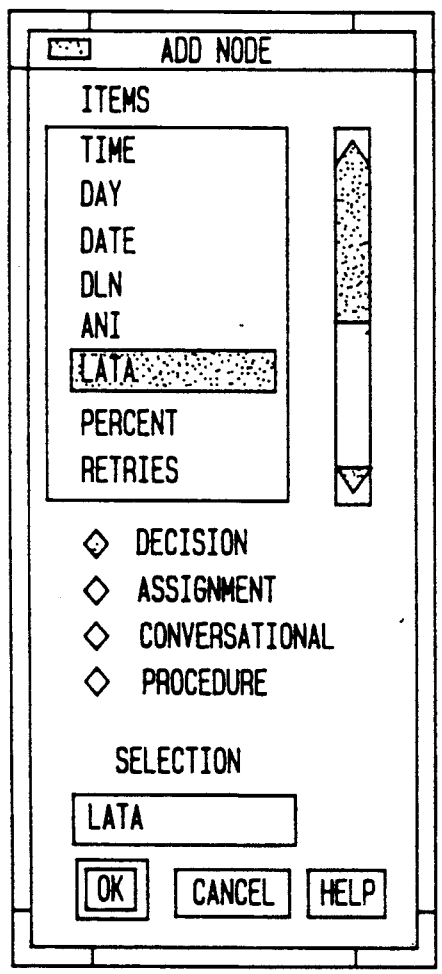
FIG. 21 illustrates an Add Node dialog box in accordance with one embodiment of the present invention.
Figure 22:
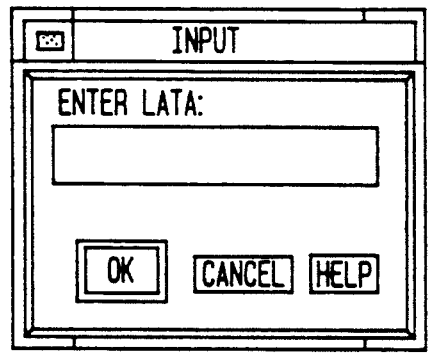
FIG. 22 illustrates an Enter LATA dialog box in accordance with one embodiment of the present invention.
Figure 23:
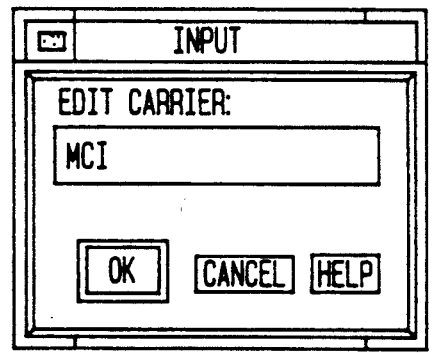
FIG. 23 illustrates an Edit Carrier dialog box in accordance with one embodiment of the present invention.
Figure 24:
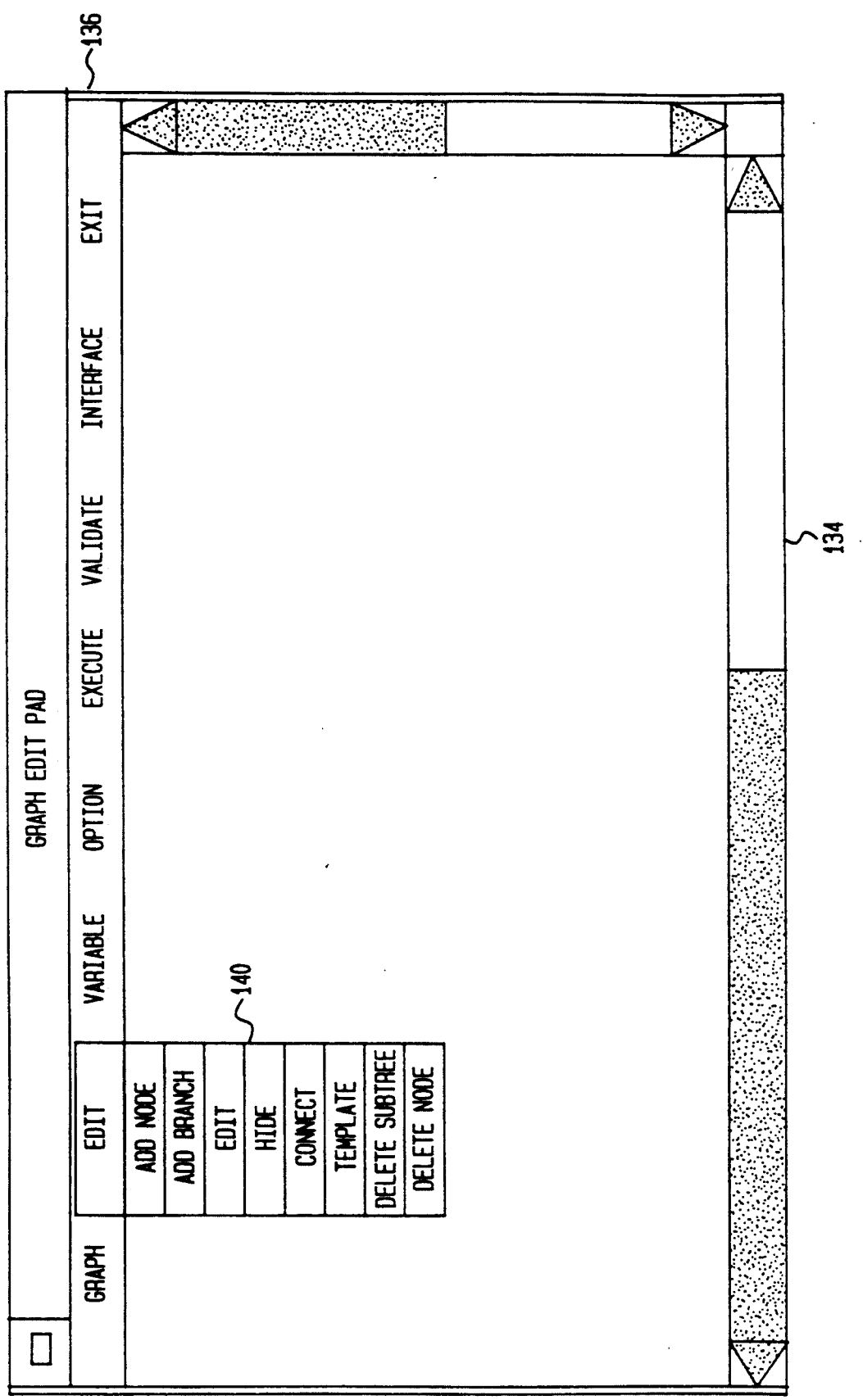
FIG. 24 illustrates a graph edit pad interface window, as well as the options corresponding to the EDIT menu selection in accordance with one embodiment of the present invention.

FIG. 24 illustrates the "graph edit pad" window 134 with options 140 at the EDIT menu displayed. These options include: ADD NODE, ADD BRANCH, EDIT, HIDE, CONNECT, TEMPLATE, DELETE SUBTREE and DELETE NODE. The ADD NODE option displays a dialog box with a list of the nodes the operator can add (see FIG. 21). The ADD BRANCH option displays a dialog box (see FIGS. 22 and 23) corresponding to the DECISION node to which the branch is being added. The operator enters the correct branch information for the selected DECISION node.

The EDIT option displays a dialog box (see FIG. 23) with information corresponding to the selected node which allows the operator to edit a node. The CONNECT option connects one portion of a graph to another portion of the graph. The TEMPLATE option displays the template for the selected node.

The HIDE option removes from the screen all nodes that are children of the selected node unless the child nodes also have a parent different from the selected node. The DELETE SUBTREE option deletes the selected node and all its children nodes from the screen and the corresponding CCPI record, unless a child node also has a parent that is different from the selected node. The DELETE node deletes a node from the graph. These last two options change the graph's functionality. The HIDE option does not.

Figure 25:
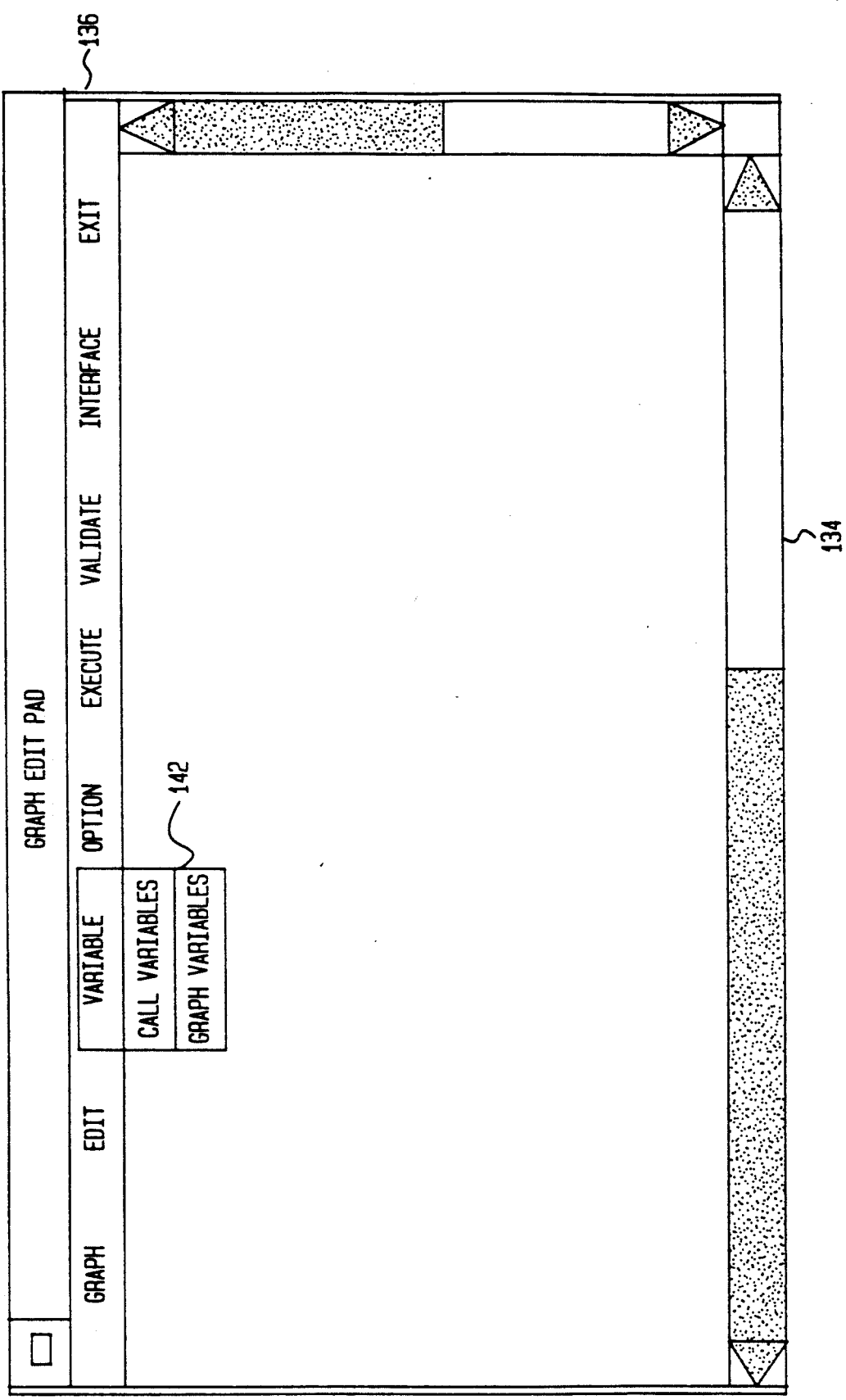
FIG. 25 illustrates the graph edit pad interface window, as well as the options corresponding to the VARIABLE menu selection in accordance with one embodiment of the present invention.
Figure 26:
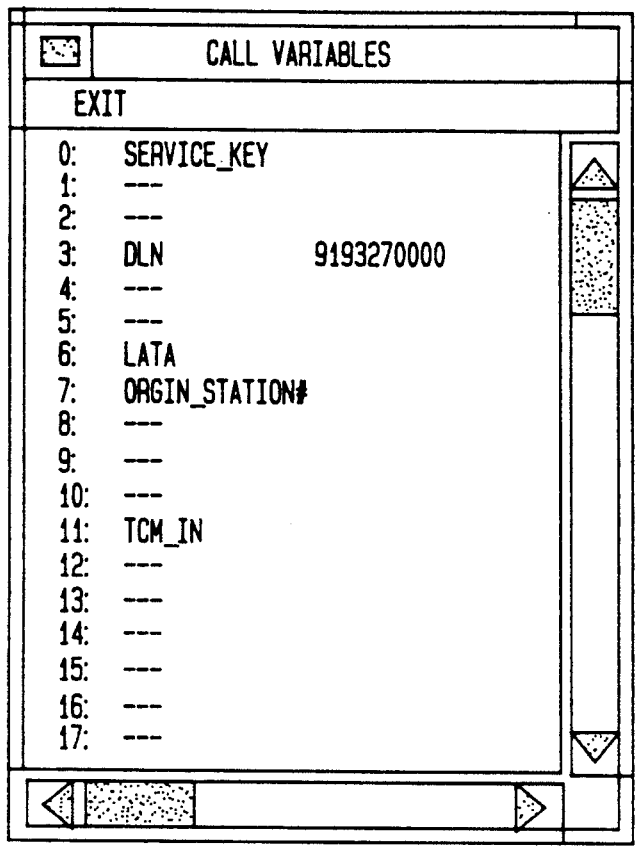
FIG. 26 illustrates a Call Variables dialog box in accordance with one embodiment of the present invention.
Figure 27:
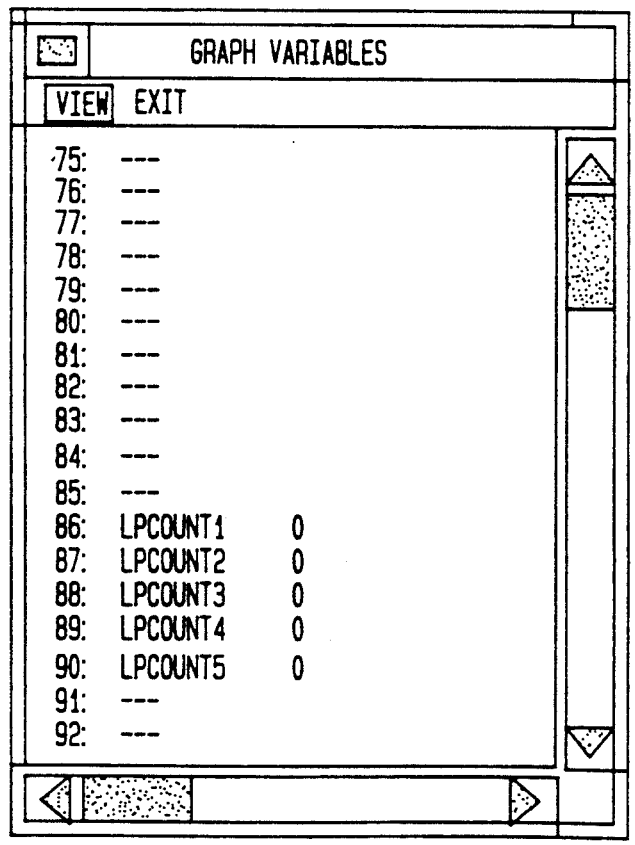
FIG. 27 illustrates a Graph Variables dialog box in accordance with one embodiment of the present invention.
Figure 28:
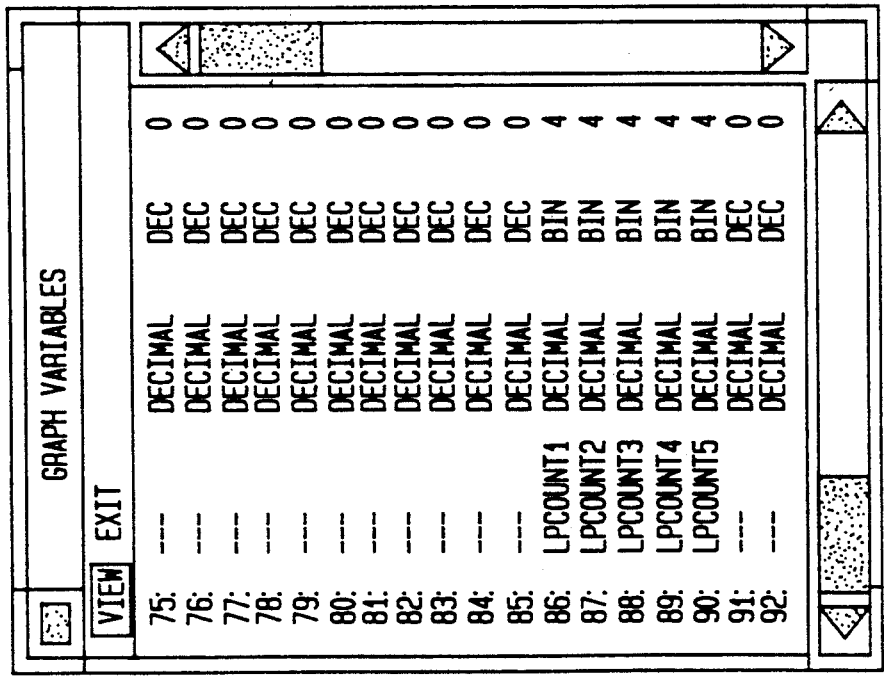
FIG. 28 illustrates a Graph Variables dialog box in accordance with another embodiment of the present invention.

FIG. 25 illustrates the graph edit pad window 134 with the options 142 for the VARIABLE menu being displayed. These options include CALL VARIABLES and GRAPH VARIABLES. The ALL VARIABLES option displays a window containing the variables of the call context for the graph being displayed (see FIG. 26). The GRAPH VARIABLES option displays a window containing the variables of the CCPI record being displayed (see FIGS. 27 and 28).

Figure 29:
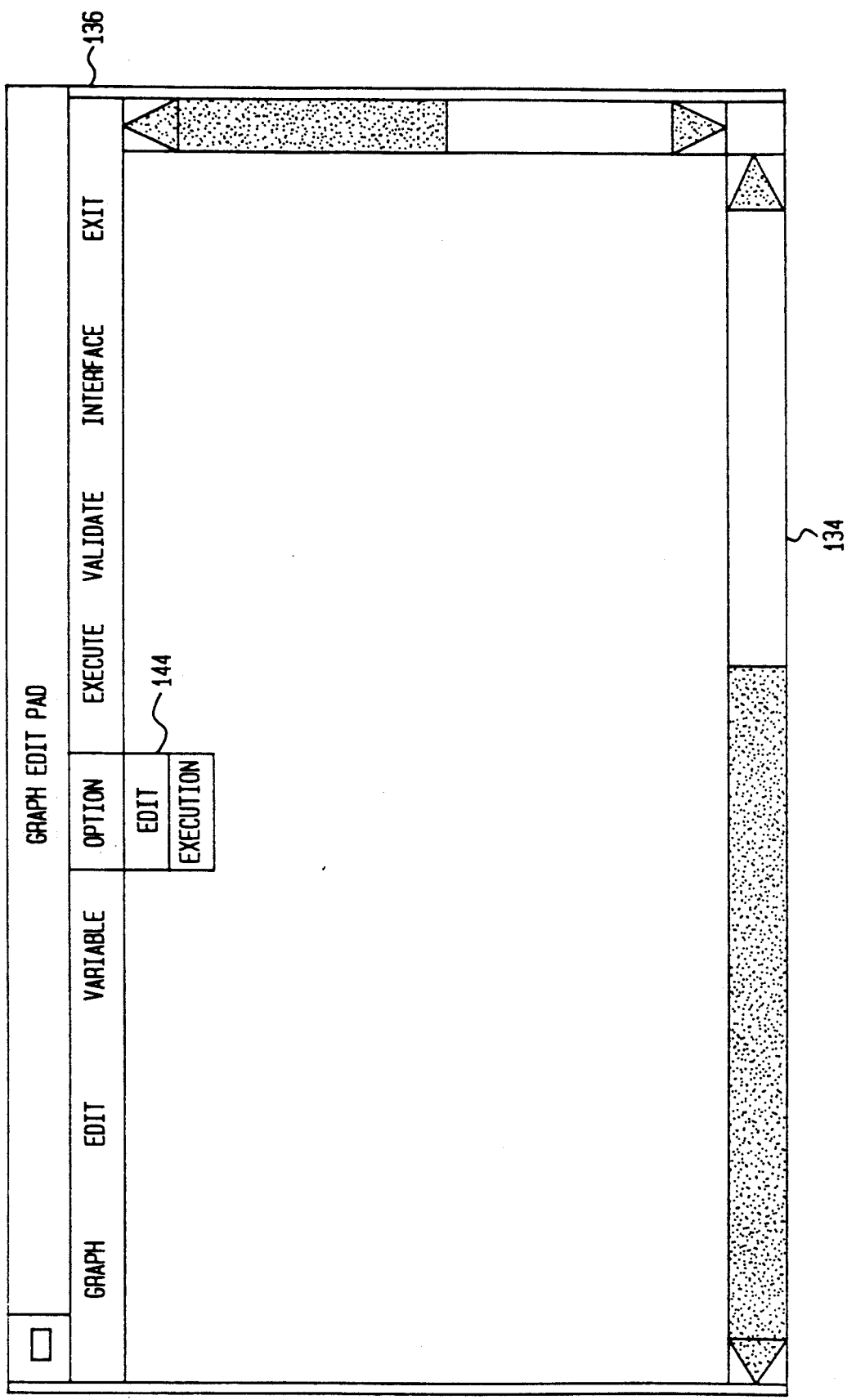
FIG. 29 illustrates a graph edit pad interface window, as well as the options corresponding to the OPTION menu selection in accordance with one embodiment of the present invention.

FIG. 29 illustrates the graph edit pad window 134 with the options 144 for the OPTION menu being displayed. These options include EDIT and EXECUTION. The EDIT option displays a dialog box (not shown) with two options: TITLE and VALUE. These options are similar to the TITLE and VALUE options in the GRAPH menu, but correspond to each node separately. The EXECUTION option displays a dialog box (not shown) which allows an operator to select the "step" and "trace" flags for the CCPI record corresponding to the graph being displayed.

Figure 30:
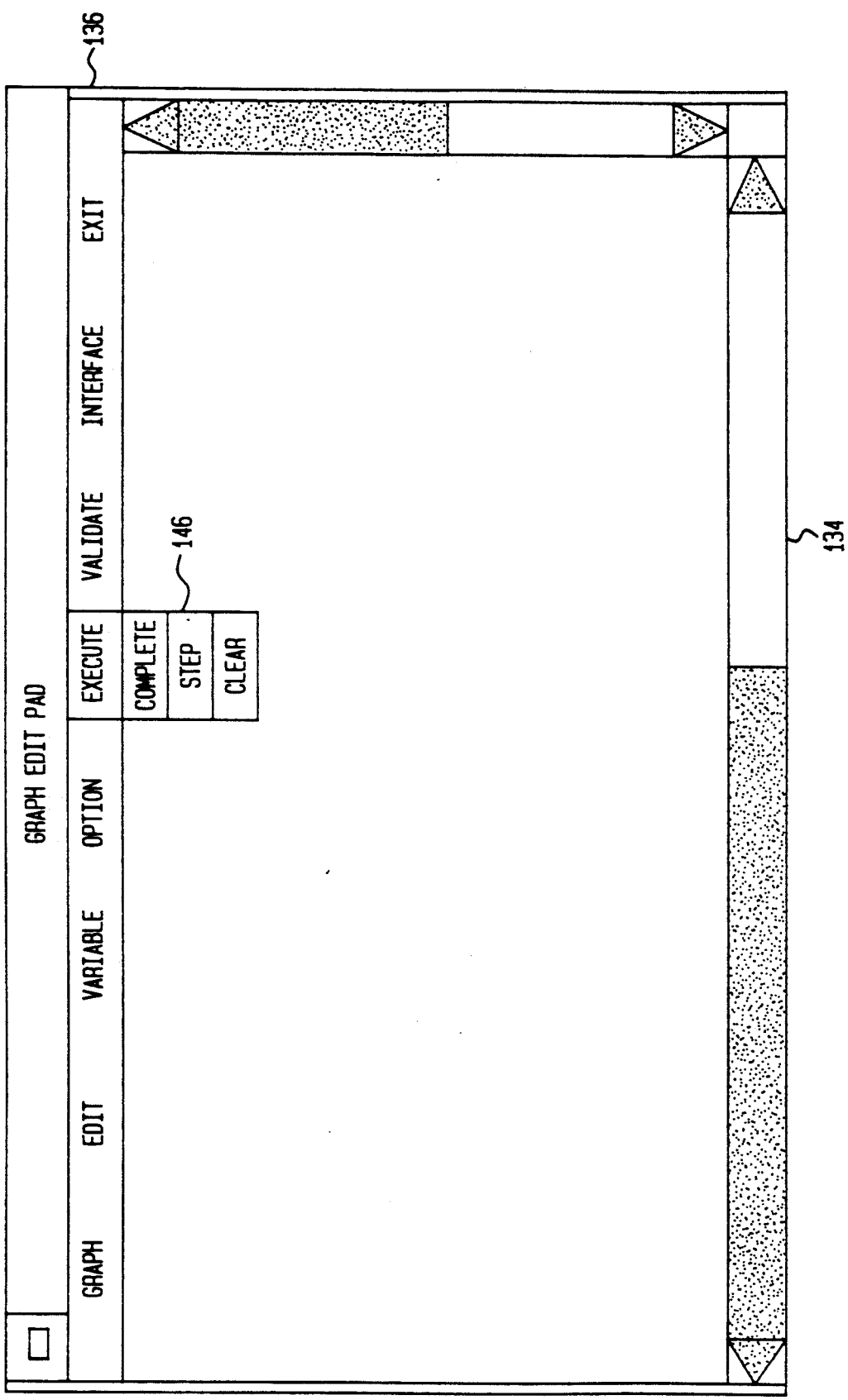
FIG. 30 illustrates a graph edit pad interface window, as well as the options corresponding to the EXECUTE menu selection in accordance with one embodiment of the present invention.

FIG. 30 illustrates the graph edit pad window with the options 146 of the EXECUTE menu being displayed. These options include: COMPLETE, STEP and CLEAR. The COMPLETE option completes a call processing of a CCPI record corresponding to the graph. The STEP option executes the next node of a CCPI record of the displayed graph. The CLEAR option removes a visual indication of the execution of a CCPI record corresponding to the displayed graph.

Figure 31:
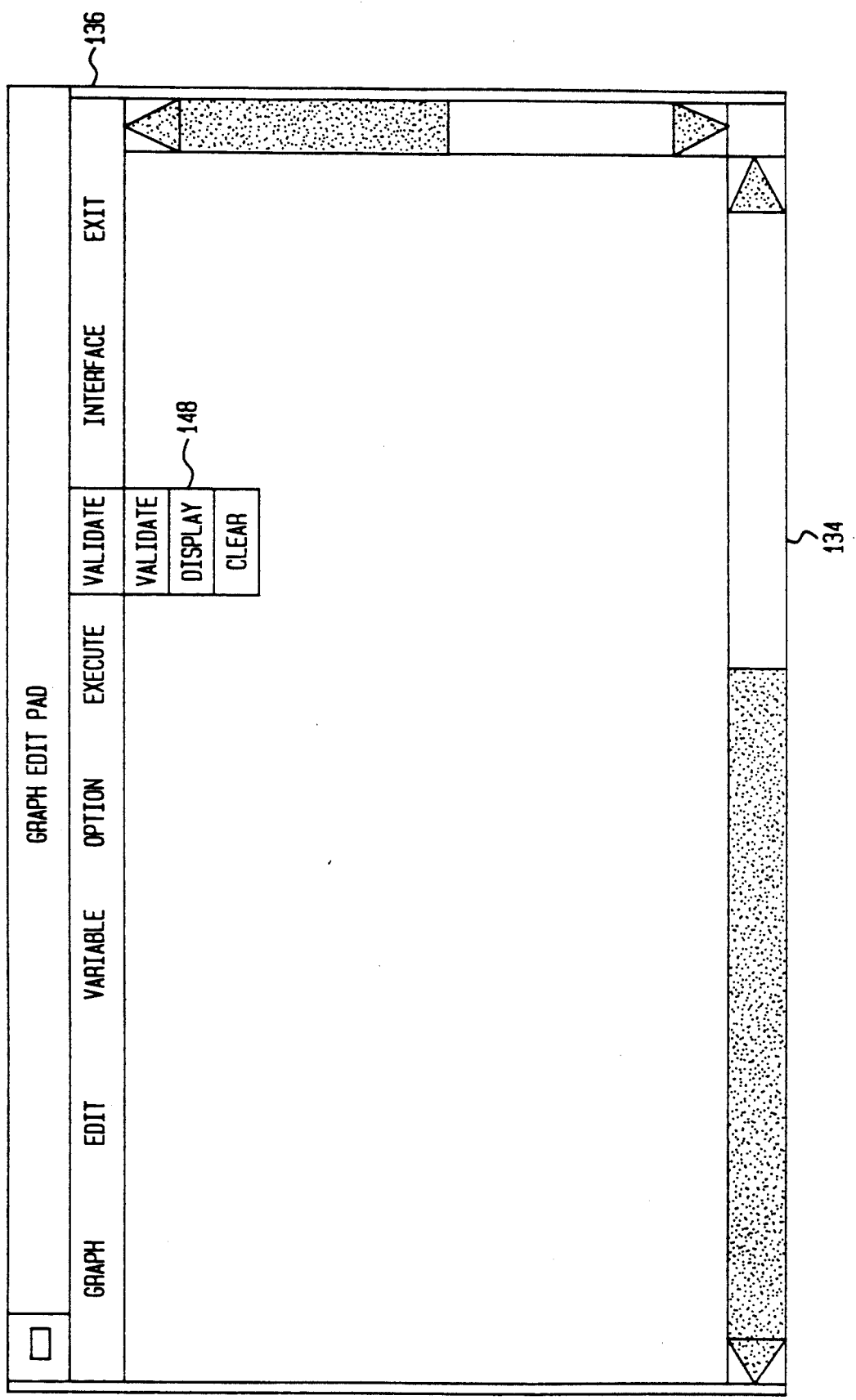
FIG. 31 illustrates a graph edit pad interface window, as well as the options corresponding to the VALIDATE menu selection in accordance with one embodiment of the present invention.

FIG. 31 illustrates the graph edit pad window 134 with the options 148 for the VALIDATE menu displayed. These options include VALIDATE, DISPLAY and CLEAR. The VALIDATE option invokes an expert system which flags any errors in the structure of the CCPI record of the displayed graph. The DISPLAY option displays a list of errors associated with the selected node. The CLEAR option clears all flagged errors from the graph.

Figure 32:
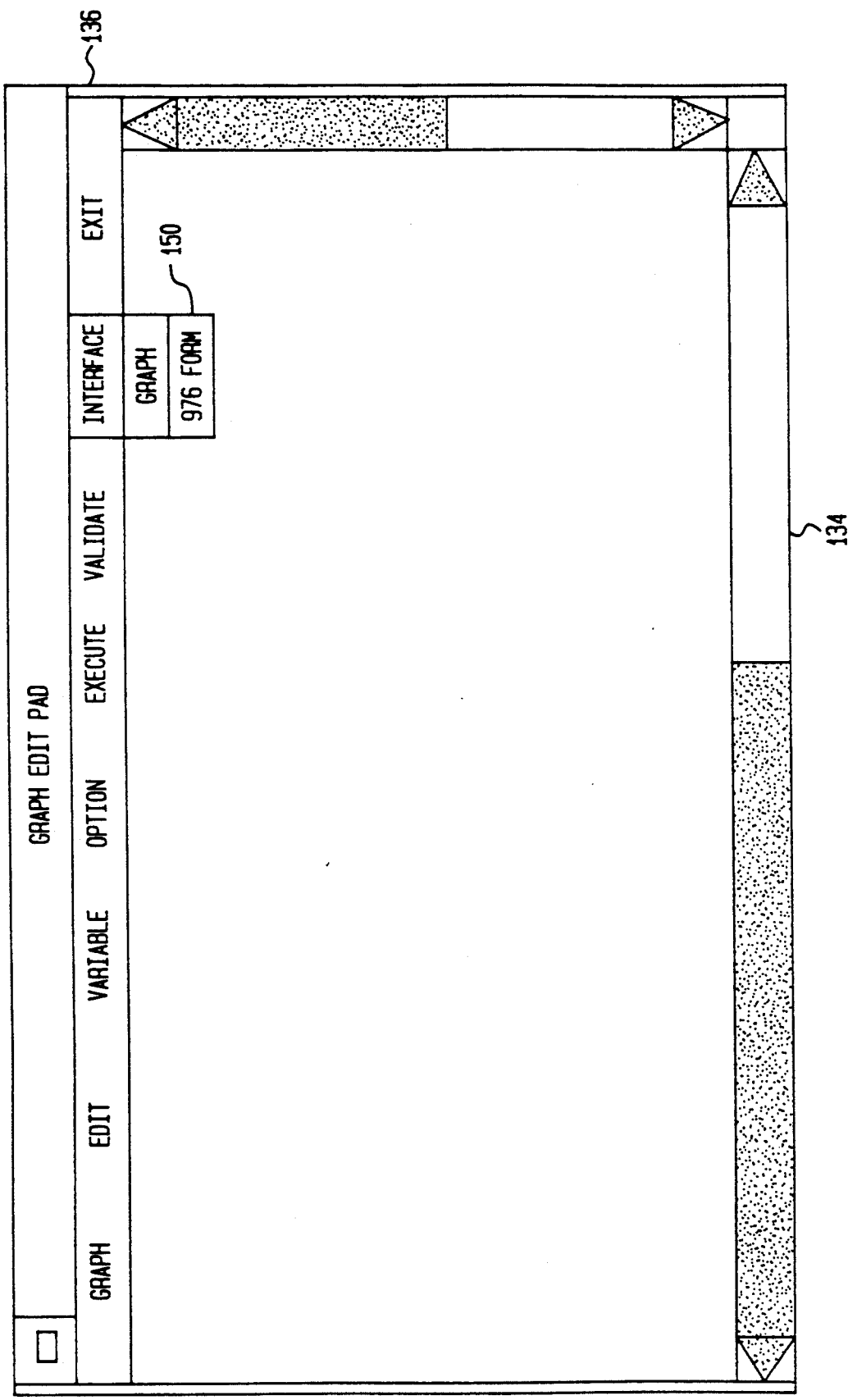
FIG. 32 illustrates a graph edit pad interface window, as well as the options corresponding to the INTERFACE menu selection in accordance with one embodiment of the present invention.

FIG. 32 illustrates the graph edit pad window 134 with the options 150 for the INTERFACE menu displayed. These options include GRAPH and FORM. The FORM option represents CCPI record as a form for a "976" call screening service (as shown in FIG. 2). The GRAPH option represents the same CCPI record as a graph (as shown in FIG. 1).

2. Operation

Figure 33:
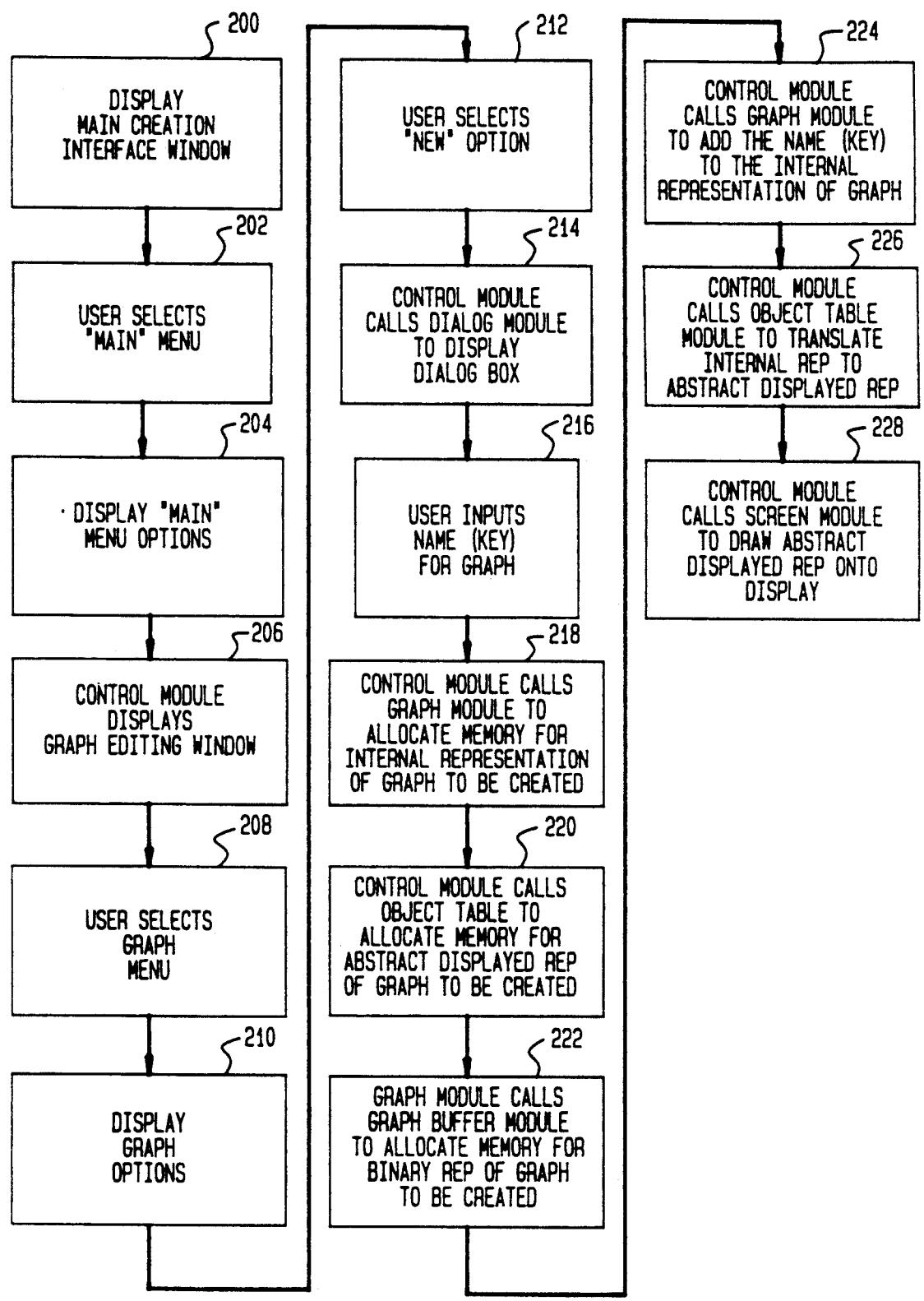
FIG. 33 is a flow diagram of the operation of a service creation portion to initiate creation of a new graph in accordance with one embodiment of the present invention.

The creation of a service will now be described with reference to certain of the windows explained above. FIG. 33 is a flow diagram of the operation of the service creation portion 54 to initiate creation of a new a graph. Initially, the operator manipulates the windows to display the main interface window shown in FIG. 7 (step 200). The operator selects the "MAIN" menu (step 202) to display the "MAIN" menu options to the operator (see FIG. 8) (step 204). The operator selects the "GRAPH" option, and CONTROL module 106 displays the "graph editing pad" window (see FIG. 15) (step 206).

The operator then selects the "GRAPH" menu (step 208) to display the "GRAPH" options (see FIG. 16) (step 210). The operator selects the "NEW" option (step 212), and CONTROL module 106 calls DIALOG module 104 to display the corresponding dialog box (FIG. 17) (step 214).

Next, the operator inputs the "key" of the graph (step 216), and CONTROL module 106 responds by calling GRAPH module 62 to allocate memory for the internal data structure representation of the graph being created (step 218). CONTROL module 106 also calls OBJECT TABLE module 110 to allocate memory for the abstract displayed representation of the graph to be created (step 220). GRAPH module 62 then calls GRAPH BUFFER module 78 to allocate memory for a binary representation of the graph being created (step 222). Next, CONTROL module 106 calls GRAPH module 62 to add the "key" to the internal representation of the graph being created (step 224).

CONTROL module 106 then calls OBJECT TABLE module 110 to translate the internal graphical representation to an abstract displayed representation (step 226). CONTROL module 106 then calls SCREEN module 102 to translate the abstract displayed representation into the applied displayed representation "key" object (step 228), which is shown as a rectangular box containing the "key" on the graph.

The result of the steps in FIG. 33 is the initiation of a new graph. At this point, only the box with the "key" is displayed. Using the operations of the "EDIT" menu and a plurality of nodes, an operator can now build a graph to define a desired service.

a. Nodes

Preferably, graphs are comprised of four types of nodes: DECISION nodes, ASSIGNMENT nodes, PROCEDURE nodes and CONVERSATION nodes. DECISION nodes control the path of execution of a graph during call processing depending according to values of call variables. ASSIGNMENT nodes assign "values" and "variables" to other "call variables." The concepts of variables and call variables are explained below. PROCEDURE nodes switch control to a different graph or to a subroutine. CONVERSATION nodes provide information to a caller or derive information from a caller in the course of processing a call.

DECISION nodes are used to branch the execution through a graph and have several important attributes. The first of these attributes is the "call variable" attribute which indicates which variable is used in determining the correct branch. Another important attribute is the "type" of the call variable which determines how the branch information will be stored and displayed, for example, as an integer or as an ASCII string. The preferred predefined DECISION node templates generate the following nodes:

| TIME | DAY | DATE |
|------|-----|------|
| DLN | ANI | LATA |
| PERCENT | NET | RESULT |

TIME Node—The TIME node is a DECISION node which tests for time of day when traversing a graph. The TIME node's decision branches may specify a single time, a range of time, multiple times or time ranges. The TIME node makes its decision based upon the current time of day for the call. The value of the system clock is used to determine the branch.

Figure 34:
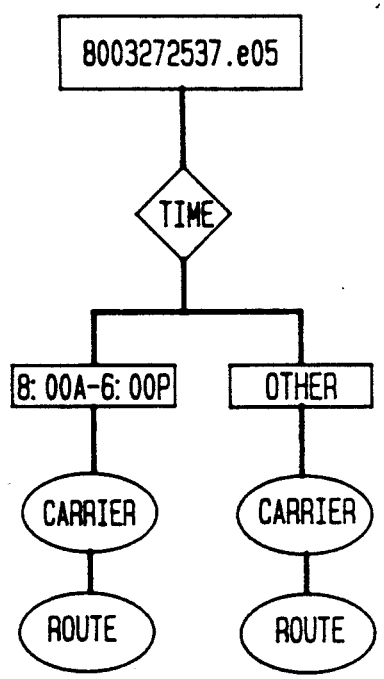
FIG. 34 illustrates an example of a graph using a TIME node in accordance with one embodiment of the present invention.

FIG. 34 illustrates a graph using the TIME node. In this graph, if the call placed to the 800 number shown in the rectangle is made between the hours of 8:00 a.m. and 6:00 p.m., the call is routed using a first carrier. For any other time, the call is routed using a different carrier.

DLN Node—The DLN (Dialed Line Number) is a DECISION node which represents the number to which the call is placed. The DLN node decisions are based upon one or more of the digits in the number dialed by THE calling party. The positions 0-9 of the digits of the dialed line number can be used to indicate which portion of the dialed line number the decision should be made.

Figure 35:
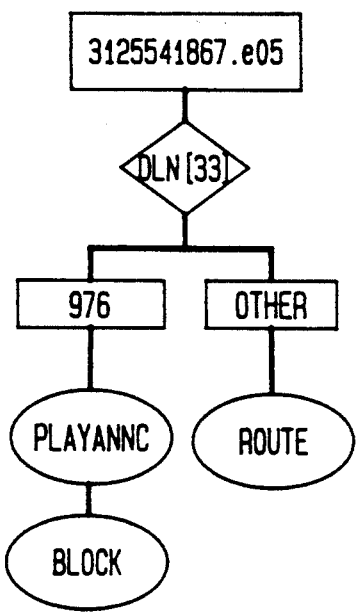
FIG. 35 illustrates an example of a graph using a DLN node in accordance with one embodiment of the present invention.

FIG. 35 illustrates an example of a graph using the DLN node. In this graph, is a call being made from the number identified in the rectangle is placed to an exchange of 976, an announcement is played to the caller, and the call processing is blocked. Any call to any other exchange is routed.

Figure 36:
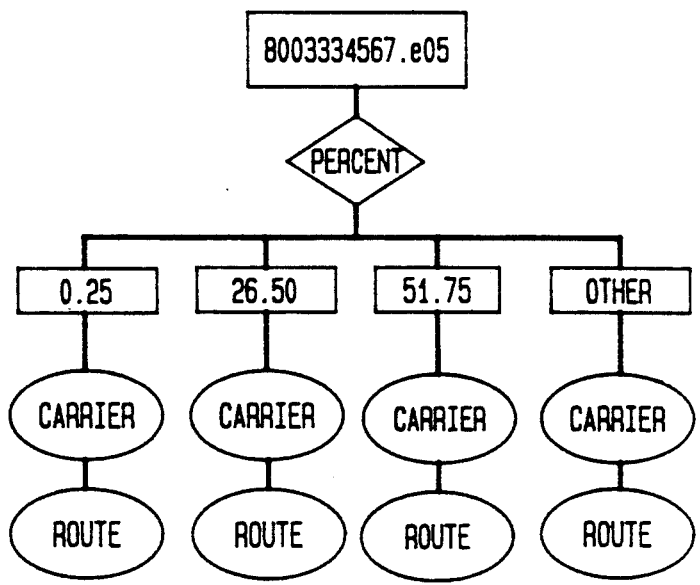
FIG. 36 illustrates an example of a graph using a PERCENT node in accordance with one embodiment of the present invention.

PERCENT Node—The PERCENT node is a DECISION node which randomly chooses a path based on predetermined percentages. An example of a graph using the PERCENT node is shown in FIG. 36 where, the first 25 percent of phone calls made to the 800 number identified in the rectangle are routed via a first carrier; the second 25 percent of these calls are routed via second carrier; the third 25 percent are routed via a third carrier; and the fourth 25 percent are routed via a fourth carrier.

DAY Node—The DAY node is a DECISION node which allows a graph to branch based upon day of week criteria. Branches for a DAY node indicate the path of call processing when the value for the day call variable matches the branch criteria. Each branch out of a day node may contain one or more days or ranges of days.

Figure 37:
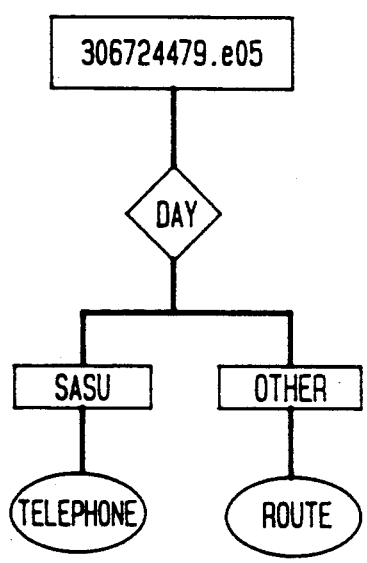
FIG. 37 illustrates an example of a graph using a DAY node in accordance with one embodiment of the present invention.

FIG. 37 illustrates a graph using a DAY node. In this graph, if the number in the rectangle is called on Saturday or Sunday, the call is forwarded to a different telephone number. If the day of the week is Monday-Friday (other), the call is routed to the number in the rectangle.

ANI—In an ANI (Automated Number Identification) node, a decision is made based upon one or more of the digits in the ANI string. The ANI string (a series of ASCII characters) represents the phone number of the calling party.

Figure 38:
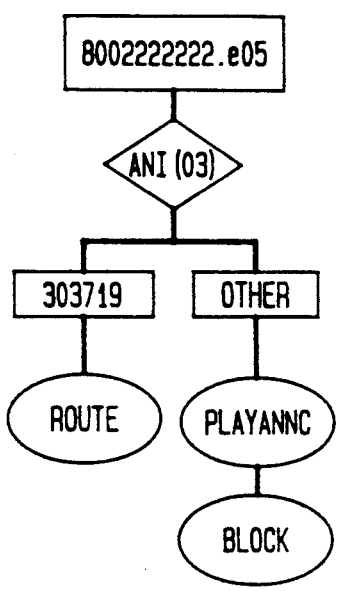
FIG. 38 illustrates an example of a graph using an ANI node in accordance with one embodiment of the present invention.

FIG. 38 shows an example of a graph utilizing an ANI node. The graph in FIG. 38 tests the first three digits (the area code) of the number from which the call is made. If these three digits are 303 or 719, the call is routed. If these three digits are some other three numbers, an announcement is played to the caller and the phone call is blocked.

Figure 39A:
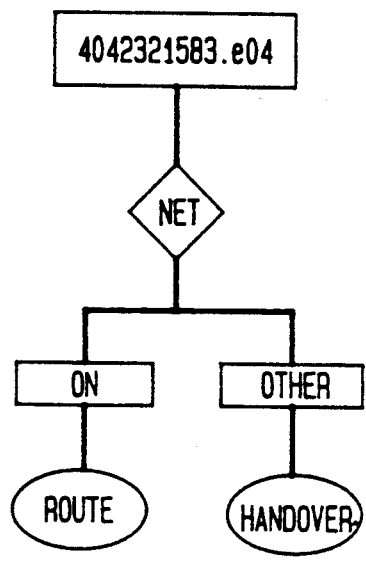
FIG. 39A illustrates an example of a graph using a NET node in accordance with one embodiment of the present invention.
Figure 39B:
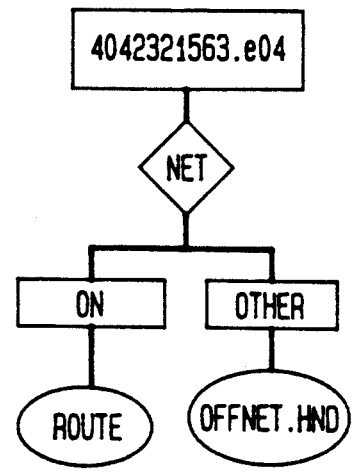
FIG. 39B illustrates an example of a graph using a NET node in accordance with another embodiment of the present invention.

NET Node—The NET node is a DECISION node which determines whether a call is on a private network or off of a private network. The NET nodes' decision branches have the values ON for an ON network call and other (or OFF). Typically, the NET DECISION node is to determine if the call is over a private telephone network. The incoming TCAP message contains the value assigned to the NET variable. FIGS. 39A and 39B each illustrate a graph including a NET node.

DATE Node—The DATE DECISION node allows a graph to branch based upon day and month criteria. The branches for a date node indicate the path the call processing should take when the value for the date call variable matches the branch criteria.

Figure 40:
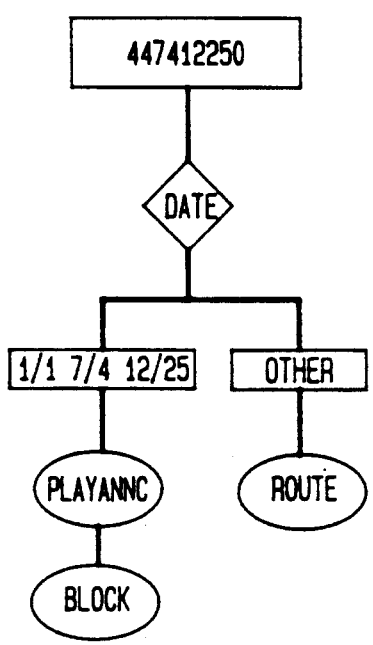
FIG. 40 illustrates an example of a graph using a DATE node in accordance with one embodiment of the present invention.

An example of a graph using the DATE decision node is shown in FIG. 40. In this graph, if the date on which the call is placed to the number identified in the rectangle is January 1, July 4 or December 25, an announcement is played to the caller, and the call processing is blocked.

LATA Node—The LATA (Local Access and Transport Area) node is a DECISION node which tests the LATA of the originating number. Multiple LATA values or ranges of LATA values may be specified for a single branch.

Figure 41:
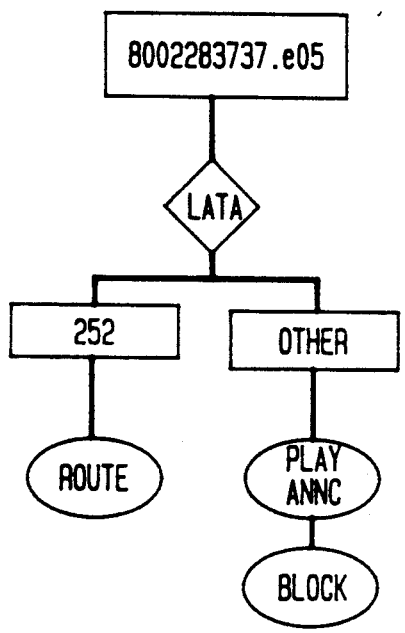
FIG. 41 illustrates an example of a graph using a LATA node in accordance with one embodiment of the present invention.

FIG. 41 illustrates a graph using the LATA DECISION node. In the graph, if a call placed to the 800 number identified in the rectangle originates in the 252 LATA, the call is routed. Otherwise, an announcement is played, and the call processing is blocked.

Figure 42:
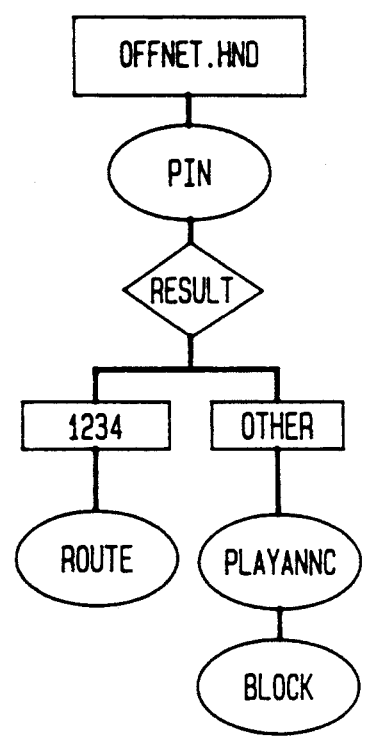
FIG. 42 illustrates an example of a graph using a RESULT node in accordance with one embodiment of the present invention.

RESULT Node—The RESULT node is as DECISION node which tests the "DIGITS" call variable identifying dialed digits. The call variable is assigned from the information collected by a conversational message FIG. 42 illustrates a graph using the RESULT node.

ASSIGNMENT nodes assign values or call variables to other call variables. The preferred predefined ASSIGNMENT node nodes are as follows:

| ROUTING NUMBER (RN) | CARRIER | BILLED NUMBER |
|---|---|---|
| FINAL TREATMENT | | |

Figure 43:
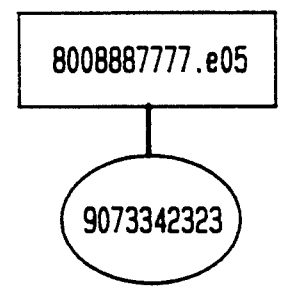
FIG. 43 illustrates an example of a graph using a ROUTING NUMBER node in accordance with one embodiment of the present invention.

ROUTING NUMBER (RN)—The RN node is an ASSIGNMENT node that assigns a final routing number. When a telephone number is specified, the syntax is 10 digits that represent the valid telephone number. FIG. 43 illustrates a graph using the RN node. In FIG. 43, the telephone number for the routing is displayed in the node. A call made to the 800 number identified in the rectangle is actually routed to the phone number identified in the RN node.

FINAL TREATMENT Node—This is an ASSIGNMENT node to assign a final treatment code to the final treatment variable. The final treatment code tells the switch what to do with the call, for example, route, block, busy (see, for example, FIG. 42).

CARRIER Node—The CARRIER node is an ASSIGNMENT node which allows an operator to specify which long distance carrier will route the call. When an operator adds a CARRIER node to a graph, he is requested to enter a carrier mnemonic, for example, "MCI," ATT."

Figure 44:
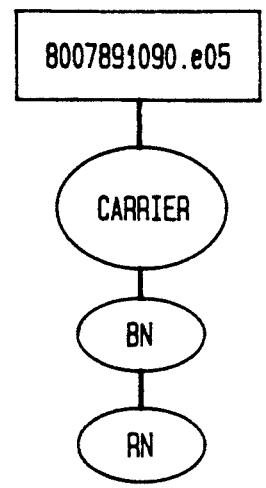
FIG. 44 illustrates an example of a graph using a CARRIER node in accordance with one embodiment of the present invention.

FIG. 44 shows an example of a graph using the carrier node.

BILLED NUMBER—The Billed Number (BN) node is an ASSIGNMENT node which specifies a 10-digit number for the telephone number that is to be billed for the call. To create the node, an operator preferably specifies a 10-digit number in the NPANXXXXXX format described above if the node is to contain the value.

FIG. 44 is an example of graph utilizing the BN node. The graph in FIG. 44 assigns a carrier, BN and RN for the "800" number identified as the key.

CONVERSATION nodes are used to request and receive information from the calling party through the switch. They assign the call variables that represent the message to played at the switch and the number of digits to be collected from the calling party. The predefined CONVERSATION node templates generate the following nodes:

| PIN | GET10DIGITS | PLAYANNC |

PIN Node—The PIN (Personal Identification Number) node is a CONVERSATION node which requests that an announcement, "Please enter your Personal Identification Number," be played to a caller, requesting that a four-digit code be entered by the caller. After the caller enters the PIN number, the four digits become the value for the "DIGITS" call variable in the incoming conversational TCAP message that is returned to the application for further processing.

A result decision node is used to branch the execution based on the digits received.

FIG. 42 illustrates a graph using the PIN node. In the graph, which as shown is a handover graph, the caller is requested to input a four-digit PIN. If the result is 1234, the call is routed, any other PIN an announcement is played, and the call processing is blocked.

GET10DIGITS Node—The GET10DIGITS node is a CONVERSATION node that requests that an announcement be played to a caller to request that the caller input a 10-digit telephone number. The value for the GET10DIGITS node is a message number which becomes the value for the announce call variable in an outgoing conversational TCAP message. The digits entered by the operator become the value for the DIGITS call variable in the incoming conversational TCAP message that is returned to the application for further processing.

Figure 45:
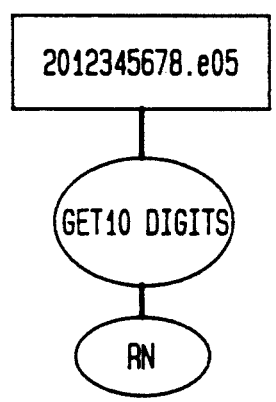
FIG. 45 illustrates an example of a graph using a GET10DIGITS node in accordance with one embodiment of the present invention.

An example of a graph including a GET10DIGITS node is shown, for example, in FIG. 45. This service collects a ten-digit phone number from the calling party and routes the call to that phone number.

PLAYANNC—The PLAYANNC node allows an operator to specify an announcement message (that requests information from an operator) to be played to the caller when the call processing software encounters this node (FIG. 38).

PROCEDURE nodes allow the execution to invoke a routine on behalf of the graph being evaluated. For example, if an operator wanted to log some information about the execution, he could call a routine that he has written and invoke that through the PROCEDURE node. The preferred predefined PROCEDURE nodes are as follows:

| HANDOVER | PROCEDURE | LOAD |
| STORE | | |

HANDOVER Node—The HANDOVER node (HND) is a procedure node which instructs the call processing software to leave the current graph and move to another graph to continue the call processing. The value for a HANDOVER node is the key (up to 10 characters) for the HANDOVER graph. If an operator wishes to add a HANDOVER node to a graph, he is requested to input the key for the HANDOVER graph.

The contents of a HANDOVER graph may be as complex as necessary to provide the requested service. The HANDOVER graph may contain any of the nodes, including one or more HANDOVER nodes. When finished processing a HANDOVER graph, control is returned to the calling graph.

FIG. 39A illustrates a graph including a HANDOVER node. This graph determine whether the call is "ON" or "OFF" the network (NET). If ON, the call is routed. If OFF, execution is transferred to the graph having key "offnet.hnd." Although the HANDOVER node displays the syntax "HANDOVER" to the operator, through graph manipulations (as described herein), the operator can display the values of the HANDOVER node, which is "offnet.hnd" as shown in FIG. 39B.

STORE Node—The STORE node is a PROCEDURE node which allows an operator to store values to the graph variables of a different graph. The value for the STORE node is the key of another valid graph in the system database.

Figure 46:
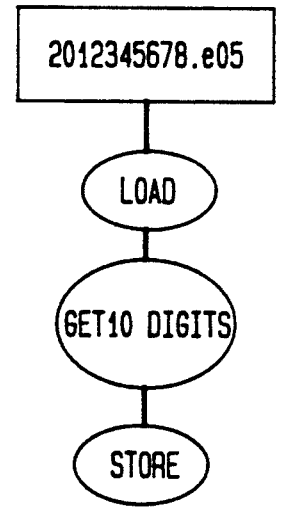
FIG. 46 illustrates an example of a graph using a STORE node in accordance with one embodiment of the present invention.

The STORE node is often used in conjunction with the LOAD node when exchanging or updating call variable values from one graph to another. FIG. 46 illustrates a graph using the STORE node.

PROCEDURE Node—The PROCEDURE node is a PROCEDURE node which allows an operator to select from a group of programming language routines to perform certain call processing tasks. The value for the PROCEDURE node is the name of the routine to be invoked. The customer may want to call a special C routine to log data while executing a graph. This would be facilitated through the PROCEDURE node.

Figure 47:
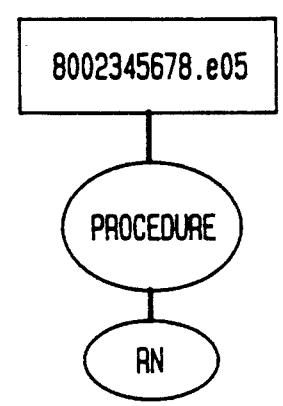
FIG. 47 illustrates an example of a graph using a PROCEDURE node in accordance with one embodiment of the present invention.

FIG. 47 illustrates a graph using the PROCEDURE node. In this graph, the PROCEDURE node involves a routine to log information about the call into a file. A routing number is then assigned by the RN node.

LOAD Node—The LOAD node is a PROCEDURE node which allows an operator to load all of the call variable values stored with a different graph. Once the variables are loaded (e.g. after the execution of the LOAD node), the call processing software can then use these variables. The LOAD node value is the graph key name from which you are loading the variables.

To add a LOAD node to a graph, an operator is requested to input a graph key name of another valid graph contained within the system database. FIG. 46 illustrates a graph using the LOAD node. This graph updates a call forwarding number.

b. Templates

A template is a data structure containing some or all information needed to specify and instantiate a node in a graph. A node is instantiated when it is added to the internal data structure representation. There are four types of templates; one for each type of node. Thus, the preferred templates include a DECISION node template, an ASSIGNMENT node template, a PROCEDURE node template and a CONVERSATION node template. These templates can be used to create any of the specific nodes identified above, or any other desired node.

Figure 48A:
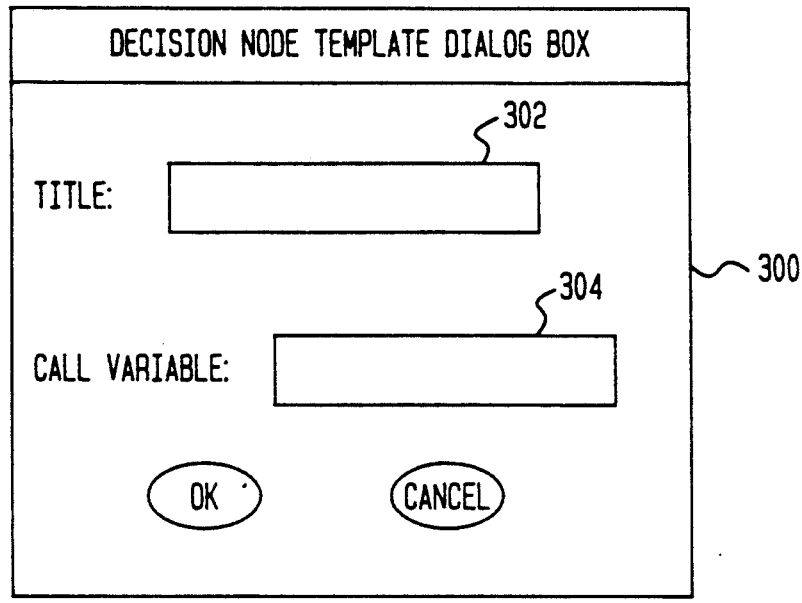
FIG. 48A illustrates a DECISION node template dialog box in accordance with one embodiment of the present invention.

A DECISION node template includes a title and a call variable. When an operator desires to generate a DECISION node, he selects the "NEW DECISION" option in the template menu (see FIG. 12), which prompts display of a dialog box 300, as illustrated in FIG. 48A. The dialog box 300 includes a title field 302 and a call variable field 304. The title field identifies the title or name of the DECISION node template to be created, and the call variable field 304 identifies either a "wild card" or a call variable used by an instantiated node to perform branch comparisons. A "wild card" marks the call variable field as unspecified. This unspecified field is subsequently specified by an operator when the operator selects the template to instantiate a node in a graph.

Figure 48B:
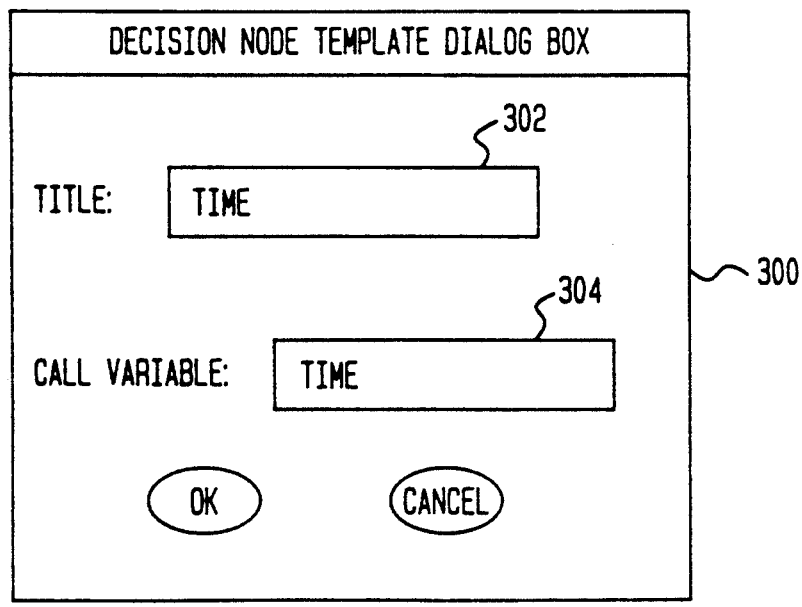
FIG. 48B illustrates a DECISION node template dialog box in accordance with another embodiment of the present invention.

Every field in any template can be a "wild card" which is determined by the operator when instantiating a node. For example, to create a time decision node, as shown in FIG. 48B, an operator enters the title (time) into the title field 302, and the call variable name ("time") into the call variable field 304. The title and value are then used by the TEMPLATE module to generate a TIME DECISION node template. Once the TIME DECISION node template exists, an operator can add time decision nodes to a graph. In a similar manner, an operator can build a "date," "day," "ANI" or any other DECISION node template and use these templates to add nodes to a graph.

Figure 49A:
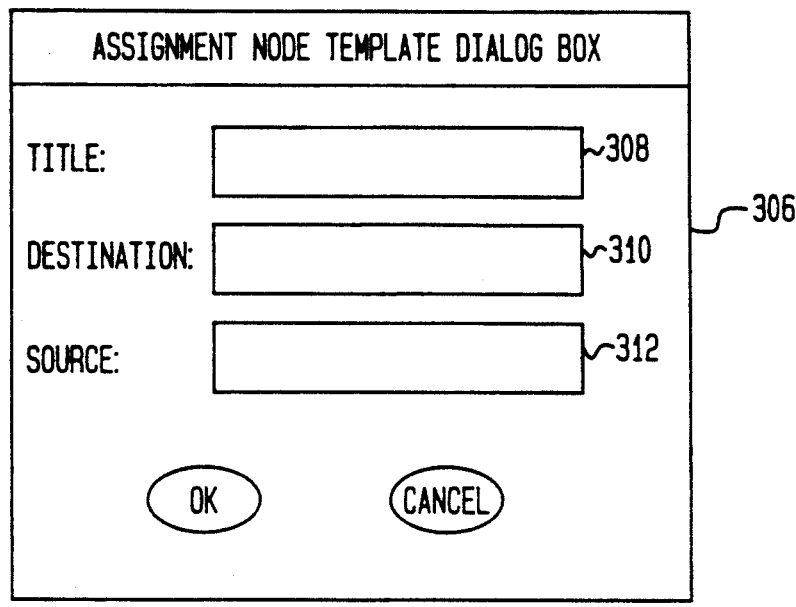
FIG. 49A illustrates an ASSIGNMENT node template dialog box in accordance with one embodiment of the present invention.

An ASSIGNMENT node template includes a title, a first call variable (which is assigned a value), and a second call variable or value (which is assigned to the first call variable). An operator desiring to generate an ASSIGNMENT node template selects the "NEW ASSIGNMENT" option in the template menu (see FIG. 12) which prompts display of a dialog box 306, as illustrated in FIG. 49A. The dialog box 306 includes a title field 308, a first call variable field 310 and a second call variable or value field 312. The title field 308 identifies the title or name of the ASSIGNMENT node template to be created, the first call variable field 310 identifies a "wild card" call variable which is assigned a value, and the second call variable or value field 312 identifies a "wild card" or a call variable or value which is assigned to the first call variable.

Figure 49B:
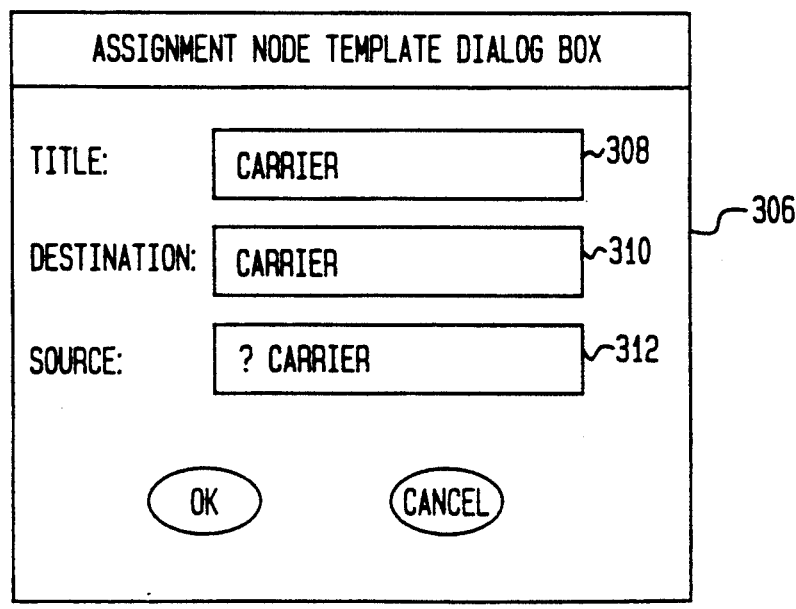
FIG. 49B illustrates an ASSIGNMENT node template dialog box in accordance with another embodiment of the present invention.

For example, to create a CARRIER assignment node template, as shown in FIG. 49B, an operator enters the title (carrier) in the title field 308, enters the call variable (carrier) into the first call variable field 308 and enters the "wild card" "? carrier" into the second call variable or value field 312. For example, the operator may input a three digit acronym corresponding to any long distance carrier company as the value for this "wild card." This information is used by the TEMPLATE node to generate a CARRIER assignment node template, which can be selected by an operator to add CARRIER nodes to a graph.

Figure 50A:
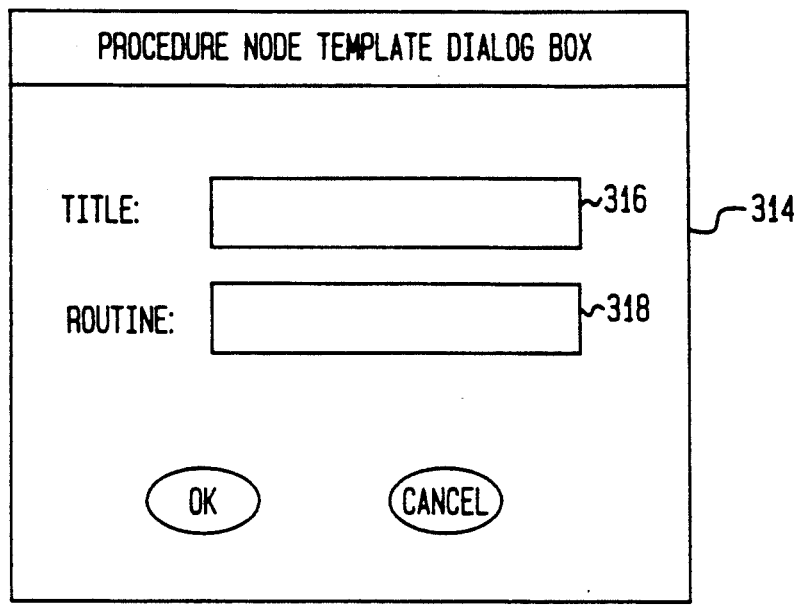
FIG. 50A illustrates a PROCEDURE node template dialog box in accordance with one embodiment of the present invention.
Figure 50B:
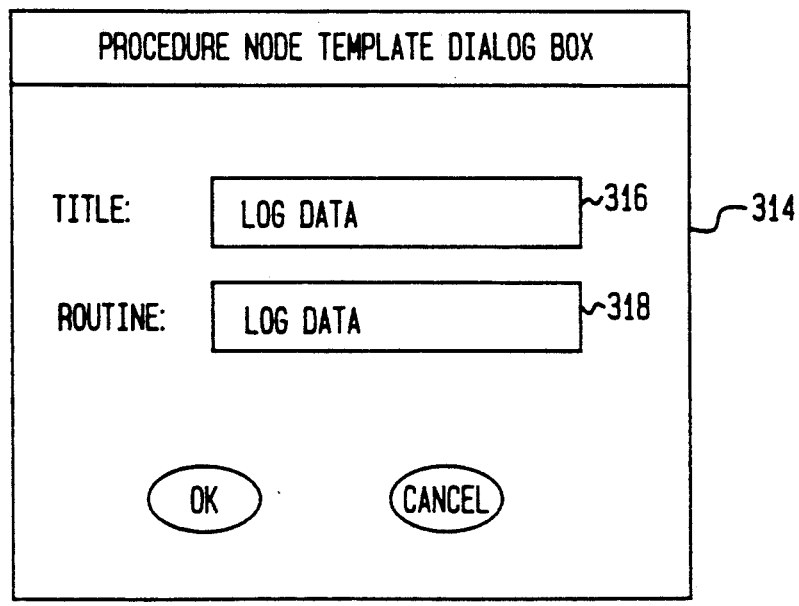
FIG. 50B illustrates a PROCEDURE node template dialog box in accordance with another embodiment of the present invention.

A PROCEDURE node template includes a title and the name of a routine called by this node to execute an identifiable functionality. When an operator desires to generate a PROCEDURE node template, he selects the "NEW PROCEDURE" option in the template menu (see FIG. 12) which prompts display of a dialog box 314, as shown in FIG. 50A. This dialog box 314 includes a title field 316 and a routine field 318. The title field 316 indicates the title of the procedure node template to be created, and the routine field 318 identifies a program routine to be called when this node is generated. For example, assume an operator has a program routine named "log data" which records information about call processing to a file. To create a PROCEDURE node template which calls this routine, as shown in FIG. 50B, the operator inserts the title (log data) and routine (log data) into fields 316 and 318 of the dialog box 314. The operator can then use this node template to insert this node into a graph to call the routine.

Figure 51A:
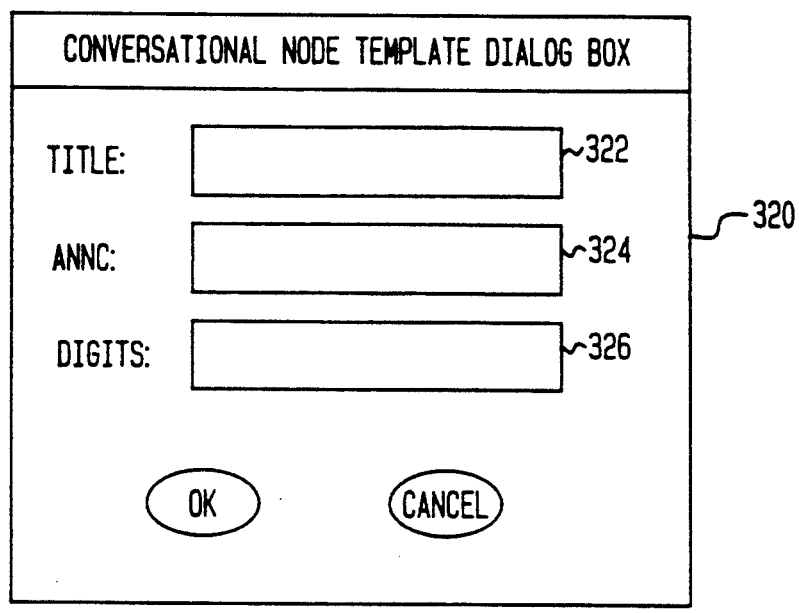
FIG. 51A illustrates a CONVERSATIONAL node template dialog box in accordance with one embodiment of the present invention.

A CONVERSATION node template includes a title, an announcement to be played to a caller and a field representing the number of digits to be collected from the caller. When an operator desires to generate a PROCEDURE node template, he selects the "NEW CONVERSATIONAL" option in the template menu (see FIG. 12) which prompts display of a display box 320, as shown in FIG. 51A. This dialog box 320 includes a title field 322, an announcement field 324 and a digits field 326. The title field indicates the title of the CONVERSATION node to be created, the announcement field identifies the announcement to be played to the caller and the digits field 326 specifies the number of digits the caller should input in response to the announcement.

Figure 51B:
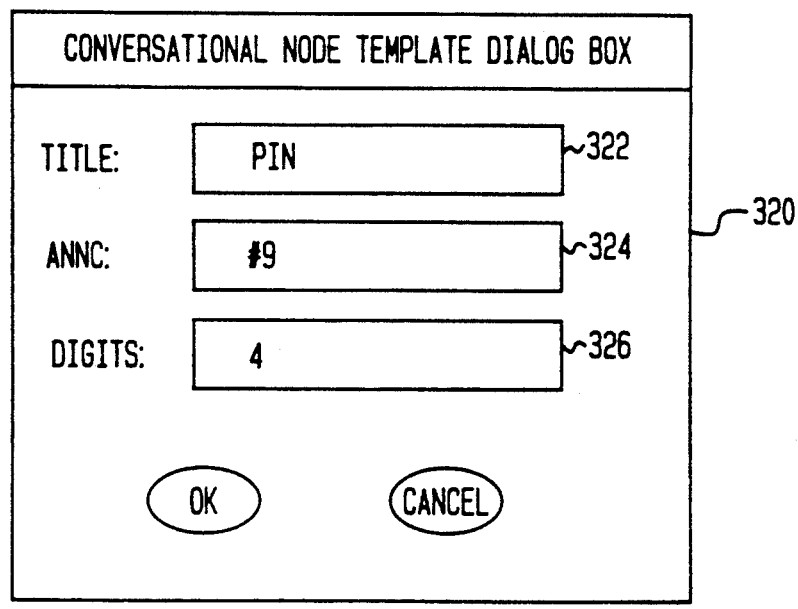
FIG. 51B illustrates a CONVERSATIONAL node template dialog box in accordance with another embodiment of the present invention.

For example, to create a CONVERSATION node template which prompts the caller to enter a four digit personal identification number (PIN), as shown in FIG. 51B, the operator enters "PIN" into the title field 322, enters an index number to a message set to be announced or displayed in announcement field 324, and enters the number of digits comprising the PIN into the digits field 326. This PIN node template can be inserted into a graph to prompt a caller to input a PIN during execution of the graph.

c. EDITING

Figure 52:
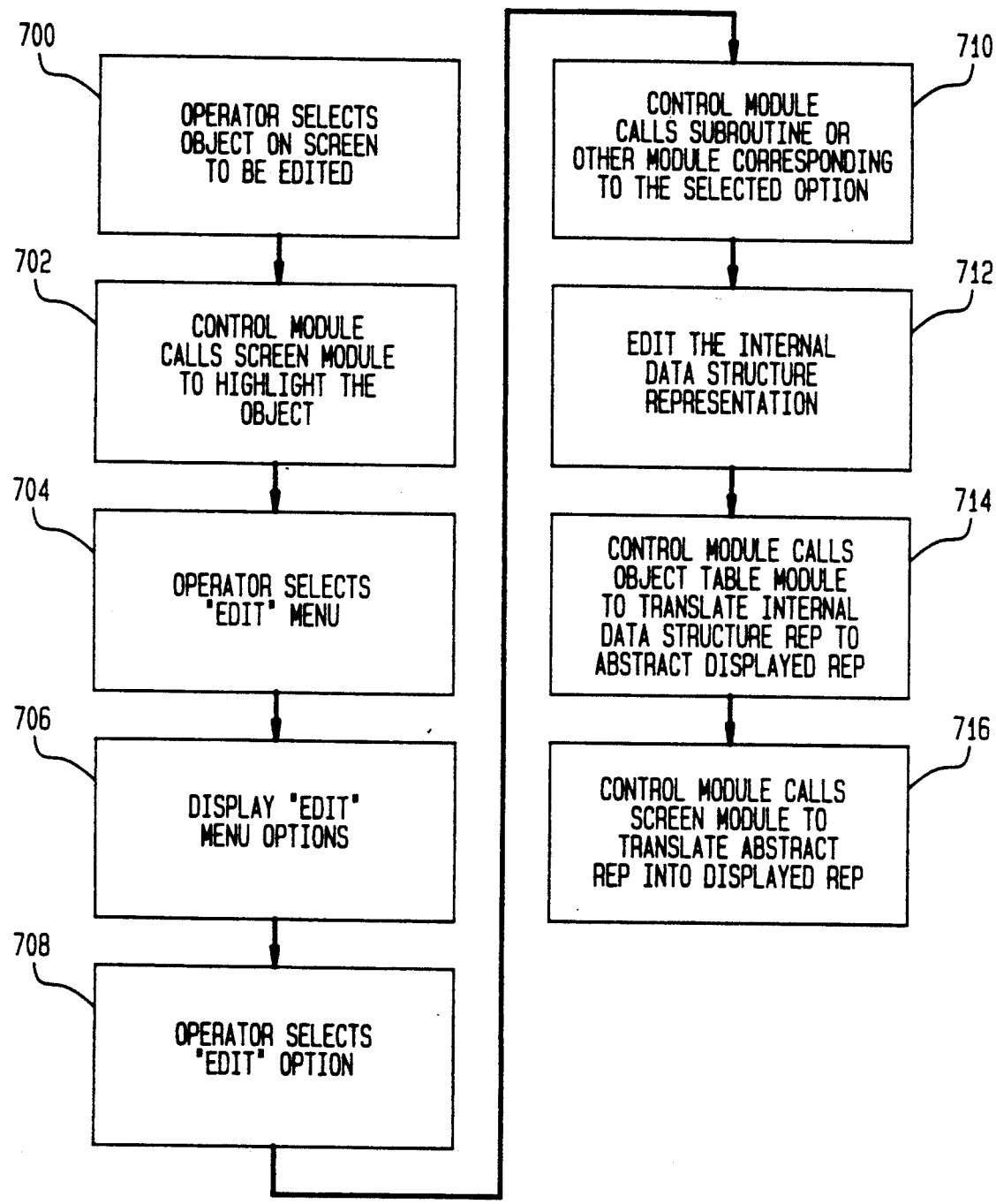
FIG. 52 is a flow diagram illustrating a general edit operating procedure performed by a service creation portion to build a graph after a graph has been initiated, in accordance with one embodiment of the present invention.

FIG. 52 is a flow diagram illustrating a general editing operating procedure performed by service creation portion 54 to build a graph after the graph has been initiated. This flow diagram is generic to each of the "EDIT" menu options 140 shown in FIG. 24. Specific flow diagrams for each of the "EDIT" menu options are described below.

Initially, the operator selects an object on the screen to be edited (step 700). CONTROL module 106 responds by calling SCREEN module 102 to highlight the selected object (step 702). In a preferred embodiment, this highlighting is done by changing the color of the selected object. The operator then selects the "EDIT" menu (step 704) to display the "EDIT" menu options as shown in FIG. 24 (step 706). From those options the operator selects the desired "EDIT" menu option (step 708), and CONTROL module 106 responds by calling a routine or module that controls the selected "EDIT" option (step 710). The called routine or module then edits the internal data structure representation according to the selected EDIT option (step 712).

CONTROL module 106 then calls OBJECT TABLE module 110 to translate the edited internal data structure representation into the abstract display representation (step 714), and finally calls the SCREEN module 102 to translate the abstract display representation into the display representation of the graph (step 716).

Figure 53:
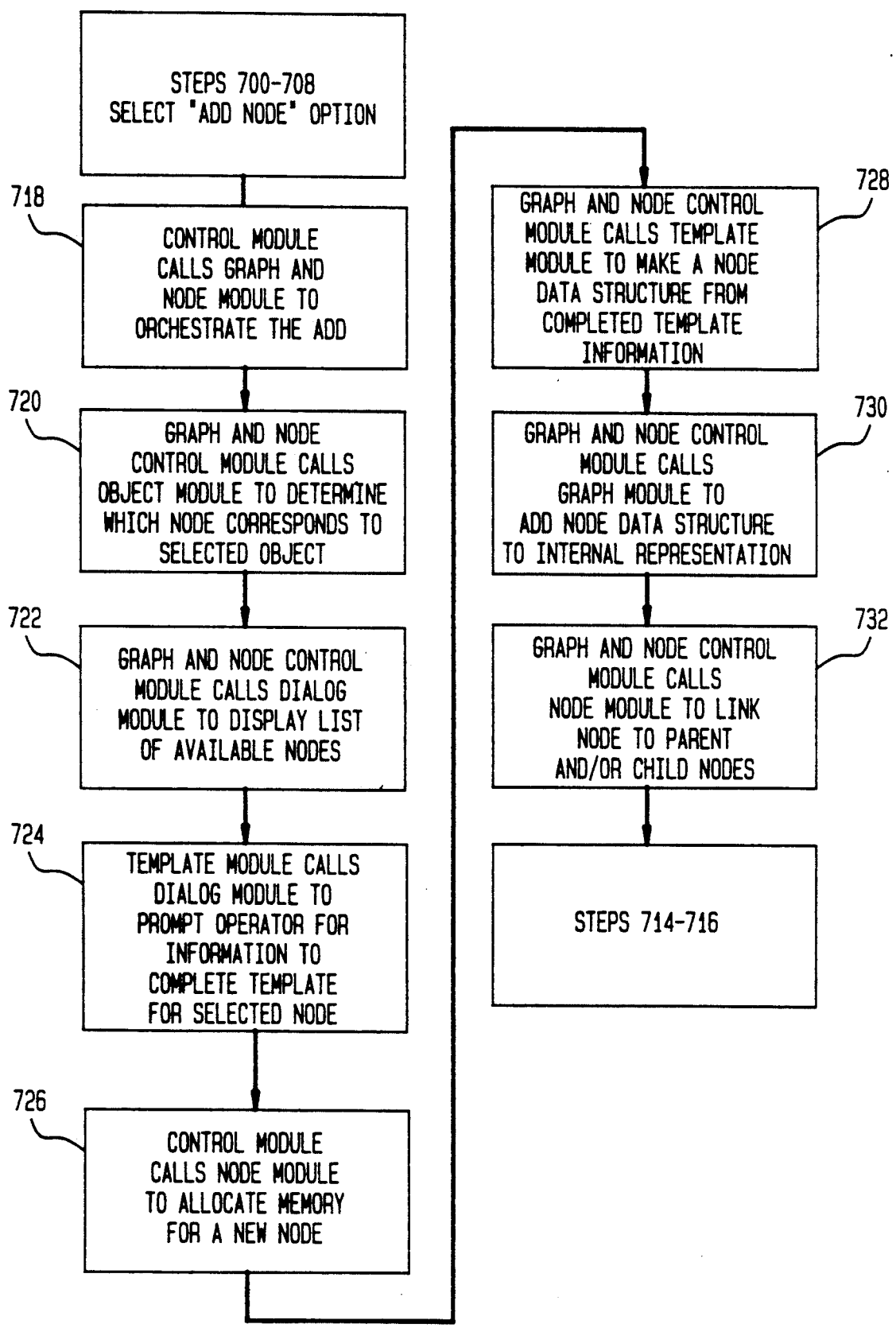
FIG. 53 is a flow diagram illustrating an operation of a service creation portion for adding a node to a graph in accordance with one embodiment of the present invention.

FIG. 53 is a flow diagram illustrating the operation of service creation portion 54 for adding a node to a graph. Steps 700–708 of FIG. 7A are repeated, except that the operator selects the ADD NODE option in the "EDIT" menu. CONTROL module 106 responds by calling GRAPH AND NODE CONTROL module 70 to orchestrate the ADD procedure (step 718). GRAPH AND NODE CONTROL module 70 calls OBJECT module 112 to determine which node corresponds to the selected object (step 720). GRAPH AND NODE CONTROL module 70 then calls DIALOG module 104 to display a list of available nodes (step 722). The operator selects the desires node, and TEMPLATE module 72 calls DIALOG module 104 to prompt the operator for information to complete the template corresponding to the selected node (step 724). CONTROL module 106 then calls NODE module 64 to allocate memory for the new node (step 726).

Next, GRAPH AND NODE CONTROL module 70 calls TEMPLATE module 72 to make a node data structure from the completed template information (step 728). GRAPH AND NODE CONTROL module then calls GRAPH module 62 to add the node data structure to the internal data structure representation (step 730). GRAPH AND NODE CONTROL module 70 then calls NODE module 64 to link the new node to its parent and child nodes (if any) (step 732). Steps 714 and 716 are then performed to translate the internal data structure representation into the abstract displayed representation and to display the graph.

Figure 54:
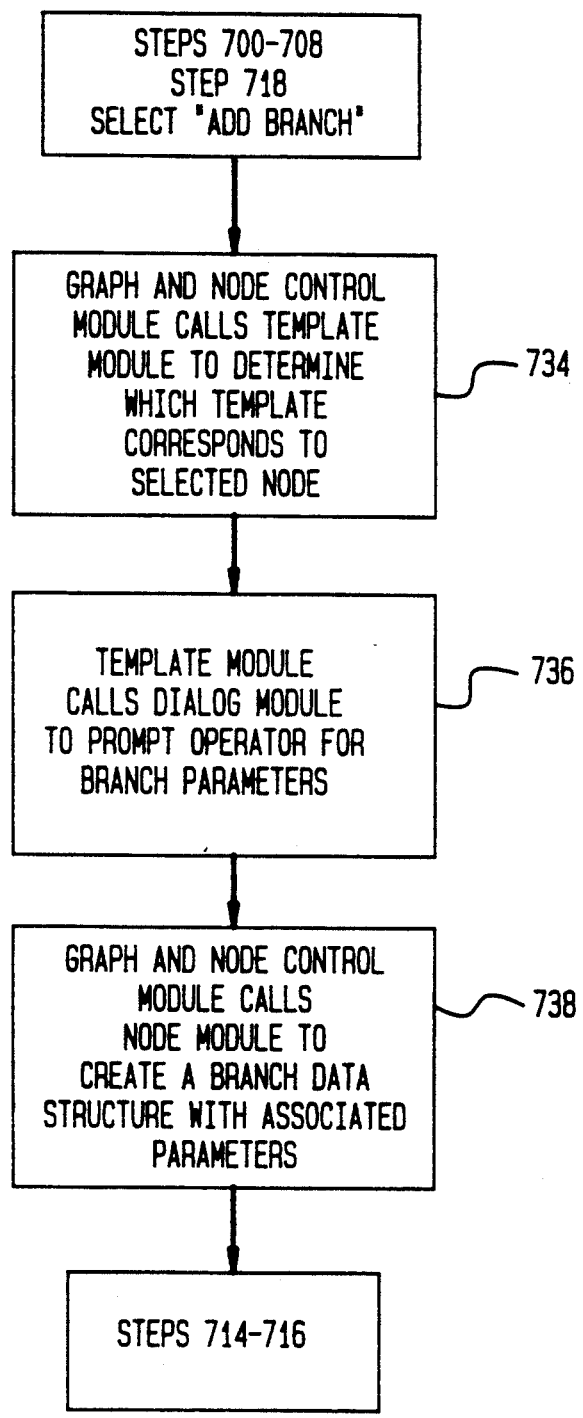
FIG. 54 is a flow diagram illustrating an operation of a service creation portion for adding a branch to a graph in accordance with one embodiment of the present invention.

FIG. 54 is a flow diagram illustrating the operation of service creation portion 54 for adding a branch to a graph. Initially, steps 700–708 and 718 are performed, except that the operator selects the "ADD BRANCH" option. GRAPH AND NODE CONTROL module 70 calls TEMPLATE module 72 to determine which template corresponds to the selected node (step 734). To do this, the fields of the node are matched to each field of each template. The template which most completely matches the node is selected as the corresponding template.

TEMPLATE module 72 then calls DIALOG module 104 to prompt the operator for a branch value or values (step 736). Next, GRAPH AND NODE CONTROL module 70 calls NODE module 64 to create a branch data structure with the associated parameters (step 738). Steps 714 and 716 are then repeated to translate the internal data structure representation into an abstract displayed representation and into the displayed graph.

Figure 55:
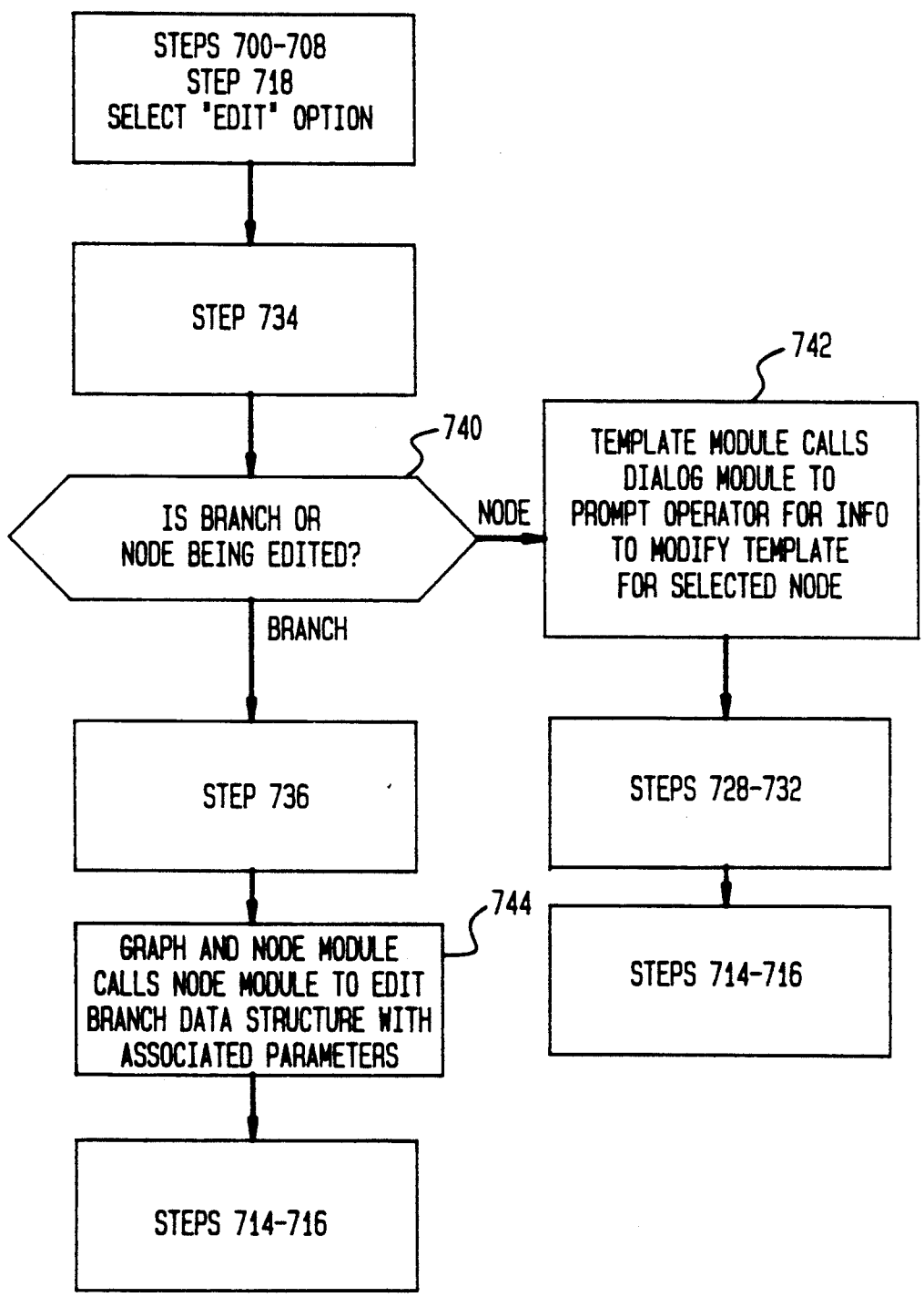
FIG. 55 is a flow diagram illustrating an operation of a service creation portion for editing a value in a graph in accordance with one embodiment of the present invention.

FIG. 55 is a flow diagram illustrating the operation of service creation portion 54 for editing a value in the graph. Initially steps 700–708 and 718 are performed except that the operator selects the "EDIT" option. Then, step 734 from FIG. 54 is performed. Next, GRAPH AND NODE module 70 determines if a branch or node is being edited (step 740). If a node is being edited, TEMPLATE module 72 calls DIALOG module 104 to prompt the operator for information to modify the template for the selected node (step 742). Subsequently, steps 728–732, shown in FIG. 53, are performed, and steps 714–716 are performed to translate the internal data structure representation into an abstract displayed representation and to display the graph on the screen. If in step 740 it is determined that a branch is being edited, step 736 shown in FIG. 54 is performed. GRAPH AND NODE module 70 then calls NODE module 64 to edit the branch data structure with associated parameters (step 744). Steps 714–716 are then performed.

Figure 56:
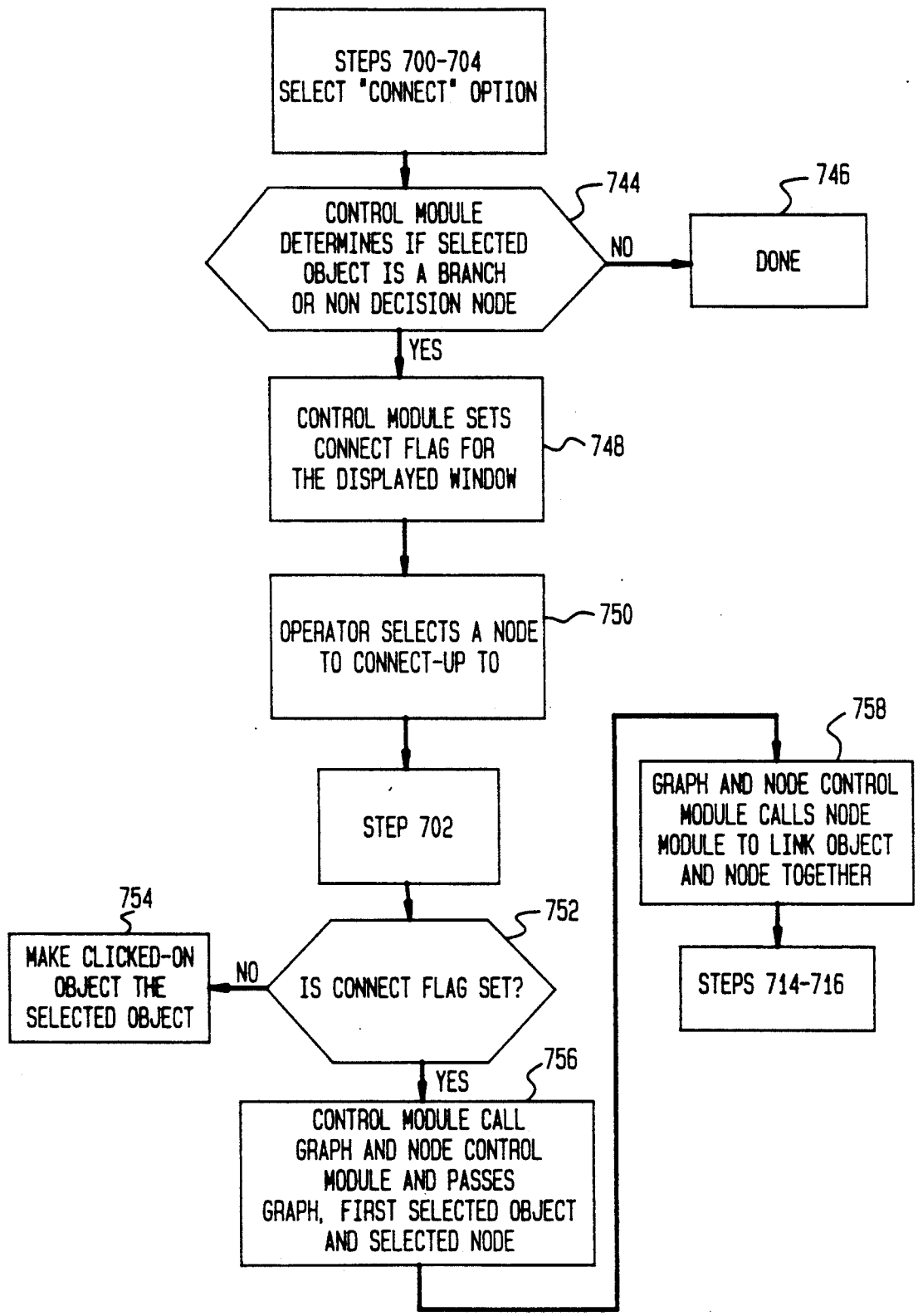
FIG. 56 is a flow diagram illustrating an operation of a service creation portion for connecting one node in a graph to another node in a graph in accordance with one embodiment of the present invention.

FIG. 56 is a flow diagram illustrating the operation of service creation portion 54 for connecting one node of a graph to another node in the graph. This is a convenience feature which allows an operator to refer to a first portions of the completed graph to complete another portion of the graph without duplicating the first portion of the graph.

Initially, steps 700–704 are performed except that the operator selects the "CONNECT" option. CONTROL module 106 then determines whether the selected object represents a node (step 744). If the selected object does not represent a branch or non-DECISION node, processing is done (step 746). If the selected object represents a node, CONTROL module 106 sets a connect flag (not shown) for the displayed window (step 748). The operator then selects an existing node in the graph to which to connect the selected object (step 750). Step 702 is then performed. CONTROL module 106 then determines whether the connect flag is set (step 752). If the connect flag is not set, the "clicked-on" object becomes the selected object (step 754). If the connect flag is set, CONTROL module 106 calls GRAPH AND NODE CONTROL module 70 and passes graph, first-selected object and selected-node information to GRAPH AND NODE CONTROL module 70 (step 756). GRAPH AND NODE CONTROL module 70 calls NODE module 64 to link the selected object and the selected node together (step 758). Once this is done, steps 714–716 are performed to display the graph.

Figure 57:
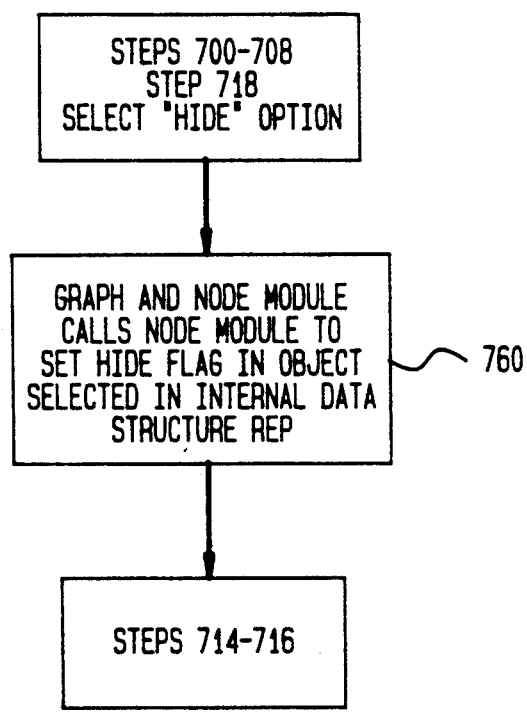
FIG. 57 is a flow diagram illustrating an operation of a service creation portion to hide a portion of a displayed graph in accordance with one embodiment of the present invention.

FIG. 57 is a flow diagram illustrating the operation of service creation portion 54 to "hide" a portion of the displayed graph. To "hide" a portion of the graph means to delete it from the displayed graph without deleting it from the other representations of the graph.

Initially, steps 700–708 and 718 are performed except that the operator selects the "HIDE" option. GRAPH AND NODE module 70 then calls NODE module 64 to set the "hide" flag for the selected object in the data structure graphical representation. Steps 714–716 are then performed to display the graph. However, in this embodiment during step 714, OBJECT TABLE module 110 determines if the "hide" flag has been set for each node. Since, in our example, the "hide" flag has been set, OBJECT TABLE module 110 does not translate any of the children nodes of the node for which the hide flag has been set into the abstract displayed representation of the graph. This prevents its further translation onto the screen such that this portion of the graph appears hidden. This is advantageous if the CCPI records is large and has many branches.

Figure 58:
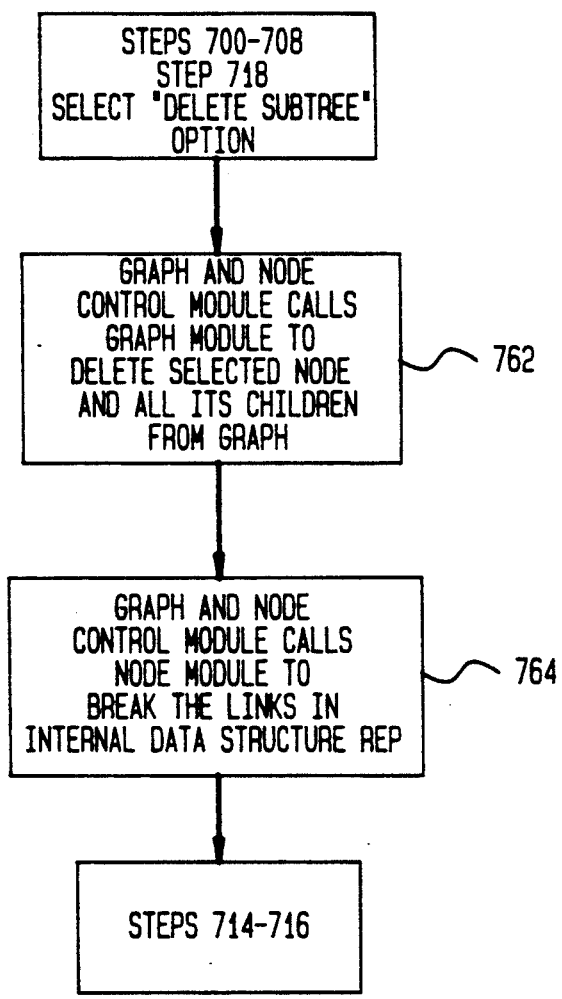
FIG. 58 is a flow diagram illustrating an operation of a service creation portion to delete a predetermined portion of a graph in accordance with one embodiment of the present invention.

FIG. 58 is a flow diagram illustrating the operation of service creation portion 54 for deleting a predetermined portion of a graph. Initially, steps 700–708 and 718 are performed except that the operator selects the "DELETE SUBTREE" option. GRAPH AND NODE CONTROL module 70 then calls GRAPH module 62 to delete the selected node and all its children from the graph (step 762). GRAPH AND NODE CONTROL 70 module calls NODE module 64 to break the links between the nodes which are to be deleted and the nodes which remain in the graph in the internal data structure representation (step 764). Steps 714-716 are then repeated to display the graph.

Figure 59:
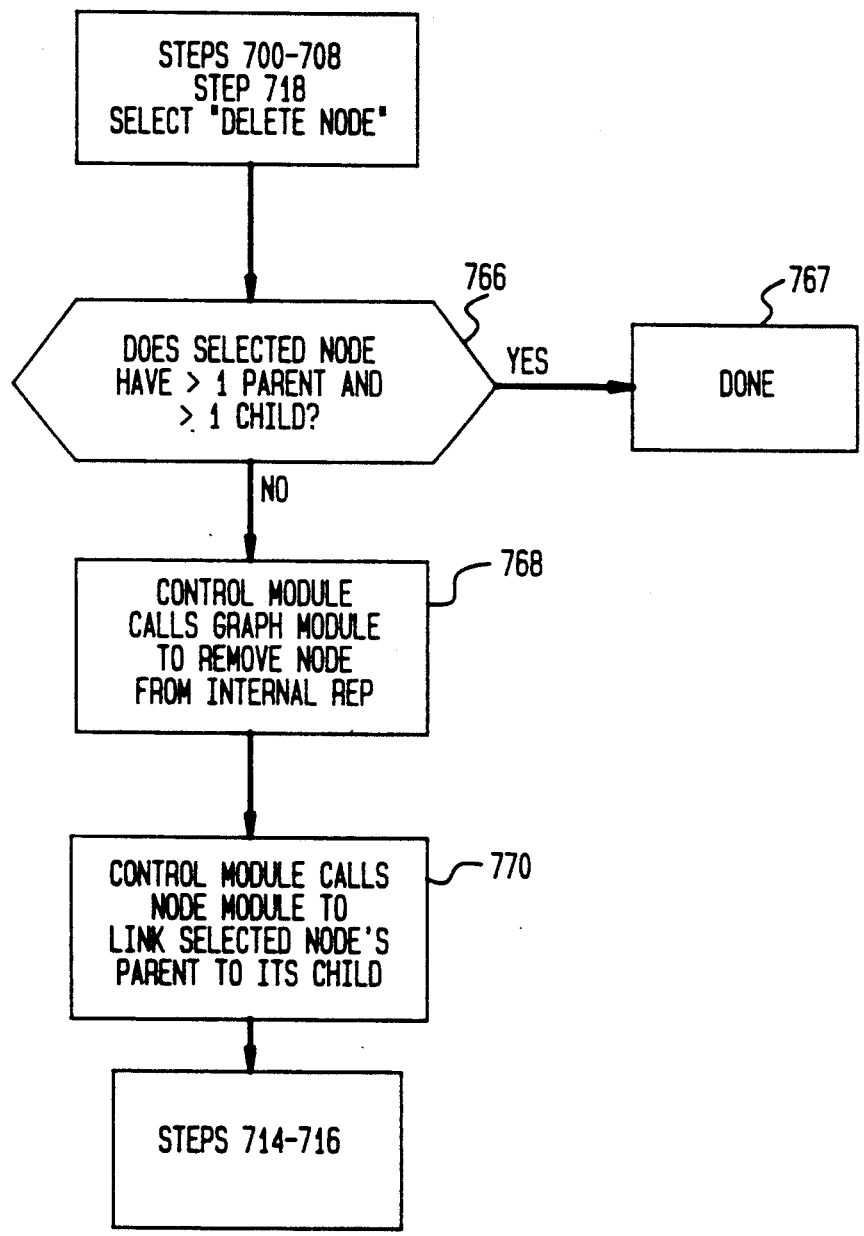
FIG. 59 is a flow diagram illustrating an operation of a service creation portion to delete a node from a graph in accordance with one embodiment of the present invention.

FIG. 59 is a flow diagram illustrating the operation of service creation portion 54 to delete one node from a graph. Initially, steps 700-708 and 718 are repeated except that the operator selects the "DELETE NODE" option. GRAPH AND NODE module 70 determines whether or not the selected node has more than one parent or more than one child. If yes, this operation is not completed and processing is finished (step 767). If not, CONTROL module 106 calls GRAPH module 62 to remove the node from the internal data structure representation (step 768). CONTROL module 106 then calls NODE module 64 to link the selected node's parent to its child (step 770). Steps 714 and 716 are then repeated to display the graph.

Figure 60:
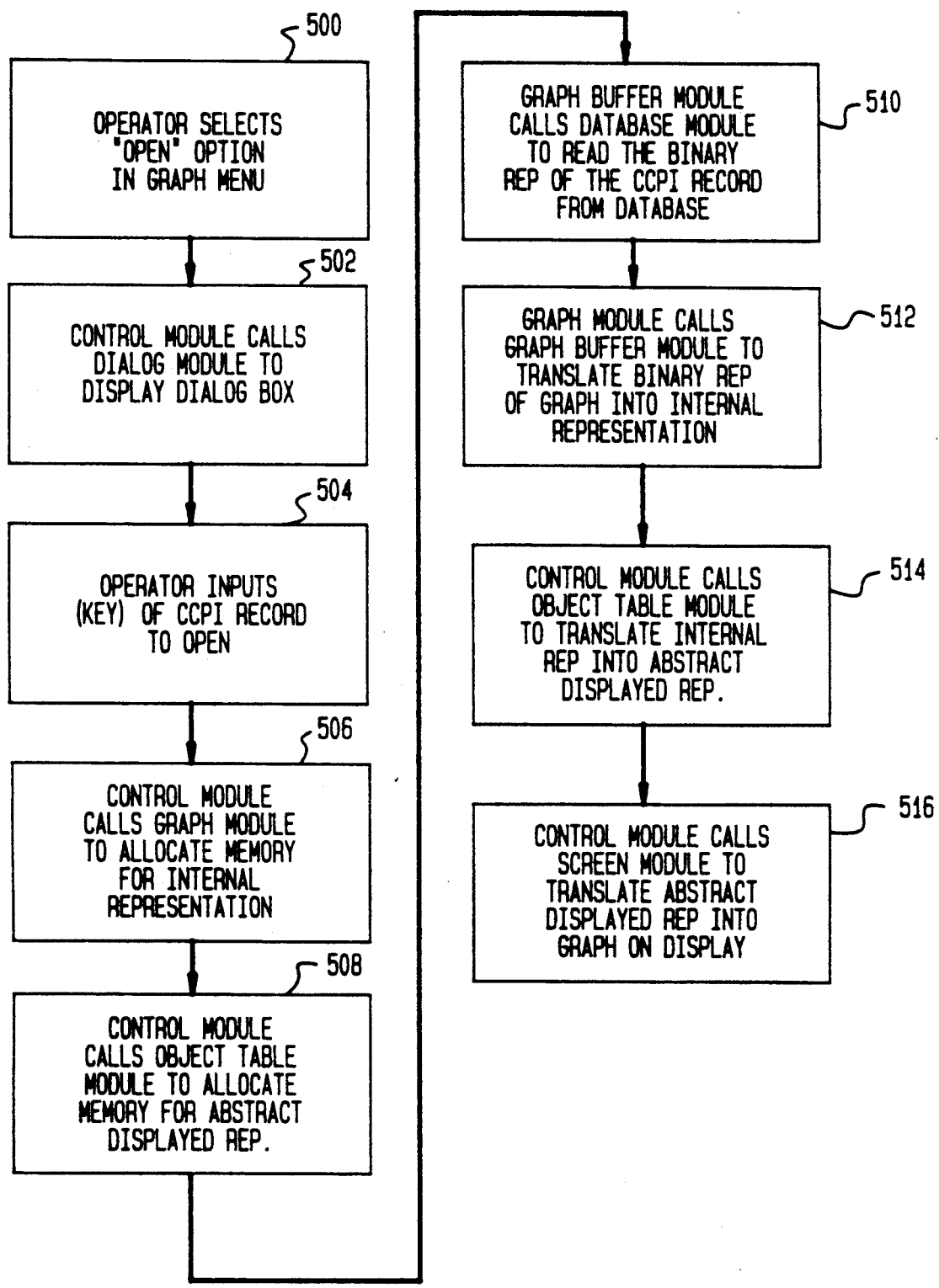
FIG. 60 is a flow diagram illustrating an operation of a service creation portion to open an existing stored graph in accordance with one embodiment of the present invention.

Using the foregoing operations, an operator can create a graph to provide any desired service. If instead of creating a new graph an operator desires to open an existing stored graph, the operation of service creation portion 54 is as shown by the flow diagram in FIG. 60.

Initially, the operator displays the GRAPH menu options and selects the "OPEN" option (step 500). CONTROL module 106 responds by calling DIALOG module 104 to display the corresponding dialog box shown in FIG. 18 (step 502). The operator then inputs the "key" of the graph he desires to open (step 504) and CONTROL module 106 calls GRAPH module 62 to allocate memory for the internal data structure representation of the graph to be displayed (step 506). GRAPH BUFFER module 78 then calls DATABASE module 98 to read the binary information corresponding to the graph from the database (such as database 42 in FIG. 4A) (step 510). GRAPH module 62 calls GRAPH BUFFER module 78 to translate the binary representation of the graph into the internal data structure representation of the graph (step 512). Next, CONTROL module 106 calls OBJECT TABLE module 110 to translate the internal data structure representation of the graph into the abstract displayed representation (step 514), and calls SCREEN module 102 to translate the abstract displayed representation of the graph into the displayed graph format (step 516).

Figure 61:
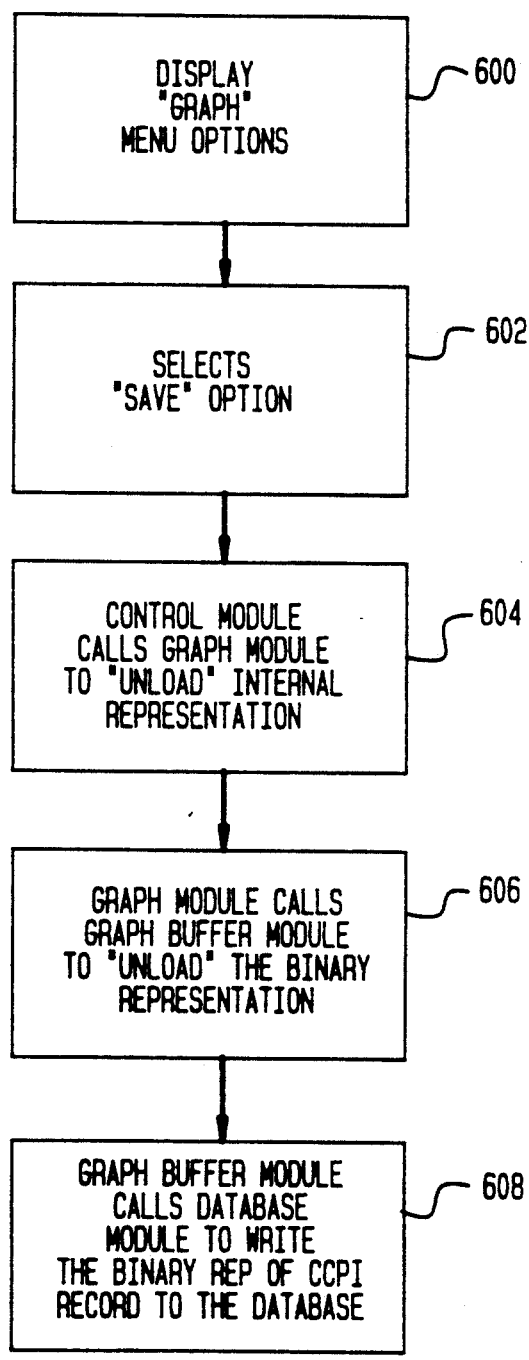
FIG. 61 is a flow diagram illustrating an operation of a service creation portion to save a graph to a database in accordance with one embodiment of the present invention.

FIG. 61 is a flow diagram illustrating the operation of service creation portion 54 to save a graph to a database. Initially, the operator displays the graph menu options shown in FIG. 16 (step 600), and selects the "SAVE" option (step 602). In response, CONTROL module 106 calls GRAPH module 62 to "unload" the internal data structure representation of the graph (step 604). GRAPH module 62 calls GRAPH BUFFER module 78 to "unload" the binary representation of the graph (step 606). GRAPH BUFFER module 78 calls DATABASE module 98 to write the binary representation of the graph to the database 42 (step 608).

If a graph is to be saved according to a new name (such as when a graph has been changed and is to be correspondingly renamed (a new "key")), step 602 in FIG. 61 is changed in that the operator instead selects the "SAVE AS" option and an additional step (not shown) is added between steps 602 and 604 in which CONTROL module 106 calls DIALOG module 104 to display a dialog box (not shown) prompting the operator to input the new "key" for the graph.

D. SERVICE CREATION USING "976 CALL SCREENING" INTERFACE

Operation of service creation portion 54 for creating a "976" form interface will now be discussed with regard to FIG. 2. To create a "976" call screening service, an operator selects the 976 form option of the INTERFACE menu as shown in FIG. 32. A blank "976" call screening form similar to that illustrated in FIG. 2, but excluding the completed information, then appears on the screen. The "976" call screening form 8 includes a customer key 70, a general extension menu 72, comprising screen option 74, permit option 76 and time of day parameter 78, and a plurality of special menus 80 including phone parameter 82, screen option 74, permit option 76 and time parameters 78. The "976" call screening form 8 also includes a PIN override option 86, as well as a PIN parameter 88, and "save" "load" "new" and "exit" options 90, 92, 94 and 96, respectively.

An operator simply inputs the appropriate information and selects the appropriate options to provide the desired "976" call screening service. Once the operator has input the information to complete the "976" call screening form, PROVISION module 114 analyzes the information and calls the appropriate modules in the internal data structure representation to translate the information into the internal data structure representation. This internal data structure representation can be translated into the binary representation just as in the case with the corresponding graphs as shown in FIG. 1. To display the "976" call screening form, PROVISION module 114 translates the internal data structure representation into the abstract displayed representation, and then SCREEN module 102 translates the abstract displayed representation into the displayed "976" call screening form 8.

E. CALL PROCESSING

Call processing portion 56 shown in FIGS. 4A-4D preferably comprises all the modules corresponding to the binary representation of a CCPI record as shown in FIG. 6B, although preferably, calls are predominately processed by COMMUNICATE module 84, MESSAGE HANDLER module 86 and CALL CONTEXT module 88.

Figure 62:
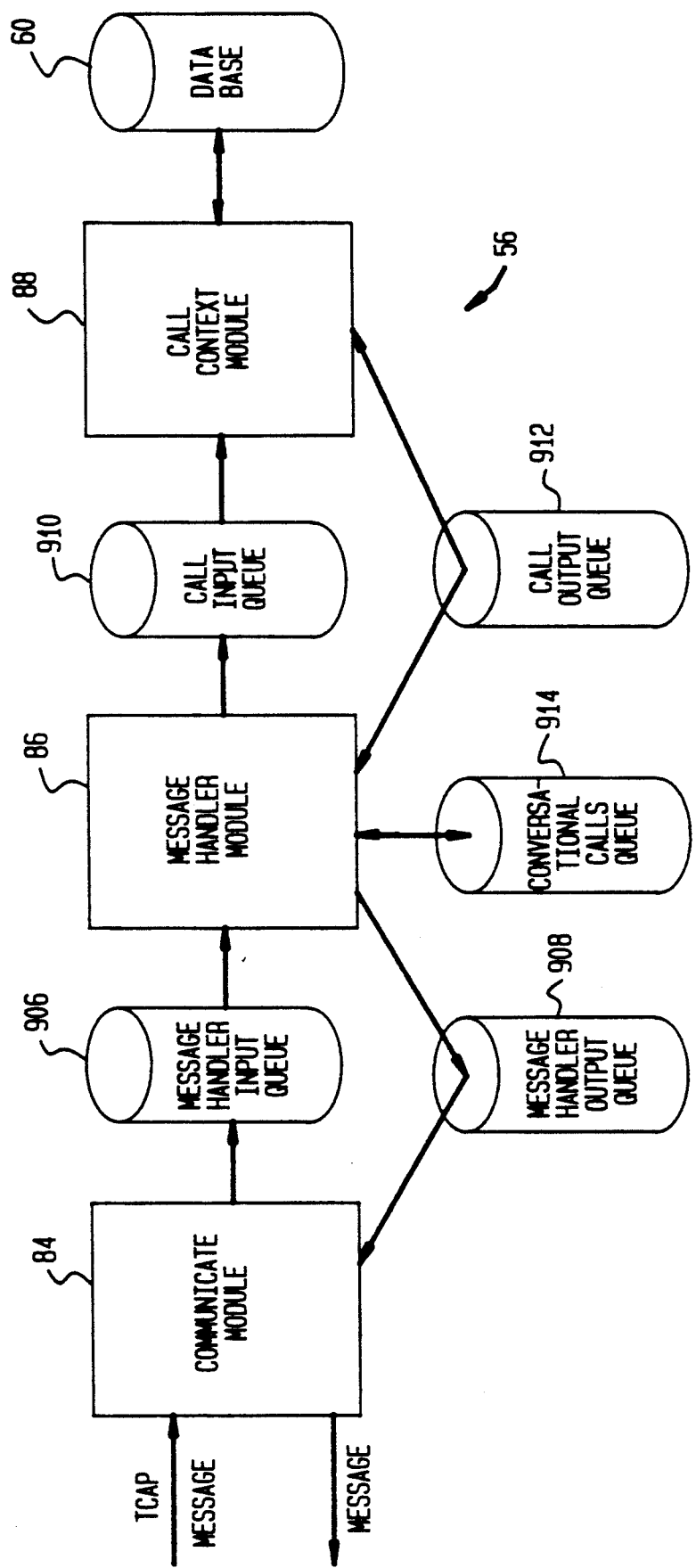
FIG. 62 is a functional block diagram of a call processing portion in accordance with one embodiment of the present invention.

FIG. 62 is a functional block diagram of call processing portion 56. Preferably, call processing portion 56 includes COMMUNICATE module 84, MESSAGE HANDLER module 86, CALL CONTEXT module 88, message handler input queue 906, message handler output queue 908, call input queue 910, call output queue 912 and conversational calls queue 914. COMMUNICATE module 84 is connected to message handler input queue 906 and message handler output queue 908, and receives and outputs messages to a remote device, such as a switch or switch simulator. MESSAGE HANDLER module 86 is connected to message handler input queue 906, message handler output queue 908, call input queue 910, call output queue 912 and conversational calls queue 914. CALL CONTEXT module 88 is connected to call input queue 910, call output queue 912 and database 60. A description of the operation of the call processing application will now be provided in conjunction with FIG. 62 and the flow diagrams of FIGS. 63A-67.

FIGS. 63A and 63B are flow diagrams of the call processing operations of COMMUNICATE module 84. COMMUNICATE module 84 continuously monitors an input port (not shown) for messages from a remote device. In one embodiment, COMMUNICATE module responds to .e04, .e05. and .e02 messages in accordance with AIN release 0. In another embodiment, COMMUNICATE module 84 responds to other messages input from the remote device, including those messages provided for in future AIN releases such as AIN releases 1 and 2.

In FIG. 63A, COMMUNICATE module 84 determines whether any messages are available for processing (step 1000). If not, COMMUNICATE module 84 continues to look for a message to be processed. If a message is available for processing, COMMUNICATE module 84 reads the message (step 1002) and places the message onto message handler input queue 906 (step 1004). COMMUNICATE module 84 then continues to look for a new message to be processed.

In FIG. 63B, COMMUNICATE module 84 looks for any messages on message handler output queue 908 (step 1006). If no message exists, COMMUNICATE module 84 continues to look for messages. If a message is on message handler output queue 908, COMMUNICATE module 84 gets the message (step 1008) and sends the message to the remote device (step 1010). COMMUNICATE module 84 then continues to look for messages on message handler output queue 908.

Figure 64A:
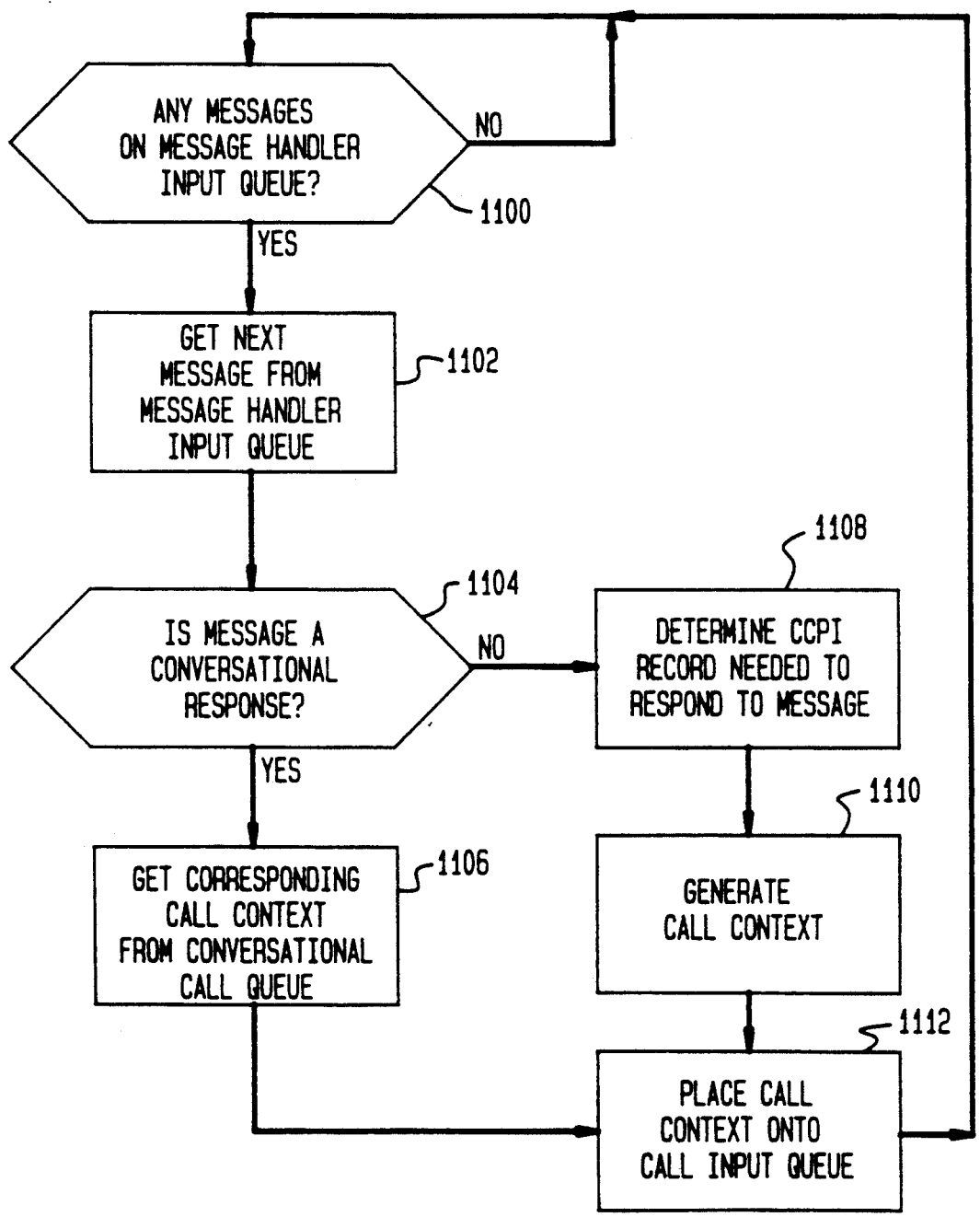
FIGS. 64A and 64B are flow diagrams illustrating a call processing operation of a MESSAGE HANDLER module in accordance with one embodiment of the present invention.

FIG. 64A illustrates the call processing operation of MESSAGE HANDLER module 86. MESSAGE HANDLER module 86 looks for messages on message handler input queue 906 (step 1100). If no message is available, MESSAGE HANDLER module 86 continues to look for messages. If a message is on message handler input queue 906, MESSAGE HANDLER module 86 gets the message (step 1102) and determines whether the message is a conversational response (step 1104). If the message is not a conversational response, MESSAGE HANDLER module 86 determines the appropriate CCPI record needed to respond to the message (step 1108) and generates a call context corresponding to the message (step 1110).

Figure 65:
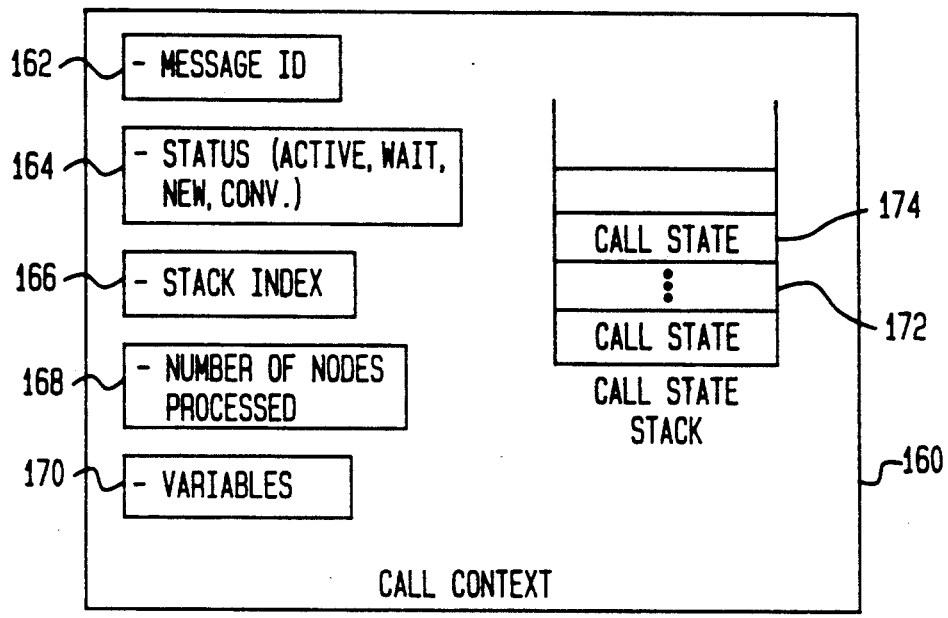
FIG. 65 is a functional block diagram of a call context in accordance with one embodiment of the present invention.

As shown in FIG. 65, call context 160 maintains information corresponding to the execution of a call during call processing. This information includes message identification number 162, call status 164, (e.g. active, wait, new or conversational), stack index 166, number of nodes processed 168, a list of call variables 170 and call state stack 172. Call stack 172 may contain one or more call states 174.

Figure 66:
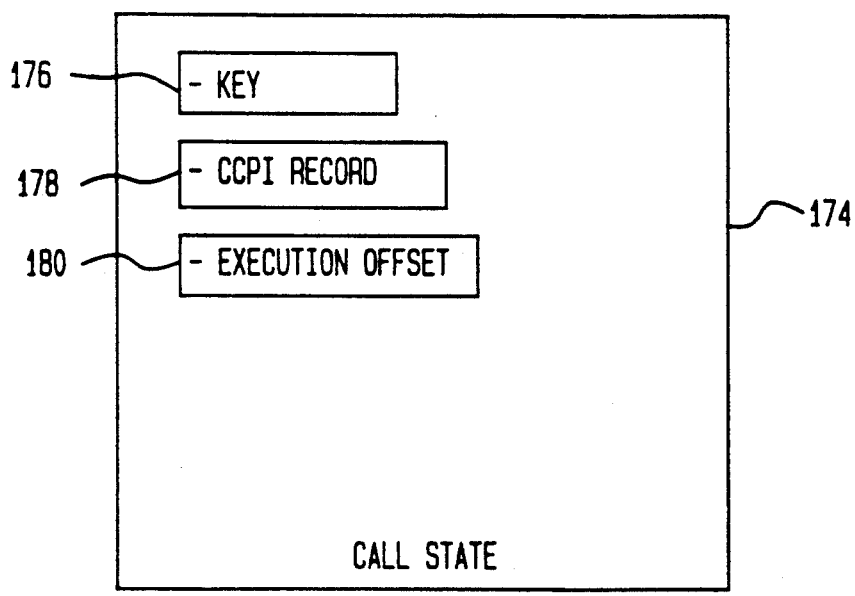
FIG. 66 is a functional block diagram of a call state in accordance, with one embodiment of the present invention.

A call state 174 maintains information corresponding to the execution of an individual CCPI record during call processing. As shown in FIG. 66, The information maintained by call state 174 includes the "key" of the CCPI record 176, the CCPI record 178 and the execution offset 180 which corresponds to the current location of the execution in the CCPI record.

Once a call context 160 has been generated, MESSAGE HANDLER module 86 places call context 160 onto call input queue 910 (step 1112) and the call processing operation of MESSAGE HANDLER 86 module shown in FIG. 64A is repeated. If in step 1104 it is determined that the message is a conversational response, MESSAGE HANDLER module 86 gets the corresponding call context from conversational calls queue 914 (step 1106) and places call context 160 onto call input queue 910 (step 1112).

Figure 64B:
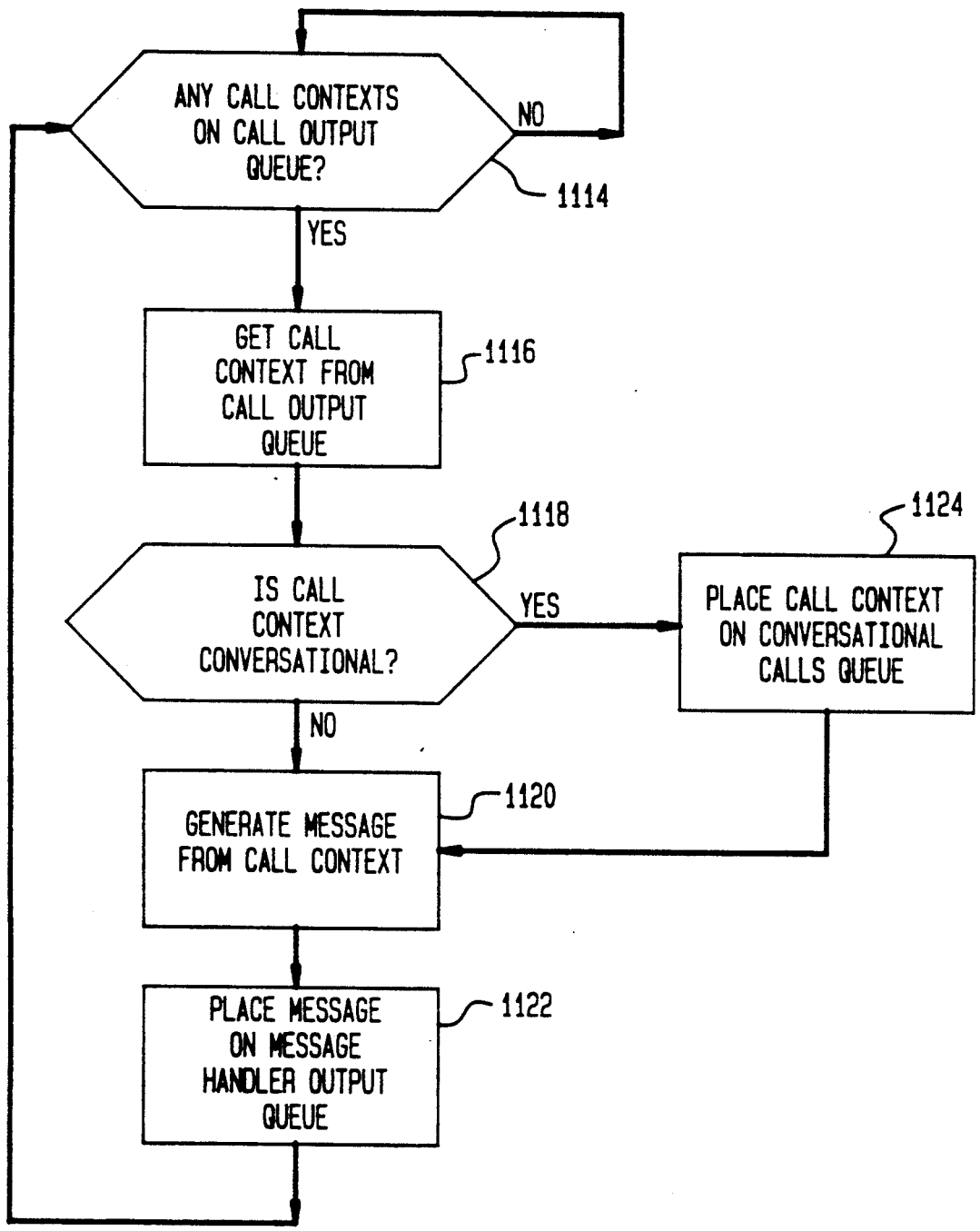

FIG. 64B illustrates another call processing operation performed by MESSAGE HANDLER module 86. MESSAGE HANDLER module 86 determines whether a call context 160 is on call output queue 912 (step 1114). If not, MESSAGE HANDLER module 86 continues to look for a call context 160. If a call context 160 is on call output queue 912, MESSAGE HANDLER module 86 gets the call context 160 (step 1116) and determines whether call context 160 is conversational (step 1118).

If call context 160 is conversational, call context 160 is placed on conversational calls queue 914 (step 1124) until, as described with regard to FIG. 64A, an input message corresponding to call context 160 is again processed by MESSAGE HANDLER module 86. If call context 160 is not conversational, MESSAGE HANDLER module 86 generates a message from call context 160 (step 1120) and places the message on message handler output queue 908 (step 1122). The call processing operation shown in FIG. 64B is then repeated by MESSAGE HANDLER module 86.

Figure 67:
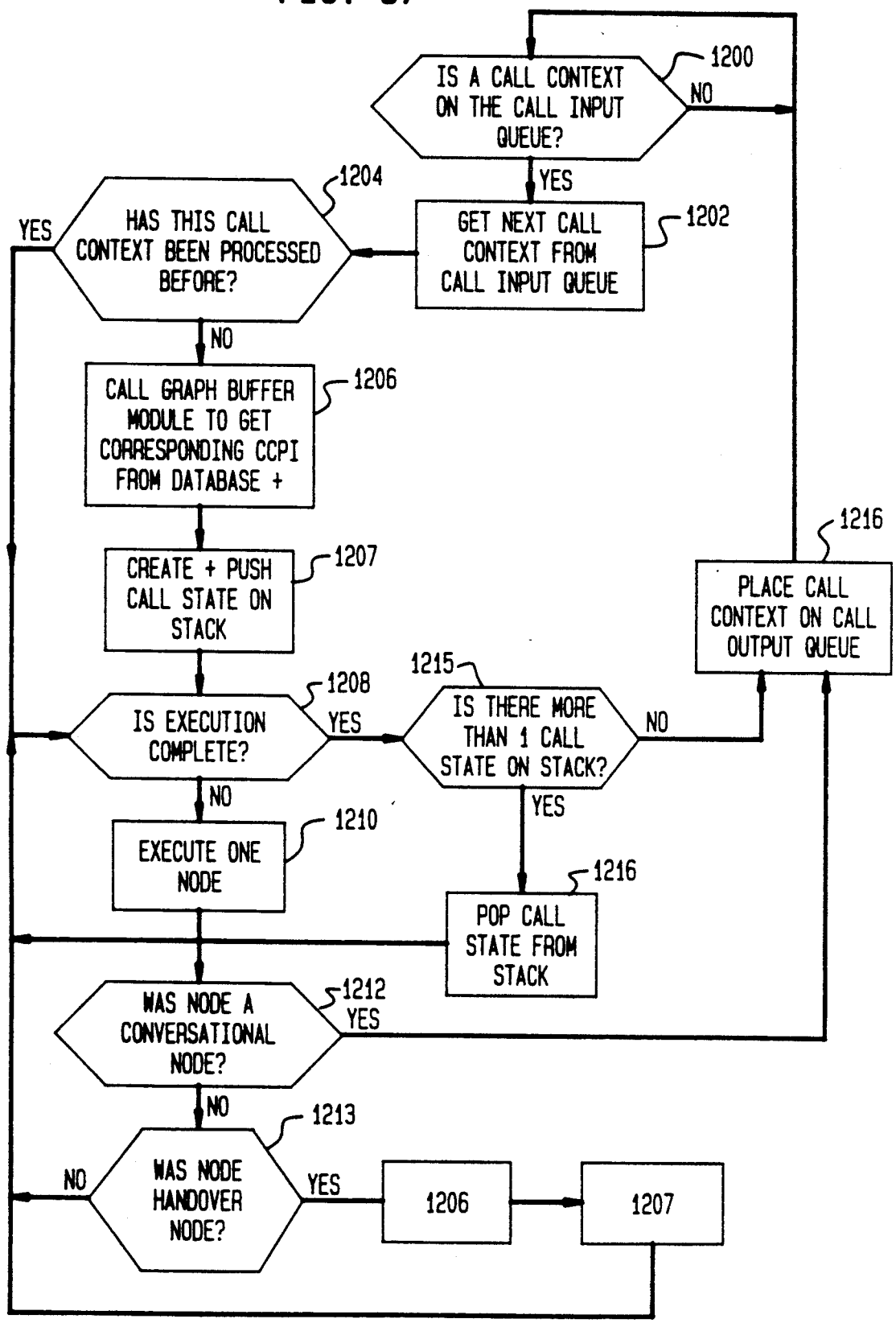
FIG. 67 is a flow diagram of a call processing operation performed by a CALL CONTEXT module in accordance with one embodiment of the present invention.

FIG. 67 illustrates a flow diagram of the call processing operation performed by CALL CONTEXT module 88. CALL CONTEXT module 88 monitors call input queue 910 for a call context 160 (step 1200). If no call context 160 is on call input queue 910, CALL CONTEXT module 88 continues to look for a call context 160. If a call context 160 is on call input queue 910, CALL CONTEXT module 88 gets call context 160 (step 1202) and determines whether call context 160 has been processed previously (step 1204). If not, CALL CONTEXT module 86 calls GRAPH BUFFER module 78 (not shown in FIG. 67) to get the corresponding CCPI record from database 60 (step 1206). CALL CONTEXT module 86 then creates a call state 174 to manage the execution of that CCPI record and pushes the call state 174 onto call state stack 172 of call context 160 (step 1207).

If in step 1204 call context 160 has previously been processed, CALL CONTEXT module 88 determines whether execution of the CCPI record is complete (step 1208). This is done by checking the execution offset 180 in call state 174.

After creating and pushing a call state 174 onto call state stack 172 in step 1207, CALL CONTEXT module 914 also determines whether execution of the CCPI record is complete (step 1208). If the CCPI record has not been completely executed, call MODULE 88 executes one node of the CCPI record (step 1210). After executing a node, CALL CONTEXT module 88 determines whether the node is a CONVERSATION node (step 1212). If so, CALL CONTEXT module 88 places the call context 160 onto call output queue 912 (step 1214), which halts the execution of the CCPI record.

If the node is not a CONVERSATION node, CALL CONTEXT module 88 determines whether the node processed is a "handover node" (step 1213). As explained above, a "handover node" temporarily hands the call processing over to another graph identified as the value in the "handover node." If the executed node is a "handover" node, CALL CONTEXT module 901 repeats step 1206 to get the CCPI record corresponding to the "key" value identified in the "handover node," and step 1207 to create a new call state and push this new call state onto the call state stack 172. Since CALL CONTEXT module 88 executes the CCPI record on top of the call state stack 172, if in step 1213 it is determined that the executed node is a "handover node,"

when the call processing routine returns to step 1208, it is executing the new CCPI record. However, if in step 1213 it is determined that the node executed is not a "handover node," when the call processing routine returns to step 1208, it continues executing the original CCPI record.

If in step 1208, CALL CONTEXT module 88 determines that the CCPI record has been completely executed, CALL CONTEXT module 88 then determines whether there is more than one call state 174 on the call state stack 172 (step 1215). If not, CALL CONTEXT module 88 puts the call context 160 onto call output queue 912 (step 1214), and the call processing routine returns to step 1200.

If, in step 1215, it is determined that more than one call state 174 is on call state stack 172, CALL CONTEXT module 88 "pops" the top call state from call state stack 172 (step 1216) and executes the CCPI record corresponding to that call state (step 1208). This allows one CCPI record to "hand over" to another CCPI record and then return to execution of the original CCPI record.

The complete call processing operation for a single call will now be described with regard to FIG. 62. In this example, it is assumed, for sake of description, that the CCPI record contains a CONVERSATION node requesting the caller to input a personal identification number (PIN) (as shown in the graph of FIG. 42). Also, in this example, it is assumed that the graph "key" is 3151234567.e04. The remainder of the graph is as shown in FIG. 42.

The graph shown in FIG. 42, with the above change, has been created and stored as a CCPI record in database 60 at SCP 18. When ASC switch 12 receives a phone call from a phone having a phone number (315)123-4567, it sends a TCAP message to SCP 18. COMMUNICATE module 84 reads the message and places it onto message handler input queue 906. MESSAGE HANDLER module 86 gets the message from message handler input queue 906 and initially determines whether the message is a conversational response. In this example, the message is not a conversational response, so MESSAGE HANDLER module 86 identifies the CCPI record needed to respond to the message based on the key 3151234567.e05, and generates a call context corresponding to this message. MESSAGE HANDLER module 86 then places the generated call context onto call input queue 910.

CALL CONTEXT module 88 is looking for a call context on call input queue 910. When the call context is placed onto call input queue 910, it is read by CALL CONTEXT module 88 which initially determines whether this call context has been processed previously. Since, in this example, this call context has not been previously processed, CALL CONTEXT module 88 calls GRAPH BUFFER module 78 to get the corresponding CCPI record from database 60 and creates a call state which is pushed on to the call state stack. CALL CONTEXT module 88 then executes the first node of the CCPI record. As shown in FIG. 42, the first node is a CONVERSATION node. Therefore, when CALL CONTEXT module 88 inquires whether this node is a CONVERSATION node, execution of the CCPI record is halted and the CALL CONTEXT module places the call context onto call output queue 912.

MESSAGE HANDLER module 86, which is looking for a call context on call output queue 912, reads the call context once it has been placed on call output queue 912. MESSAGE HANDLER module 86 then inquires whether the call context is conversational. Since the call context is conversational in this example, MESSAGE HANDLER module 86 places the call context onto conversational calls queue 914, and generates a message from the call context to prompt the operator to input a PIN. This message is placed onto message handler output queue 908.

COMMUNICATE module 84 gets the message from message handler queue 908 and sends the message back to ASC switch 12. The call processing operation then continues to process other messages from SCP 18.

In response to the PIN input by the operator, ASC switch 12 again sends a message to SCP 18. COMMUNICATE module 84 reads this message and places it onto message handler input queue 906. MESSAGE HANDLER module 86 gets this message from queue 906 and determines whether the message is a conversational response. In this example, the PIN input by the caller is a conversational response, and therefore, MESSAGE HANDLER module 86 gets the corresponding call context from conversational calls queue 914. This call context is placed onto call input queue 910 for further processing by CALL CONTEXT module 88.

CALL CONTEXT module 88 reads the call context from call input queue 910 and determines whether this call context has been previously processed. Since this call context has previously been processed in this example, the CCPI record is not retrieved from database 60. Instead, CALL CONTEXT module 88 determines whether execution of the CCPI record is complete. Since, in this example, the CCPI record has not been completely executed, the next node of the CCPI record is executed. Each of the nodes of the CCPI record is then executed.

In this example, it is assumed that the operator input PIN 1234. As illustrated by the graph of FIG. 42, CALL CONTEXT module 88 determines from the execution of the CCPI record that the call from phone number (315)123-4567 should be routed, adds this information to the call context and places the call context onto call output queue 912. MESSAGE HANDLER module 86 reads the call context and, determining that the call context is not conversational, generates a message from the call context to inform ASC switch 12 to route the call. MESSAGE HANDLER module 86 places this message onto message handler output queue 908. COMMUNICATE module 84 then reads the message from queue 908 and sends it to ASC switch 12.

F. ENHANCED CALL PROCESSING FOR VISUAL INDICATION OF EXECUTED GRAPH

Having created a graph, an operator can test the graph by processing a call generated by a switch or switch simulator prior to deploying the CCPI record into the AIN network 10. This testing can be done on SMS 20, PC 22, SCP 18, SN 16 or adjunct 14, provided these devices contain a CS application 46 comprising call processing portion 56 and a switch or switch simulator.

Although such a test indicates which call processing was performed correctly, if the call processing was performed incorrectly, the test does not indicate the reason that the call processing failed. Accordingly, another embodiment of the present invention provides for a visual indication of the execution path taken through a graph while processing a call. This embodiment preferably uses an application comprising an enhanced call processing portion and can be implemented on the SMS 20, PC 22, SCP 18, SN 16 or adjunct 14.

The visual indication can be provided at any of these devices provided a CS application 46 comprises service creation portion 54 and an operator interface 44 are provided at that device. Thus, the visual indication of the execution path on the graph can be provided at the device performing the call processing (local visual indication) or at a device remote from the device performing the call processing (remote visual indication). The visual indication can be provided for call processing in a testing mode or in the AIN network 10.

In a preferred embodiment, the visual indication comprises highlighting the execution path as taken during call processing directly on the graph, preferably as a red line connecting the graph nodes executed to process the call (referred to herein as a "trace"). However, any other type of highlighting can be used to identify the execution path on the graph. Alternatively, the execution path taken through a CCPI record may be visually indicated by displaying the execution path one node at a time (referred to herein as the "step" indication). Preferably, when a "step" indication is performed, the "trace" is also provided.

Figure 68A:
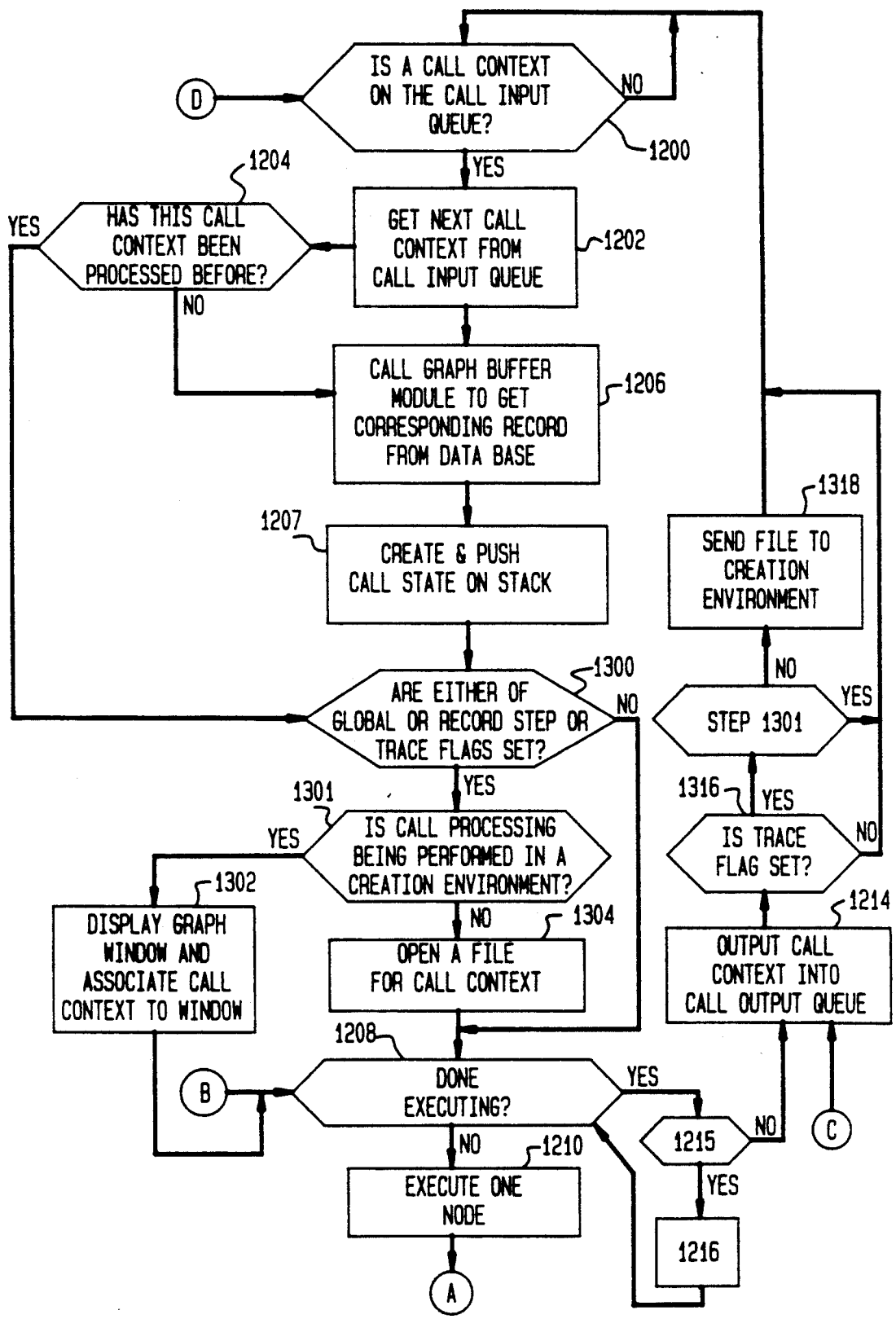
FIGS. 68A and 68B are flow diagrams illustrating a call processing operation to provide visual indications of an execution of a service as performed by a CALL CONTEXT module in accordance with one embodiment of the present invention.
Figure 68B:
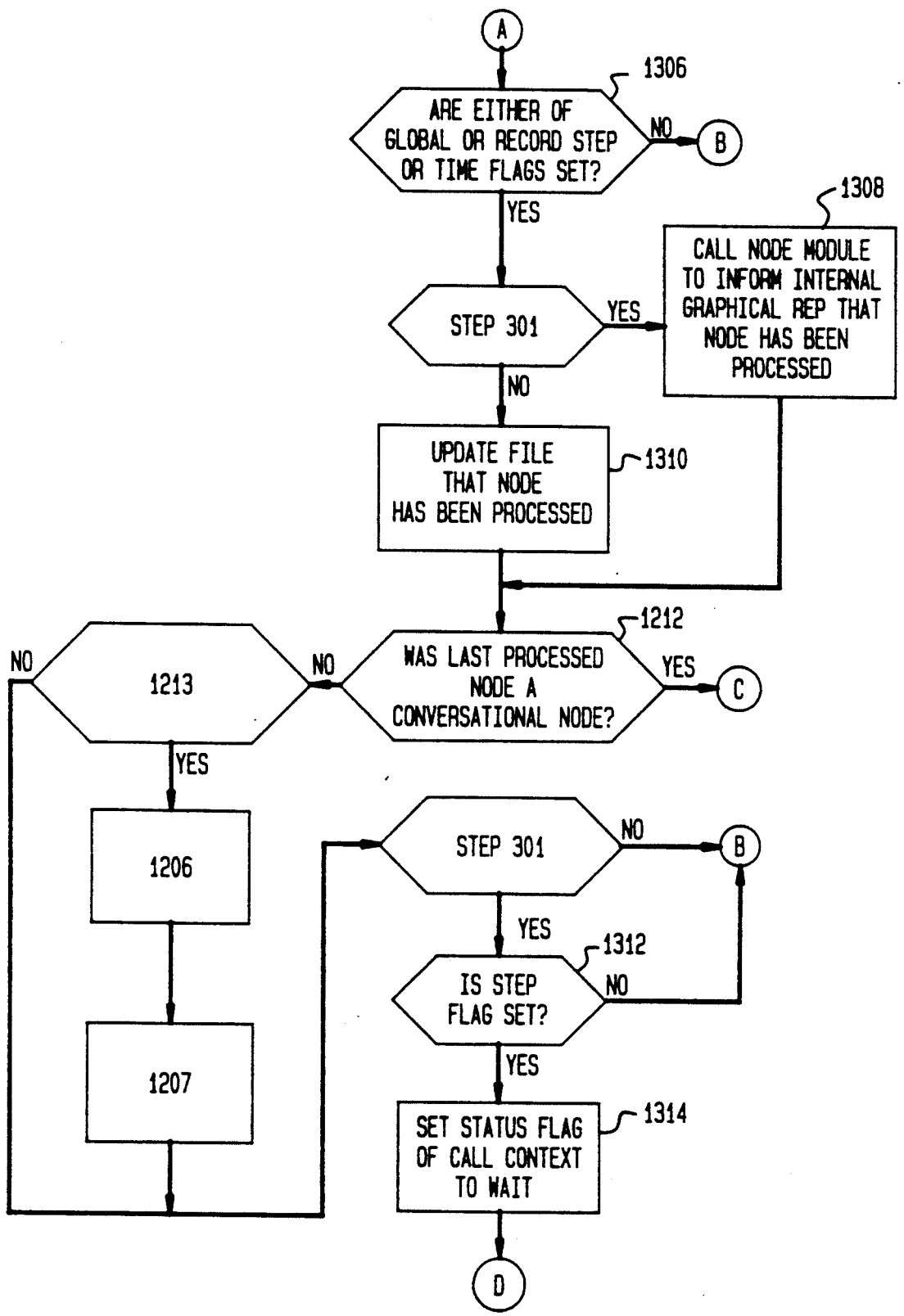

In a preferred embodiment, the present invention provides for the "trace" and "step" visual indications by enhancing the call processing operation performed by CALL CONTEXT module 88 as shown in FIGS. 68A and 68B. However, the processing operations of COMMUNICATE module 84 and MESSAGE HANDLER module 86 remain the same as described above. For the enhanced call processing of FIGS. 68A and 68B, steps 1200-1216 are identical to those shown for the call processing of FIG. 67. However, for enhanced call processing, after creating a call state for the CCPI record and pushing the call state into the call state stack, CALL CONTEXT module 88 determines whether any of the "global" or "record," "step" or "trace" flags are set (step 1300).

"Global" flags refer to flags corresponding to a plurality of CCPI records. If a "global" flag is set, the execution path taken through the CCPI record is stepped through or traced for every CCPI record executed depending on the flag selection. "Record" flags refer to flags corresponding to each individual CCPI record. If a "record" flag is set for a CCPI record, the corresponding graph is displayed and the execution path taken through the graph is stepped through or traced depending on the flag selection when a call is executed by enhanced call processing portion 56 in either a creation environment (local) or a call processing environment (which includes an application comprising only enhanced call processing portion 56 and no operator interface; remote).

Figure 69:
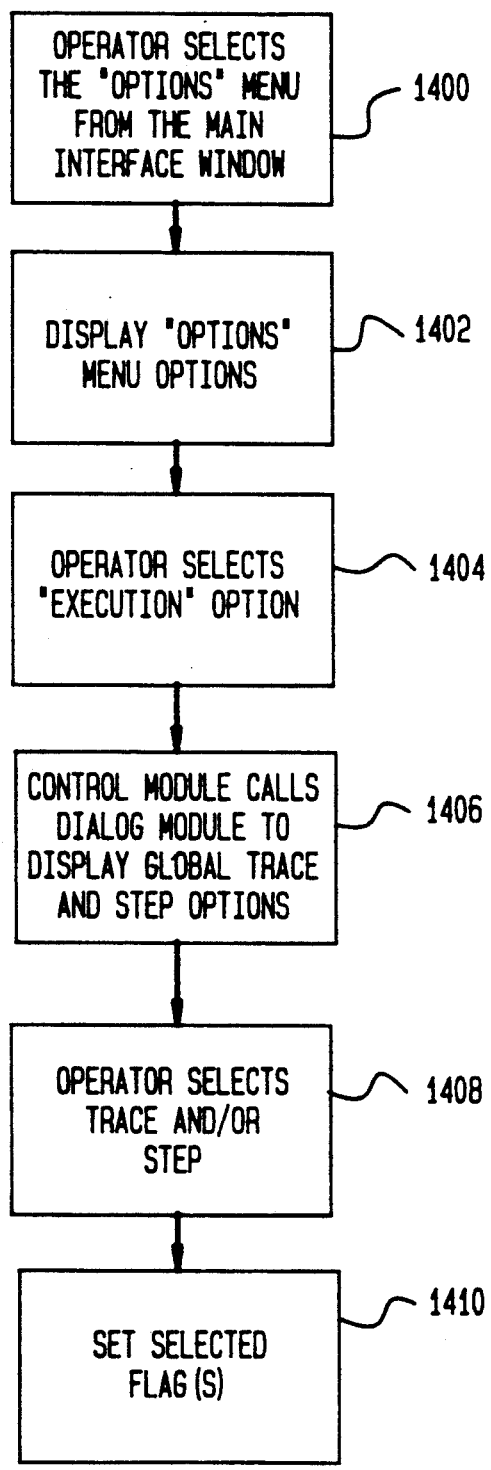
FIG. 69 is a flow diagram illustrating an operation for setting "global," "step" and "trace" flags in accordance with one embodiment of the present invention.

"Global," "step" and "trace" flags are preferably set by the operator in accordance with the flow diagram shown in FIG. 69. Initially, the operator displays the main interface window and selects the "OPTIONS" menu (step 1400). In response, CONTROL module 106 displays the "OPTIONS" menu options, as shown in FIG. 13 (step 1402). The operator then selects the "EXECUTION" option (step 1404), and CONTROL module 106 then calls DIALOG module 104 to display a dialog box (not shown) prompting the operator to select either the "step" or "trace" option (step 1406). The operator then selects the "trace" or "step" option (step 1408). The corresponding "global" flags are set by CONTROL module 106 (step 1410).

"Record" flags are preferably set by the operator in accordance with the flow diagram illustrated in FIG. 69 except that in step 1400 the "OPTIONS" menu 144 is selected from the graph edit pad window as shown in FIG. 29. In addition, after the flags are set, the operator performs a "SAVE" operation as described above, to set the "record," trace or step flag. If the CCPI record corresponding to the graph is to be call processed at a remote call processing environment, MAIL module 100 transfers the CCPI record from the creation environment to the remote call processing environment.

Referring back to step 1300 in FIG. 68A, if none of the "global" or "record," "step" or "trace" flags is set, CALL CONTEXT module 88 determines whether the CCPI record has been completely executed (step 1208). If either the "global" or "record," "trace" or "step" flag is set CALL CONTEXT module 88 determines whether the enhanced call processing operation is being performed in a creation environment (step 1301). This determination is made based on an environment flag.

As explained above, a creation environment includes a display 48 and service creation portion 54. Therefore, for viewing the graph when call processing in the creation environment, the visual indication is provided at the creation environment.

If, for example, the call processing environment may not include a display 48, the execution results of the call processing are preferably sent to a creation environment for display. Thus, different actions are taken by the enhanced call processing portion 56 depending on the environment in which the enhanced call processing is being performed.

If, in step 1301, the enhanced call processing is performed in a creation environment, CALL CONTEXT module 88 displays the graph edit pad window and associates the call context with the graph edit pad window (step 1302). If, in step 1301, the enhanced call processing is performed in a call processing environment, the CALL CONTEXT module 88 opens a file for the call context (step 1304) to record execution information.

CALL CONTEXT module 88 then determines whether the CCPI record has been completely executed (step 1208). If so, CALL CONTEXT module 88 performs steps 1215, 1214 and 1216, as discussed with regard to FIG. 67. If not, the next node is executed (step 1210).

After executing a node, CALL CONTEXT module 88 again determines whether the "global" "record" trace or step flags are set (step 1306). If not, CALL CONTEXT module 88 repeats step 1208. If one of these flags is set, however, the determination of step 1301 is repeated.

If the call processing is being performed in a creation environment, CALL CONTEXT module 88 calls NODE module 64 to set a flag in the internal data structure representation of the graph indicating that node has been processed (step 1308). As described above, changes to the internal data structure representation are reflected up through the abstract displayed representation, and displayed on the screen. Thus, when performing enhanced call processing at a creation environment, the setting of a flag in the internal data structure representation after processing a node is reflected as a highlighting between the processed nodes on the displayed graph. If the enhanced call processing is instead being performed at a call processing environment without a display or service creation portion 54, CALL CON- TEXT module 88 updates the file to indicate that the node has been executed (step 1310).

CALL CONTEXT module 88 then determines whether the processed node is a CONVERSATION node (step 1212). If so, CALL CONTEXT module 88 outputs the call context onto the call output queue 912 (step 1214). If not, steps 1213, 1206 and 1207 shown in FIG. 67 are performed.

After creating a call state and pushing the call state into the call state stack, or if the processed node is not a handover node, the enhanced call processing performs step 1301. If the enhanced call processing is being performed in a call processing environment, CALL CONTEXT module 88 returns to step 1208. If the enhanced call processing is being performed in a creation environment, CALL CONTEXT module 88 determines the "global" "record" step flags set (step 1312). If not, CALL CONTEXT module 88 repeats step 1208. If so, CALL CONTEXT module 88 sets the status flag of the call context to "wait" (step 1314) and returns to step 1200.

Step 1314 causes execution of the CCPI record being call processed to stop. Thus, if the call is being processed in a creation environment, the execution path taken through the CCPI record is visually indicated by displaying one node at a time and tracing the execution path between the nodes. The operator can select the "STEP" option of the EXECUTE menu, shown in FIG. 30, to execute the next node. When the operator selects the STEP option, the call context for the corresponding CCPI record is placed on the call input queue.

For enhanced call processing, after a call context has been output to the call output queue 912 (step 1214), CALL CONTEXT module 88 determines whether either the "global" or "record" trace flags is set (step 1316). If not, CALL CONTEXT module 88 returns to step 1200. If so, step 1301 is repeated.

If it is determined that enhanced call processing is being performed in a creation environment, CALL CONTEXT module 88 returns to step 1200. If, however, it is determined that call processing is being performed in a call processing environment without a display 48 and service creation portion 54, the file is sent to a creation environment (step 1318), and the processing of CALL CONTEXT module 88 returns to step 1200.

Sending the file to a creation environment in step 1318 preferably causes a telephone window 121 to appear on the display, as shown, for example, in FIG. 7. Window 121 indicates to the operator that files corresponding to CCPI records executed at a remote call processing environment have been sent to the creation environment.

Figure 71:
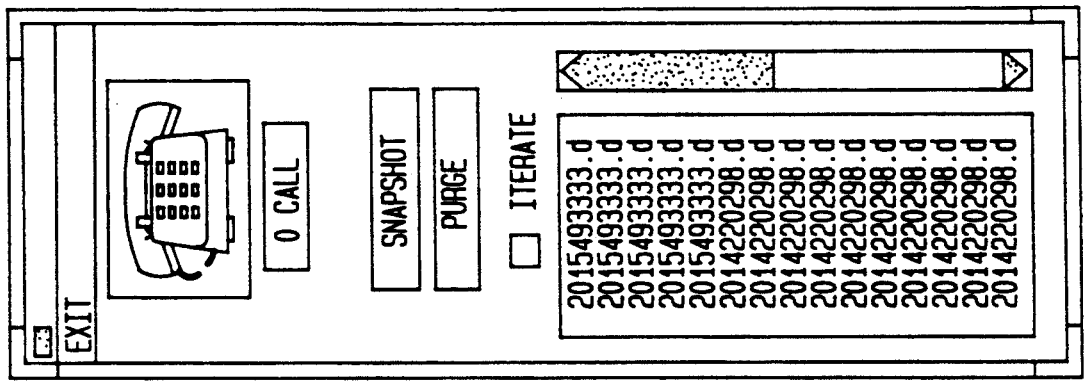
FIG. 71 illustrates a dialog box for selecting services for visual indication in accordance with one embodiment of the present invention.
Figure 70:
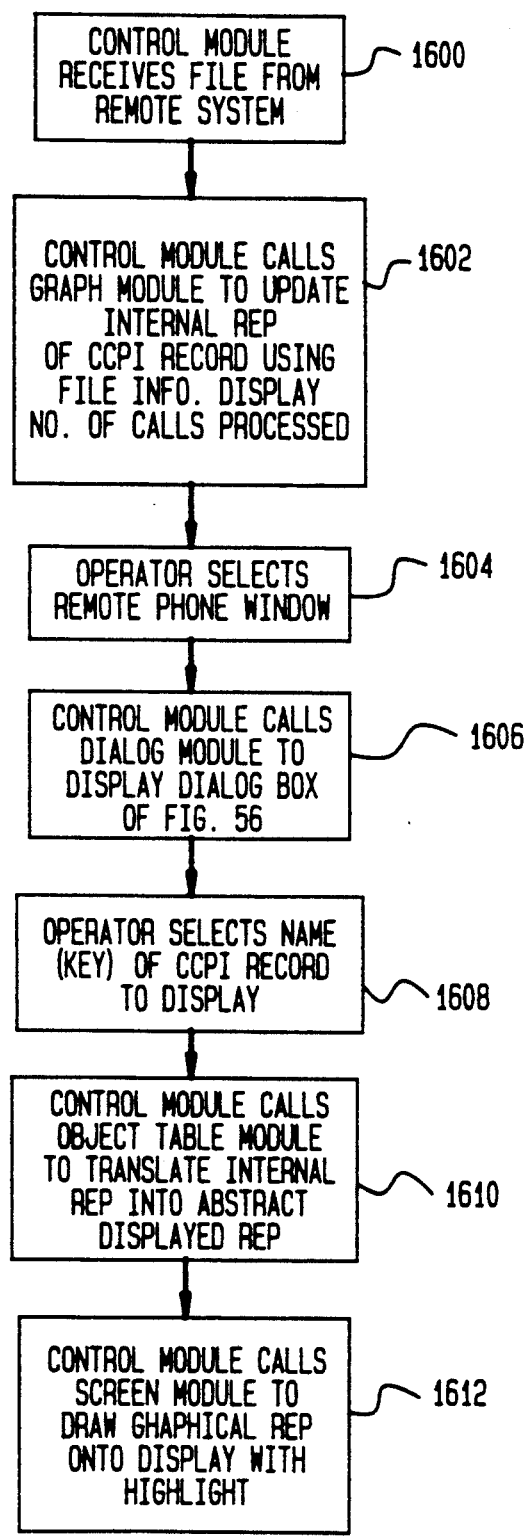
FIG. 70 is a flow diagram illustrating an operation to provide a visual indication of an execution path taken during enhanced call processing at a remote call processing environment, in accordance with one embodiment of the present invention.

FIG. 70 is a flow diagram illustrating an operation to provide a visual indication of the execution paths taken during enhanced call processing at a remote call processing environment. Initially, CONTROL module 106 receives the file (step 1600) and calls GRAPH module 62 to update the internal data structure representation of the graph with the information in the file (step 1602). The operator selects the telephone window 121 on the display (step 1604) and CONTROL module 106 calls DIALOG module 104 to display a corresponding dialog box shown in FIG. 71 (step 1606). The operator then selects the "key" of the graph to be displayed (step 1608). Next, CONTROL module 106 calls OBJECT TABLE module 110 to translate the internal data structure representation of the graph into the abstract displayed representation (step 1610), CONTROL module 106 also calls SCREEN module 102 to draw the graph onto the display with a "trace" visual indication of the execution path in the graph (step 1612).

G. VALIDATION

Validation is considered a separate operation from testing. In testing, a visual indication of the processing is created so that the operator can ensure that the procedure corresponding to the graph is proceeding as desired. Validation, on the other hand, is intended to determine whether the necessary connections have been allowed in creating the graph. In the preferred embodiment, validation involves use of an expert system.

Expert systems are available for detecting logical infractions in a processing routine and generating a list of these infractions based on a set of rules and a knowledge base understood by the expert system. The present invention employs an expert system to identify logical infractions in displayed graph 5.

Preferably, there are two types of infractions: "severe" and "warning." Severe infractions are identified by the expert system as problems that will produce erroneous call processing. Warning infractions are identified by the expert system as problems that may cause erroneous call processing.

Figure 72:
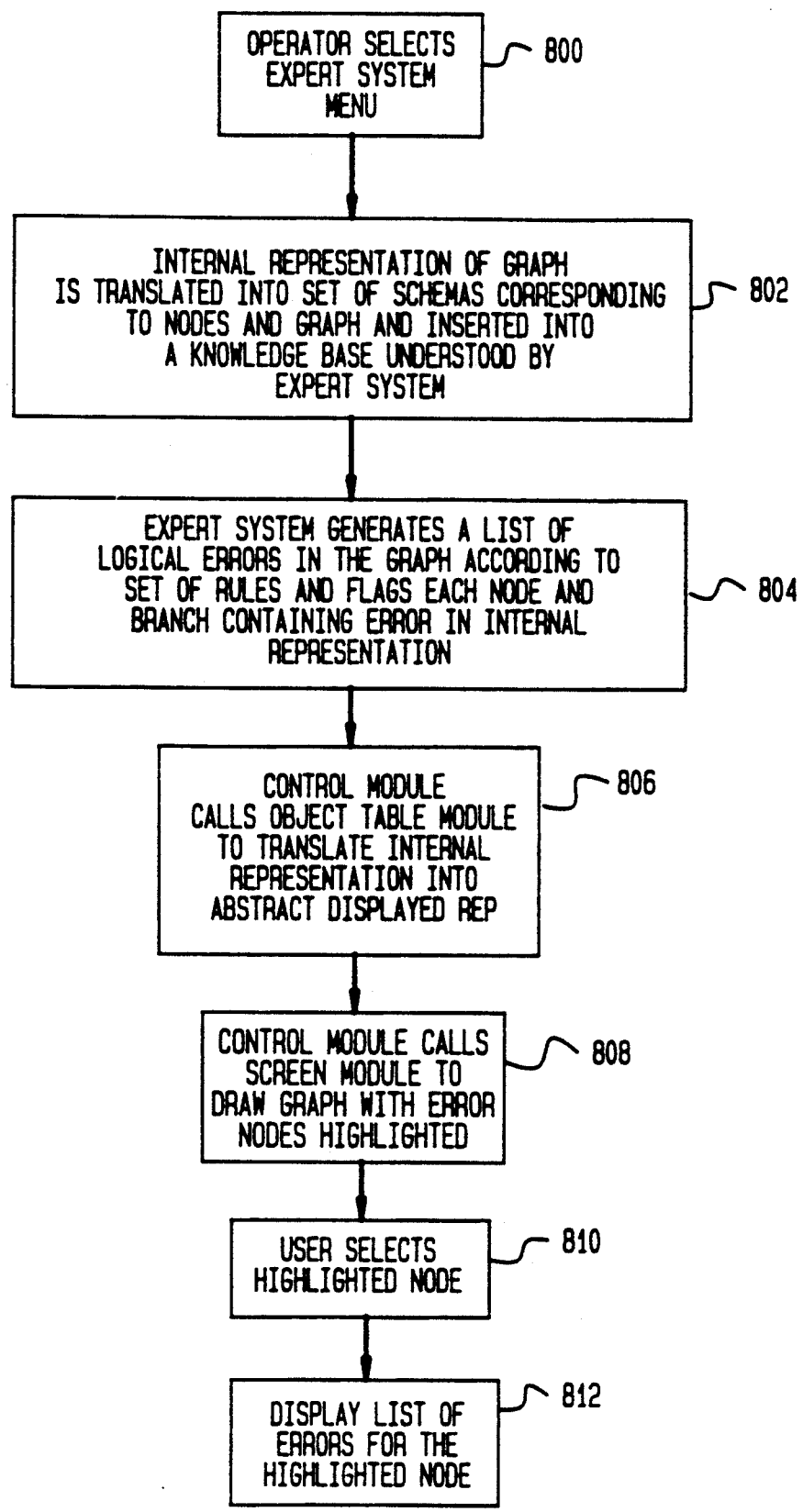
FIG. 72 is a flow diagram illustrating an operation of an expert system in accordance with one embodiment of the present invention.

The following is an exemplary list of rules utilized by an expert system to identify in an embodiment of the invention "severe" and "warning" infractions in a graph.
1. Must have "other" branch for TIME, DATE, LATA nodes (severe);
2. Must have all branch values for DAY node (severe);
3. DECISION nodes need more than one branch (severe);
4. Every cycle in the graph must have at least one DECISION node (severe);
5. No DLN[x,y] node can precede a DLN[p,q] if $x \leq p$ and $y \geq q$ (warning);
6. No ANI[x,y] node can precede an ANI[p,q] if $x \leq p$ and $y \geq q$ (warning);
7. No duplication of ASSIGNMENT nodes on a single path through the graph (warning);
8. SERVICE SPECIFIC RULES 800
   a. no CONVERSATIONAL nodes allowed (warning); Outgoing call screening
   b. no ROUTING NUMBER nodes allowed FIG. 72 is a flow diagram, illustrating a preferred operation of an expert system in accordance with the invention. Initially, the operator selects an expert system menu (not shown in the figures) (step 800). In response, CONTROL module 106 calls EXPERT module 76 to translate the internal data structure representation of the graph being displayed into a set of "schemas" corresponding to the nodes of the graph and insert these "schemas" into a knowledge base understood by the expert system (step 802).

Using these "schemas," and rules, the expert system tests the schemas according to a set of rules previously input to the expert system, such as the rules specified above, and generates a list of errors in the graph. The expert system also flags each node and branch containing an error (step 804). Flagging the nodes and branches changes the data structures of the internal data structure representation of the graph.

CONTROL module 106 then calls OBJECT TABLE module 110 to translate the internal data structure representation into the abstract displayed representation (step 806), and calls SCREEN module 102 to translate the abstract displayed representation into the displayed graph (step 808). The flagged nodes are highlighted on the screen to identify the error nodes. Thus, the operator can readily identify errors in the graph and correct these errors if necessary. In a preferred embodiment, the operator may also select the highlighted node (step 810) to display a list of errors for the highlighted node (step 812).

Examples of known expert systems which can be used in accordance with the present invention include the Automated Reasoning Tool (ART) produced by Inference Corporation and the Laser Expert System produced by Bell Atlantic Knowledge System Corporation. Other expert systems are available and can be used in accordance with the present invention.

H. SUMMARY

While there has been illustrated and described what are at present considered to be preferred embodiments and methods of the present invention, it will be understood by those skilled in the art that various changes and modifications may be made, and equivalence may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A data processing system for designing a procedure to direct a telephone network having a customized call processor to provide requested services to a customer of the network, the data processing system including a display terminal for displaying a visual representation of the procedure;

control means, coupled to the display terminal, for causing the display terminal to display the visual representation based upon multilevel data the multilevel data including a graphical representation level containing display information for the visual representation including an object level containing information about screen objects used in the visual representation, and a screen level containing information about relationships between the screen objects in the visual representation;

a data structure level containing data, organized in data structures, which correspond to the display information; and a code level containing machine independent binary code executable in real time by the customized call processor to implement the requested services, the machine independent binary code corresponding to the data in the data structure;

a plurality of graphical representation level modules for operating on the display information;

a plurality of data structure level modules for operating on the data organized in the data structures; and a plurality of code level modules for operating on the executable code.

2. The data processing system of claim 1 wherein the plurality of graphical representation modules includes a plurality of object level modules for operating on the information about screen objects, and a plurality of screen level modules for operating on the information about relationship between the screen objects in the visual representation.

3. A method of storing and displaying in a data processing system a procedure to direct a telephone network to provide requested services to a customer of the network, the method comprising the steps, executed by a data processing system, of:

storing, in a graphical representation level, display information for the visual representation of the procedure;

storing, in a data structure level, data organized in data structures, which correspond to the display information;

storing, in a code level, machine independent binary code executable in real time by a customized call processor within the telephone network for implementing the requested services, the binary code corresponding to the data in the data structures; and executing software modules associated with the graphical representation level display information stored in said data processing system for generating a presentation of said procedure on a display device.

4. The method of claim 3 wherein the step of storing display information in the graphical representation level includes the substeps of storing, in an object level, information about screen objects used in the visual representation, and storing, in a screen level, information about relationships between the screen objects in the visual representation.

5. In a data processing system containing a procedure to direct a telephone network to provide requested services to a customer of the network, the data processing system including a display terminal for displaying a visual representation of the procedure and multilevel data organized into a graphical representation level containing display information for the visual representation, a data structure level containing data, organized in data structures, which correspond to the display information; and a code level containing machine independent binary code executable in real time by a customized call processor within the telephone network for implementing the requested services, the binary code corresponding to the data in the data structures, a method of manipulating the data comprising the steps, executed by a data processor, of:

executing a graphical representation level module to manipulate the display information;

executing a data structure level module to manipulate the data organized in the data structures; and executing a code level module to manipulate the binary code.

6. The method of claim 5 wherein the step of executing graphical representation modules includes executing an object level module to manipulate the information about screen objects, and executing a screen level module to manipulate the information about relationships between the screen objects in the visual representation.

* * * * *